(12) United States Patent
Armangau et al.

(10) Patent No.: US 7,567,991 B2
(45) Date of Patent: Jul. 28, 2009

(54) REPLICATION OF SNAPSHOT USING A FILE SYSTEM COPY DIFFERENTIAL

(75) Inventors: Philippe Armangau, Acton, MA (US); Milena Bergant, North Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 1140 days.

(21) Appl. No.: 10/603,411

(22) Filed: Jun. 25, 2003

(65) Prior Publication Data

US 2004/0267836 A1    Dec. 30, 2004

(51) Int. Cl.
G06F 12/00    (2006.01)
G06F 17/30    (2006.01)

(52) U.S. Cl. .............. 707/203; 707/100; 707/204; 711/161; 711/162

(58) Field of Classification Search ............ 707/202, 707/203, 204, 161–162
See application file for complete search history.

(56) References Cited

U.S. PATENT DOCUMENTS

| | | | |
|---|---|---|---|
| 5,434,994 A | 7/1995 | Shaheen et al. | 395/500 |
| 5,596,706 A | 1/1997 | Shimazaki et al. | 395/182.04 |
| 5,615,329 A | 3/1997 | Kern et al. | 395/182.04 |
| 5,835,953 A | 11/1998 | Ohran | 711/162 |
| 5,870,764 A | 2/1999 | Lo et al. | 707/203 |
| 5,873,116 A | 2/1999 | Van Fleet | 711/147 |
| 5,893,140 A | 4/1999 | Vahalia et al. | 711/118 |
| 5,901,327 A | 5/1999 | Ofek | 395/825 |
| 5,974,563 A | 10/1999 | Beeler, Jr. | 714/5 |
| 6,029,175 A | 2/2000 | Chow et al. | 707/104 |
| 6,035,412 A | 3/2000 | Tamer et al. | 714/6 |
| 6,052,797 A | 4/2000 | Ofek et al. | 714/6 |
| 6,076,148 A | 6/2000 | Kedem | 711/162 |
| 6,101,497 A | 8/2000 | Ofek | 707/10 |

(Continued)

FOREIGN PATENT DOCUMENTS

EP      0 672 985 A1    9/1995

(Continued)

OTHER PUBLICATIONS

Hargrave's communications dictionary,wiley, copyright 2001 (www.Xreferplus.com).*

(Continued)

*Primary Examiner*—Tim T. Vo
*Assistant Examiner*—Jay A Morrison
(74) *Attorney, Agent, or Firm*—Richard Auchterlonie; Novak Druce & Quigg, LLP

(57) ABSTRACT

A snapshot copy facility stores snapshot copies of a production, file system. The snapshot copy facility receives a request for the difference between a specified older snapshot,copy and a specified younger snapshot copy, and responds by returning the difference between the older snapshot copy and the younger snapshot copy. In a preferred implementation, the snapshot copy facility has an index for each snapshot copy for indicating blocks of data in the production file system that have changed between the snapshot copy and a next snapshot copy of the production file system. The indices are scanned for a sequence of the snapshot copies to determine the blocks that have changed, and the snapshot copy facility returns the block numbers and data in the younger snapshot copy for the blocks that have changed.

14 Claims, 42 Drawing Sheets

U.S. PATENT DOCUMENTS

| | | | |
|---|---|---|---|
| 6,209,000 B1* | 3/2001 | Klein et al. | 707/203 |
| 6,353,878 B1 | 3/2002 | Dunham | 711/162 |
| 6,434,681 B1 | 8/2002 | Armangau | 711/162 |
| 6,496,908 B1 | 12/2002 | Kamvysselis et al. | 711/162 |
| 6,502,205 B1 | 12/2002 | Yanai et al. | 714/7 |
| 6,549,992 B1 | 4/2003 | Armangau et al. | 711/162 |
| 6,732,124 B1* | 5/2004 | Koseki et al. | 707/202 |
| 6,785,786 B1* | 8/2004 | Gold et al. | 711/162 |
| 2002/0112134 A1* | 8/2002 | Ohran et al. | 711/162 |
| 2003/0217119 A1 | 11/2003 | Raman et al. | 709/219 |
| 2004/0030727 A1 | 2/2004 | Armangau et al. | 707/200 |
| 2004/0030846 A1 | 2/2004 | Armangau et al. | 711/154 |
| 2004/0030951 A1 | 2/2004 | Armangau et al. | 714/6 |
| 2004/0163009 A1* | 8/2004 | Goldstein et al. | 714/6 |
| 2005/0015416 A1* | 1/2005 | Yamagami | 707/204 |

FOREIGN PATENT DOCUMENTS

| | | |
|---|---|---|
| EP | 0 674 263 A1 | 9/1995 |

OTHER PUBLICATIONS

Uresh Vahalia, *UNIX Internals: The new frontiers*, Chapter 9, "File System Implementations," Prentice-Hall, Inc., Upper Saddle River, New Jersey, 1996, pp. 261-289.

D.L. Burkes and R.K. Treiber, "Design Approaches for Real-Time Transaction Processing Remote Site Recovery," Digest of Papers in Spring COMPCON90, Feb. 26-Mar. 2, 1990, *Thirty-Fifth IEEE Computer Society International Conference*, San Francisco, CA, pp. 568-572.

"Network Data Management Protocol (NDMP)," http://www.ndmp.org/info/; NDMP White Paper, http://www.ndmp.org/info/technology/wp.html; "Protocol Specification Summary, Document Version: 1.7.2S," http://www.ndmp.org/info/spec_summary.html; "Legato Systems Embraces the NDMP Standard: Legato Networker Software to be NDMP Compliant in Q3," http://www-ftp.legata.com/News/Press/PR209.html; published at least as early as Oct. 11, 1999, 17 pages.

R. Stager and D. Hitz, Internet Draft filename "draft-stager-iquard-netapp-backup-05.txt," *Network Data Management Protocol (NDMP)*, last update Oct. 12, 1999, pp. 1-73.

Koop, P., "Replication at Work, (four companies use Oracle and Sybase replication servers to solve business problems)," DBMS, vol. 8, No. 3, p. 54(4), Mar. 1995.

Remote Mirroring Technical White Paper, Copyright 1994-2002 Sun Microsystems, published at least as early as May 17, 2002 at sun.com, 25 pages.

EMC TechNote: Celerra Replicator, EMC Corporation, Hopkinton, MA, Oct. 2002 (5 pages).

EMC TimeFinder Product Description Guide, EMC Corporation, Hopkinton, MA, 1998, pp. 1-31.

Leveraging SnapView/IP in Oracle8i Environments with the CLARiiON IP4700 File Server, Engineering White Paper, EMC Corporation, Hopkinton, MA, Feb. 13, 2002, pp. 1-16.

Using EMC CLARiiON FC4700 and SnapView with Oracle 8i, Engineering White Paper, EMC Corporation, Hopkinton, MA, Mar. 4, 2002, pp. 1-22.

Disaster Recovery Guideliines for using HP SureStore E XP256, Continuous Access XP with Oracle Databases Rev 1.03, Hewlett-Packard Company, Palo Alto, CA, May 2000, pp. 1-28.

Enterprise Volume Manager and Oracle8 Best Practices, Compaq White Paper, Compaq Computer Corporation, Dec. 1999, pp. 1-11.

Veritas Database Edition for Oracle, Guidelines for Using Storage Checkpoint and Storage Rollback with Oracle Databases, Veritas Software Corporation, Mountain View, CA, Aug. 2001, pp. 1-16.

Veritas Volume Replication and Oracle Databases, A Solutions White Paper, Veritas Software Corporation, Mountain View, CA, May 29, 2000, pp. 1-31.

Nabil Osorio and Bill Lee, Guidelines for Using Snapshot Storage Systems for Oracle Databases, Oracle Corporation, Oct. 2001, p. 12.

\* cited by examiner

BLOCK MAP — 480

| CLONE VOL. | SAVE VOL. |
|---|---|
| B0 | S0 |
| B1 | -- |
| B2 | S2 |
| ⋮ | ⋮ |

REPLICATION OF SNAPSHOT USING A FILE SYSTEM COPY DIFFERENTIAL

BACKGROUND OF THE INVENTION

1. Limited Copyright Waiver

A portion of the disclosure of this patent document contains computer code listings and command formats to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

2. Field of the Invention

The present invention relates generally to data storage systems, and more particularly to a snapshot copy facility for a data storage system.

3. Description of the Related Art

Snapshot copies of a file system have been used for a variety of data processing and storage management functions such as storage backup, transaction processing, and software debugging. A snapshot copy facility, for example, stores a plurality of snapshot copies of a production file system. Each of the snapshot copies is a prior state of the production file system at a respective point in time. The snapshot copy facility has a bit map, a block map, and a save volume for each snapshot copy. The bit map for each snapshot copy indicates blocks of data in the production file system that have changed between the snapshot copy and a next snapshot copy of the production file system. The save volume for each snapshot copy stores the "before images" of the blocks that have changed between the snapshot copy and the next snapshot copy of the production file system. The block map for each snapshot copy provides the save volume block address given the block address of a block that has changed between the snapshot copy and the next snapshot of the production file system.

SUMMARY OF THE INVENTION

In accordance with a first aspect of the invention, there is provided a method of operating a snapshot copy facility that stores a plurality of snapshot copies of a production file system. Each of the snapshot copies is a prior state of the production file system at a respective point in time. The snapshot copy facility receives a request for the difference between a specified older one of the snapshot copies and a specified younger one of the snapshot copies. The snapshot copy facility responds to the request by returning the difference between the specified older one of the snapshot copies and the specified younger one of the snapshot copies.

In accordance with another aspect, the invention provides a method of operating a snapshot copy facility that stores a plurality of snapshot copies of a production file system. Each of the snapshot copies is a prior state of the production file system at a respective point in time. The snapshot copy facility has an index for each snapshot copy for indicating blocks of data in the production file system that have changed between the snapshot copy and a next snapshot copy of the production file system. The method includes scanning the indices for a sequence of the snapshot copies to determine the blocks that have changed between an older one of the snapshot copies and a younger one of the snapshot copies. The sequence of the snapshot copies includes the older one of the snapshot copies and each of the snapshot copies that is both younger than the older one of the snapshot copies and older than the younger one of the snapshot copies.

In accordance with another aspect, the invention provides a method of operating a snapshot copy facility that stores a plurality of snapshot copies of a production file system. Each of the snapshot copies is a prior state of the production file system at a respective point in time. The snapshot copy facility has a first index for each snapshot copy for indicating blocks of data in the production file system that have changed between the snapshot copy and a next snapshot copy of the production file system and that have a "before image" saved for said each snapshot copy. The snapshot copy facility has a second index for each snapshot copy for indicating blocks of data that are not in use in the snapshot copy. The method includes responding to a request for the difference between a specified older one of the snapshot copies and a specified younger one of the snapshot copies by accessing the second index for the specified younger one of the snapshot copies to determine blocks of data in the production file system that are in use in the specified younger one of the snapshot copies, and for blocks of data in the production file system that are in use in the specified younger one of the snapshot copies, accessing at least one of the first indices for a sequence of the snapshot copies to determine blocks that have changed between an older one of the snapshot copies and a younger one of the snapshot copies. The sequence of the snapshot copies includes the older one of the snapshot copies and each of the snapshot copies that is both younger than the older one of the snapshot copies and older than the younger one of the snapshot copies.

In accordance with yet another aspect, the invention provides a method of operating a network file server. The network file server has a snapshot copy facility for storing a plurality of snapshot copies of a production file system. Each of the snapshot copies is a prior state of the production file system at a respective point in time. The network file server receives a request for an update to a specified snapshot copy of the production file system. The network file server responds to the request by checking whether the snapshot copy facility contains the specified snapshot copy of the production file system, and upon finding that the snapshot copy facility contains the specified snapshot copy of the production file system, the network file server returns the difference between the specified snapshot copy of the production file system and a more recent snapshot copy of the production file system.

In accordance with yet another aspect, the invention provides a method of operation in a data processing network having a client and a network file server. The network file server stores a plurality of snapshot copies of a production file system. Each of the snapshot copies is a prior state of the production file system at a respective point in time. The client has a local version of an older one of the snapshot copies. The method provides the client with a younger one of the snapshot copies. The method includes the network file server determining the difference between the younger one of the snapshot copies and the older one of the snapshot copies. The network file server transmits the difference between the younger one of the snapshot copies and the older one of the snapshot copies to the local version of the older one of the snapshot copies. The difference between the younger one of the snapshot copies and the older one of the snapshot copies is written into the local version of the older one of the snapshot copies to produce a local version of the younger one of the snapshot copies.

In accordance with another aspect, the invention provides a snapshot copy facility. The snapshot copy facility includes storage for storing a plurality of snapshot copies of a production file system. Each of the snapshot copies is a prior state of the production file system at a respective point in time. The snapshot copy facility also includes at least one processor programmed for receiving a request for the difference between a specified older one of the snapshot copies and a specified younger one of the snapshot copies; and for responding to the request by returning the difference between the specified older one of the snapshot copies and the specified younger one of the snapshot copies.

In accordance with yet another aspect, the invention provides a snapshot copy facility. The snapshot copy facility includes storage for storing a plurality of snapshot copies of a production file system. Each of the snapshot copies is a prior state of the production file system at a respective point in time. The snapshot copy facility includes an index for each snapshot copy for indicating blocks of data in the production file system that have changed between the snapshot copy and a next snapshot copy of the production file system. The snapshot copy facility also includes at least one processor programmed for scanning the indices for a sequence of the snapshot copies to determine the blocks that have changed between an older one of the snapshot copies and a younger one of the snapshot copies, the sequence of the snapshot copies including the older one of the snapshot copies and each of the snapshot copies that is both younger than the older one of the snapshot copies and older than the younger one of the snapshot copies.

In accordance with another aspect, the invention provides a snapshot copy facility. The snapshot copy facility includes storage for storing a plurality of snapshot copies of a production file system. Each of the snapshot copies is a prior state of the production file system at a respective point in time. The snapshot copy facility has a first index for each snapshot copy for indicating blocks of data in the production file system that have changed between the snapshot copy and a next snapshot copy of the production file system and that have a "before image" for the snapshot copy stored in the storage. The snapshot copy facility has a second index for each snapshot copy for indicating blocks of data that are not in use in the snapshot copy. The snapshot copy facility also has at least one processor programmed for responding to a request for the difference between a specified older one of the snapshot copies and a specified younger one of the snapshot copies by accessing the second index for the specified younger one of the snapshot copies to determine blocks of data in the production file system that are in use in the specified younger one of the snapshot copies, and for blocks of data in the production file system that are in use in the specified younger one of the snapshot copies, accessing at least one of the first indices for a sequence of the snapshot copies to determine blocks that have changed between an older one of the snapshot copies and a younger one of the snapshot copies. The sequence of the snapshot copies includes the older one of the snapshot copies and each of the snapshot copies that is both younger than the older one of the snapshot copies and older than the younger one of the snapshot copies.

In accordance with still another aspect, the invention provides a network file server including a snapshot copy facility for storing a plurality of snapshot copies of a production file system. Each of the snapshot copies is a prior state of the production file system at a respective point in time. The network file server is programmed for receiving a request for an update to a specified snapshot copy of the production file system, and responding to the request by checking whether the snapshot copy facility contains the specified snapshot copy of the production file system, and upon finding that the snapshot copy facility contains the specified snapshot copy of the production file system, returning the difference between the specified snapshot copy of the production file system and a more recent snapshot copy of the production file system.

In accordance with another aspect, the invention provides a program storage device containing a program for a snapshot copy facility. The snapshot copy facility stores a plurality of snapshot copies of a production file system. Each of the snapshot copies is a prior state of the production file system at, a respective point in time. The program is executable for responding to a request for the difference between a specified older one of the snapshot copies and a specified younger one of the snapshot copies by returning the difference between the specified older one of the snapshot copies and the specified younger one of the snapshot copies.

In accordance with yet another aspect, the invention provides a program storage device containing a program for a snapshot copy facility. The snapshot copy facility has a plurality of snapshot copies of a production file system. Each of the snapshot copies is a prior state of the production file system at a respective point in time. The snapshot copy facility also has an index for each snapshot copy for indicating blocks of data in the production file system that have changed between the snapshot copy and a next snapshot copy of the production file system. The program is executable for scanning the indices for a sequence of the snapshot copies to determine the blocks that have changed between an older one of the snapshot copies and a younger one of the snapshot copies, the sequence of the snapshot copies including the older one of the snapshot copies and each of the snapshot copies that is both younger than the older one of the snapshot copies and older than the younger one of the snapshot copies.

In accordance with another aspect, the invention provides a program storage device containing a program for a snapshot copy facility. The snapshot copy facility has a plurality of snapshot copies of a production file system. Each of the snapshot copies is a prior state of the production file system at a respective point in time. The snapshot copy facility has a first index for each snapshot copy for indicating blocks of data in the production file system that have changed between the snapshot copy and a next snapshot copy of the production file system and that have a "before image" for the snapshot copy stored in the snapshot copy facility. The snapshot copy facility has a second index for each snapshot copy for indicating blocks of data that are not in use in the snapshot copy. The program is executable for responding to a request for the difference between a specified older one of the snapshot copies and a specified younger one of the snapshot copies by accessing the second index for the specified younger one of the snapshot copies to determine blocks of data in the production file system that are in use in the specified younger one of the snapshot copies, and for blocks of data in the production file system that are in use in the specified younger one of the snapshot copies, accessing at least one of the first indices for a sequence of the snapshot copies to determine blocks that have changed between an older one of the snapshot copies and a younger one of the snapshot copies. The sequence of the snapshot copies includes the older one of the snapshot copies and each of the snapshot copies that is both younger than the older one of the snapshot copies and older than the younger one of the snapshot copies.

In accordance with a final aspect, the invention provides a program storage device containing a program for a network file server. The network file server includes a snapshot copy facility for storing a plurality of snapshot copies of a production file system. Each of the snapshot copies is a prior state of the production file system at a respective point in time. The program is executable for receiving a request for an update, to a specified snapshot copy of the production file system, and responding to the request by checking whether the snapshot copy facility contains the specified snapshot copy of the production file system, and upon finding that the, snapshot copy facility contains the specified snapshot copy of the production file system, returning the difference between the specified snapshot copy of the production file system and a more recent snapshot copy of the production file system.

BRIEF DESCRIPTION OF THE DRAWINGS

Other objects and advantages of the invention will become apparent upon reading the following detailed description with reference to the accompanying drawings wherein.

Figure 1:
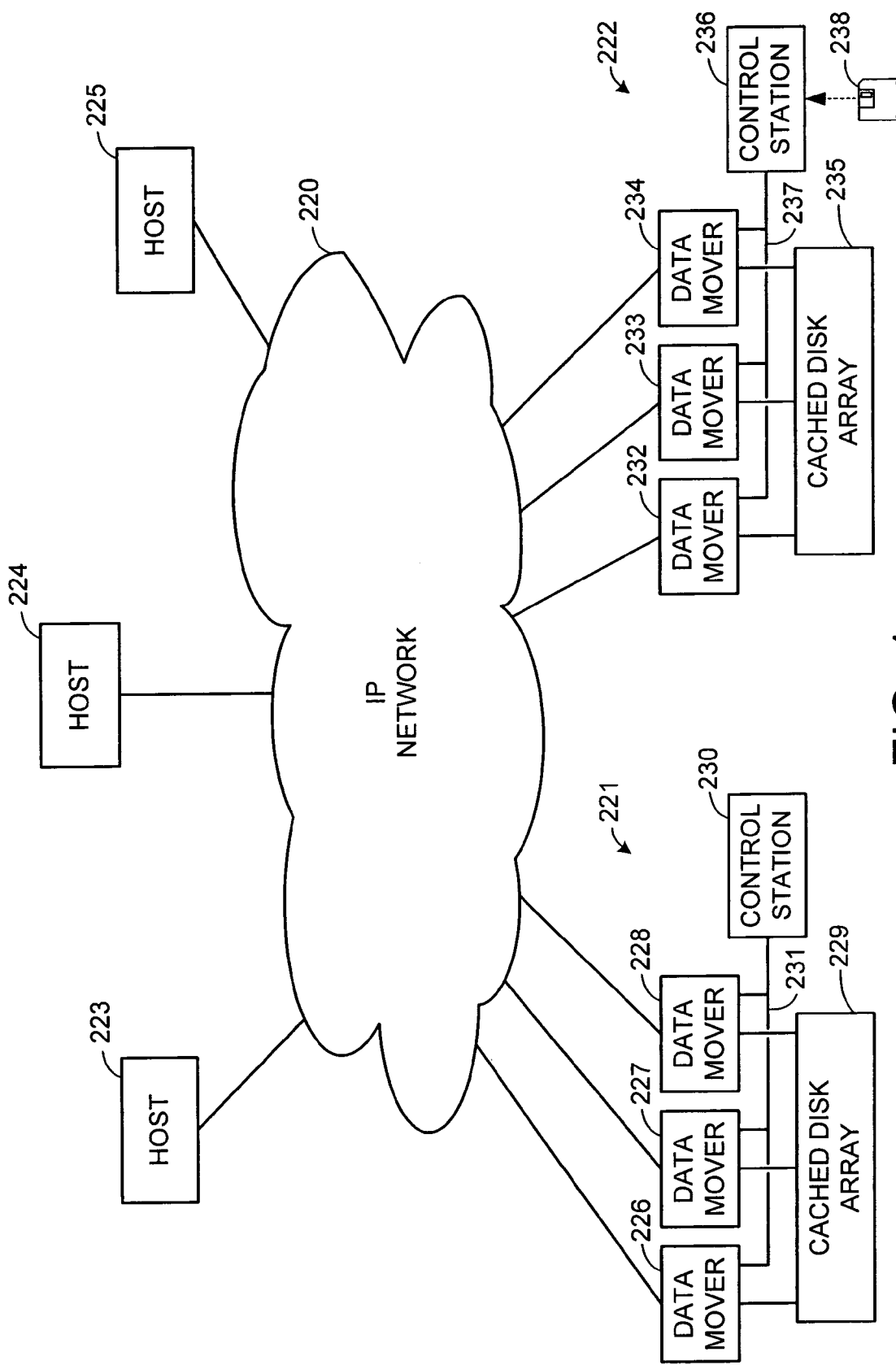
FIG. 1 is a block diagram of an IP network including multiple hosts and multiple data mover computers.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

The present invention was developed to facilitate data recovery in a data network using a remote data replication facility. Therefore, the following detailed description will first describe the remote data replication facility, and will then describe data recovery for the remote data replication facility.

Remote Data Replication Facility

FIG. 1 shows an IP network 220 including multiple network file servers 221, 222, and multiple hosts 223, 224, 225. The hosts and network file servers, for example, can be distributed world wide and linked via the Internet. Each of the network file servers 221, 222, for example, has multiple data movers 226, 227, 228, 232, 233, 234, for moving data between the IP network 220 and the cached disk array 229, 235, and a control station 230, 236 connected via a dedicated dual-redundant data link 231, 237 among the data movers for configuring the data movers and the cached disk array 229, 235. Further details regarding the network file servers 221, 222 are found in Vahalia et al., U.S. Pat. No. 5,893,140, incorporated herein by reference.

In operation, it is desired for each of the network file servers 221, 222 to provide read-only access to a copy of the same file system. For example, each of the network file servers could be programmed to respond to user requests to access the same Internet site. The IP network 220 routes user requests to the network file servers 221, 222 in the same continent or geographic region as the user. In this fashion, the user load is shared among the network file servers.

In the wide-area network of FIG. 1, it is desired to perform read-write updating of the respective file system copies in the network file servers 221, 222 while permitting concurrent read-only access by the hosts. It is also desired to distribute the updates over the IP network.

Figure 2:
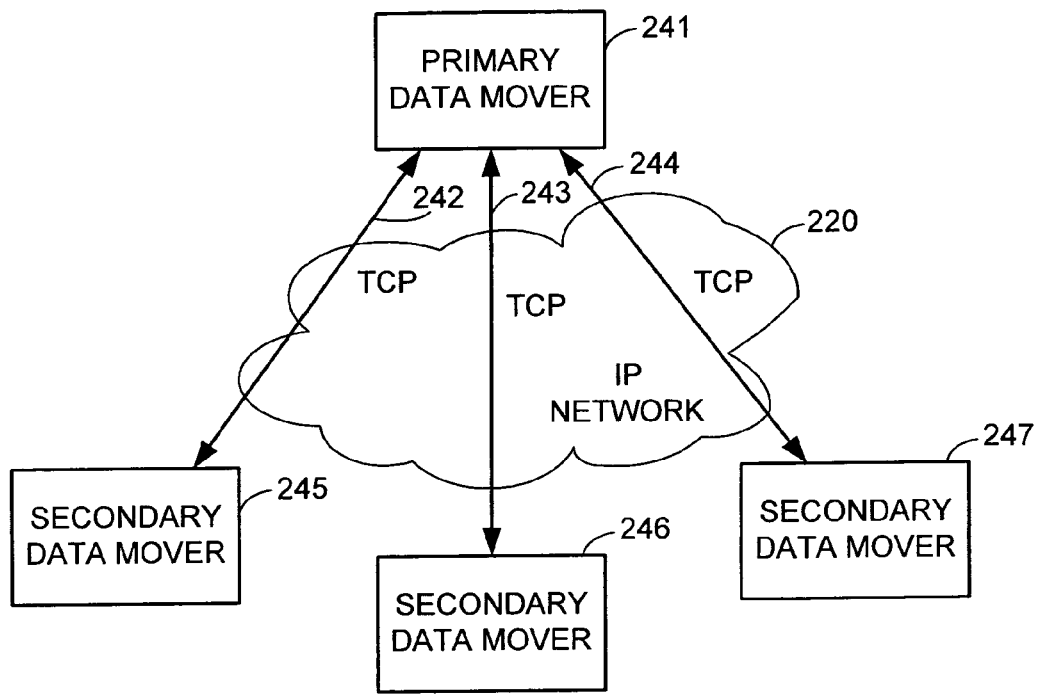
FIG. 2 is a block diagram showing a primary data mover distributing remote copy data to multiple secondary data movers in the IP network by establishing a Transmission Control Protocol (TCP) connection with each of the secondary data movers.

There are a number of ways that updates could be distributed over the IP network from a primary data mover to multiple secondary data movers. As shown in FIG. 2, for example, a primary data mover establishes a connection 242, 243, 244 in accordance with the industry-standard Transmission Control Protocol (TCP) over the IP network 220 to each secondary data mover 245, 246, 247, and then concurrently sends the updates to each secondary data mover over the TCP connection. When the updates need to be distributed to a large number of secondary data movers, however, the amount of time for distributing the updates may become excessive due to limited resources (CPU execution, cycles, connection state, or bandwidth) of the primary data mover 241. One way of extending these limited resources would be to use existing IP routers and switches to implement "fan out" from the primary data mover 241 to the secondary data movers 245, 246, 247. Still, a mechanism for reliability should be layered over the Internet Protocol.

Figure 3:
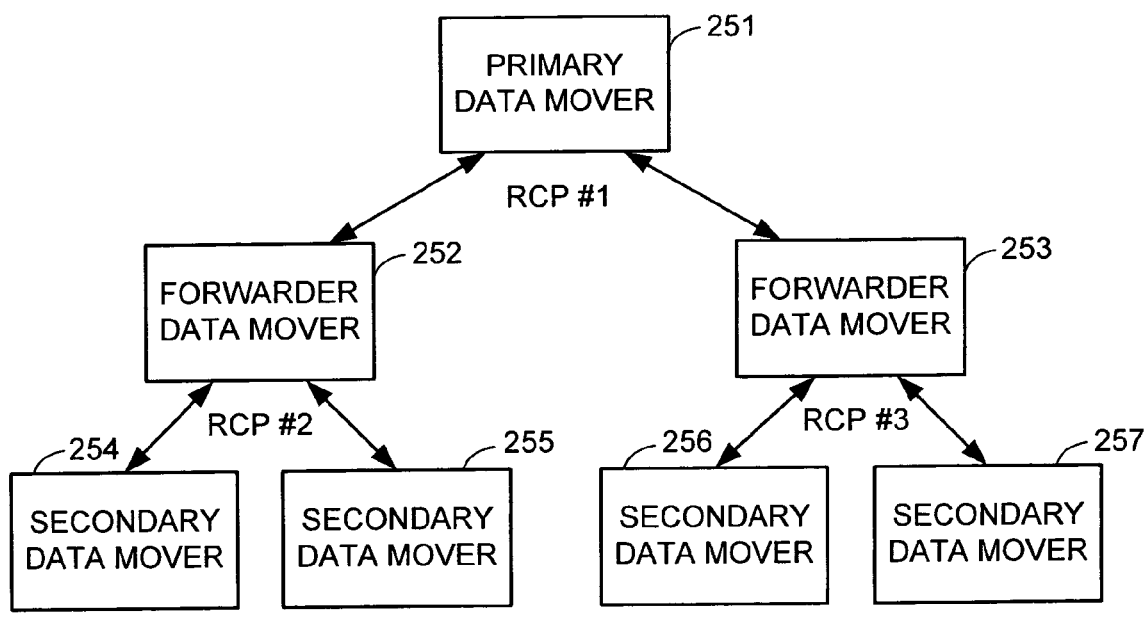
FIG. 3 is a block diagram showing a primary data mover distributing remote copy data to multiple data movers through forwarder data movers.

FIG. 3 shows that the time for distributing updates from a primary data mover 251 to a large number of secondary data movers 254, 255, 256, 257 can be reduced by using intermediate data movers 252, 253 as forwarders. The primary data mover 251 sends the updates to the forwarder data movers 252, 253, and each of the forwarder data movers sends the updates to a respective number of secondary data movers. The forwarder data movers 252, 253 may themselves be secondary data movers; in other words, each may apply the updates to its own copy of the replicated read-only file system. The distribution from the primary data mover 251 to the forwarder data movers 252, 253 can be done in a fashion suitable for wide-area distribution (such as over TCP connections). The forwarding method of replication of FIG. 3 also has the advantage that the distribution from each forwarder data mover to its respective data movers can be done in a different way most suitable for a local area or region of the network. For example, some of the forwarder data movers could use TCP connections, and others could use a combination of TCP connections for control and UDP for data transmission, and still other forwarders could be connected to their secondary data movers by a dedicated local area network.

For implementing the replication method of FIG. 3 over the Internet Protocol, there are a number of desired attributes. It is desired to maintain independence between the primary data mover and each of the secondary data movers. For example, a new secondary data mover can be added at any time to replicate an additional remote copy. The primary data mover should continue to function even if a secondary data mover becomes inoperative. It is also desired to maintain independence between the replication method and the IP transport method. Replication should continue to run even if the IP transport is temporarily inactive. It is desired to recover in a consistent fashion from a panic or shutdown and reboot. A record or log of the progress of the replication can be stored for recovery after an interruption. It is desired to build reusable program blocks for the replication function, so that the program blocks for the replication function can be used independent of the location of the primary file system or its replicas.

In a preferred implementation, independence between the replication process, the IP transport method, and the primary file system being replicated, is ensured by use of a save volume. The save volume is a buffer between the data producer (i.e., the host or application updating the primary file system), the replication process, and the data consumer (the secondary data movers). The save volume stores the progress of the replication over the Internet Protocol so as to maintain the consistency of the replication process upon panic, reboot, and recovery. The transport process need not depend on any "in memory" replication information other than the information in the save volume, so as to permit the replication process to be started or, terminated easily on any data mover for load shifting or load balancing.

When a save volume is used, it can be shared between a primary data mover and a secondary data mover in the case of local file system replication, or a primary copy of the shared volume can be kept at the primary site, and a secondary copy of the shared volume can be kept at the secondary site, in the case of remote file system replication.

Figure 4:
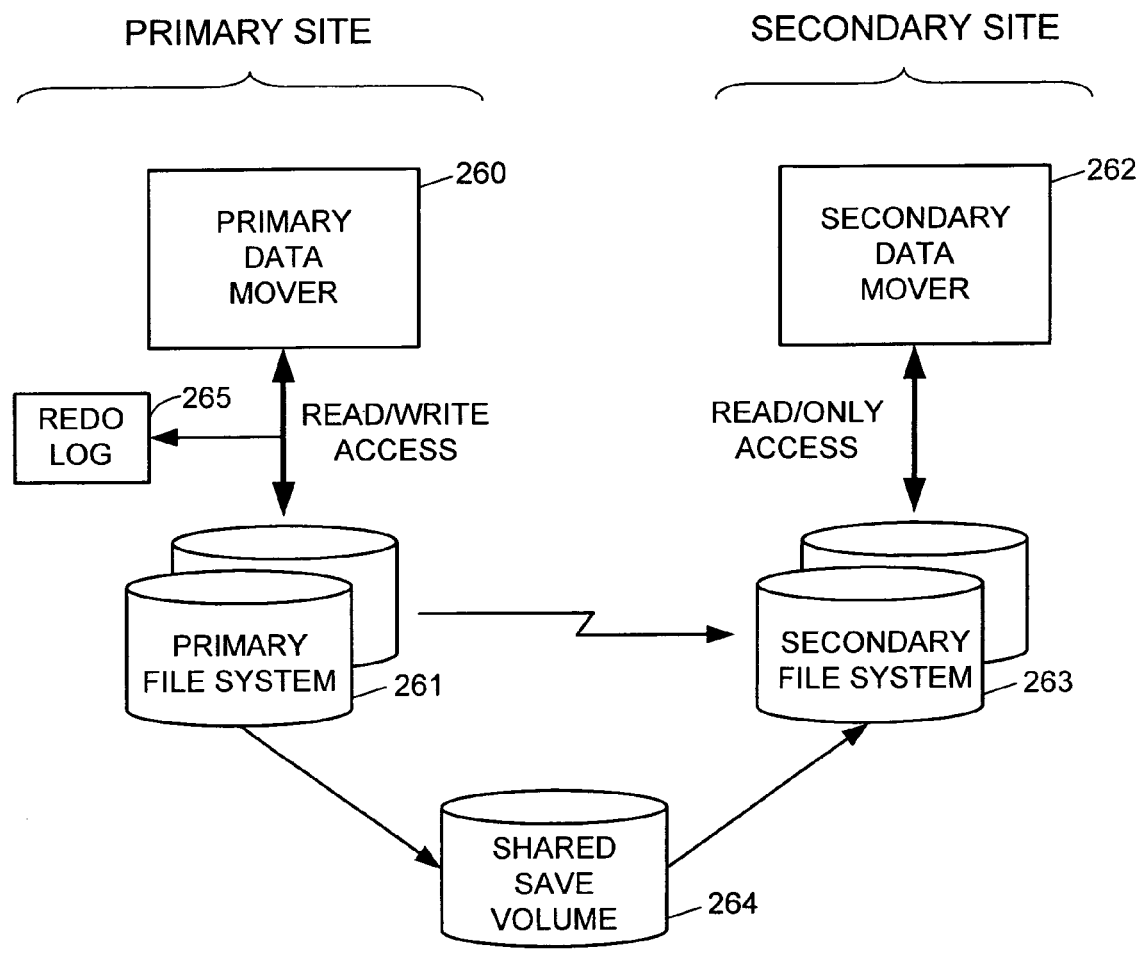
FIG. 4 is a block diagram showing a shared save volume used to buffer local copy data transmitted from a primary data mover to a secondary data mover.

For the case of local file system replication, FIG. 4 shows a primary site including a primary data mover 260 managing access to a primary file system 261, and a secondary data mover 262 managing access to a secondary file system 263 maintained as a read-only copy of the primary file system 261. A save volume 264 is shared between the primary data mover 260 and the secondary data mover 262. This sharing is practical when the secondary site is relatively close to the primary site. A redo log 265 records a log of modifications to the primary file system 261 during the replication process for additional protection from an interruption that would require a reboot and recovery.

Local replication can be used to replicate files within the same network file server. For example, in the network file server 221 in FIG. 1, the primary data mover could be the data mover 226, the secondary data mover could be the data mover 227, the save volume could be stored in the cached disk array 229, and replication control messages could be transmitted between the data movers over the data link 231.

Figure 5:
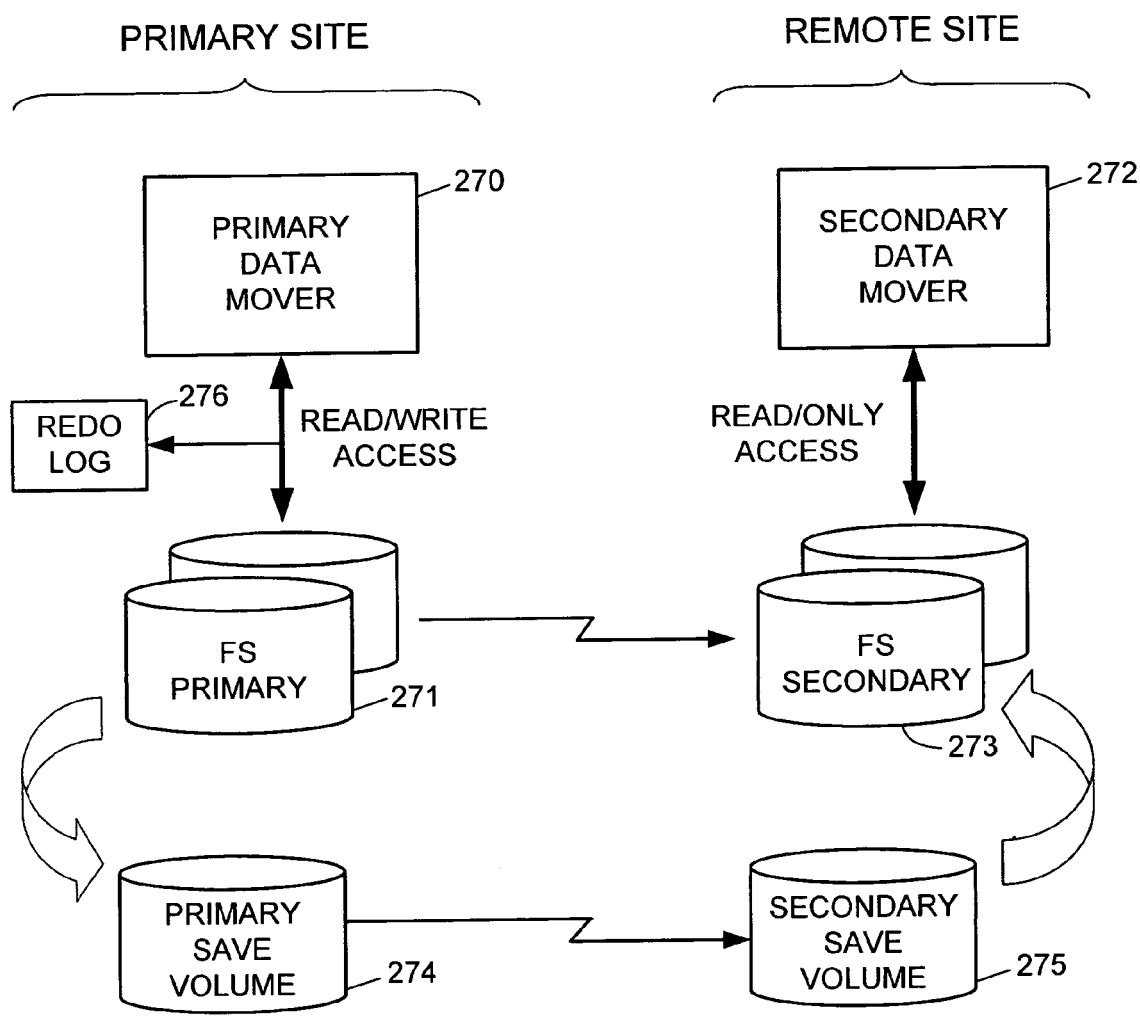
FIG. 5 is a block diagram showing a primary save volume and a secondary save volume.

For the case of remote file system replication, FIG. 5 shows a primary site including a primary data mover 270 managing access to a primary file system 271, and a secondary data mover 272 managing access to a secondary file system 273 maintained as a read-only copy of the primary file system 271. The primary site includes a primary save volume 274, and the remote site includes a secondary save volume 275. A redo log 276 records a log of modifications to the primary file system 271 during the replication process for additional protection from an interruption that would require a reboot and recovery.

Figure 6:
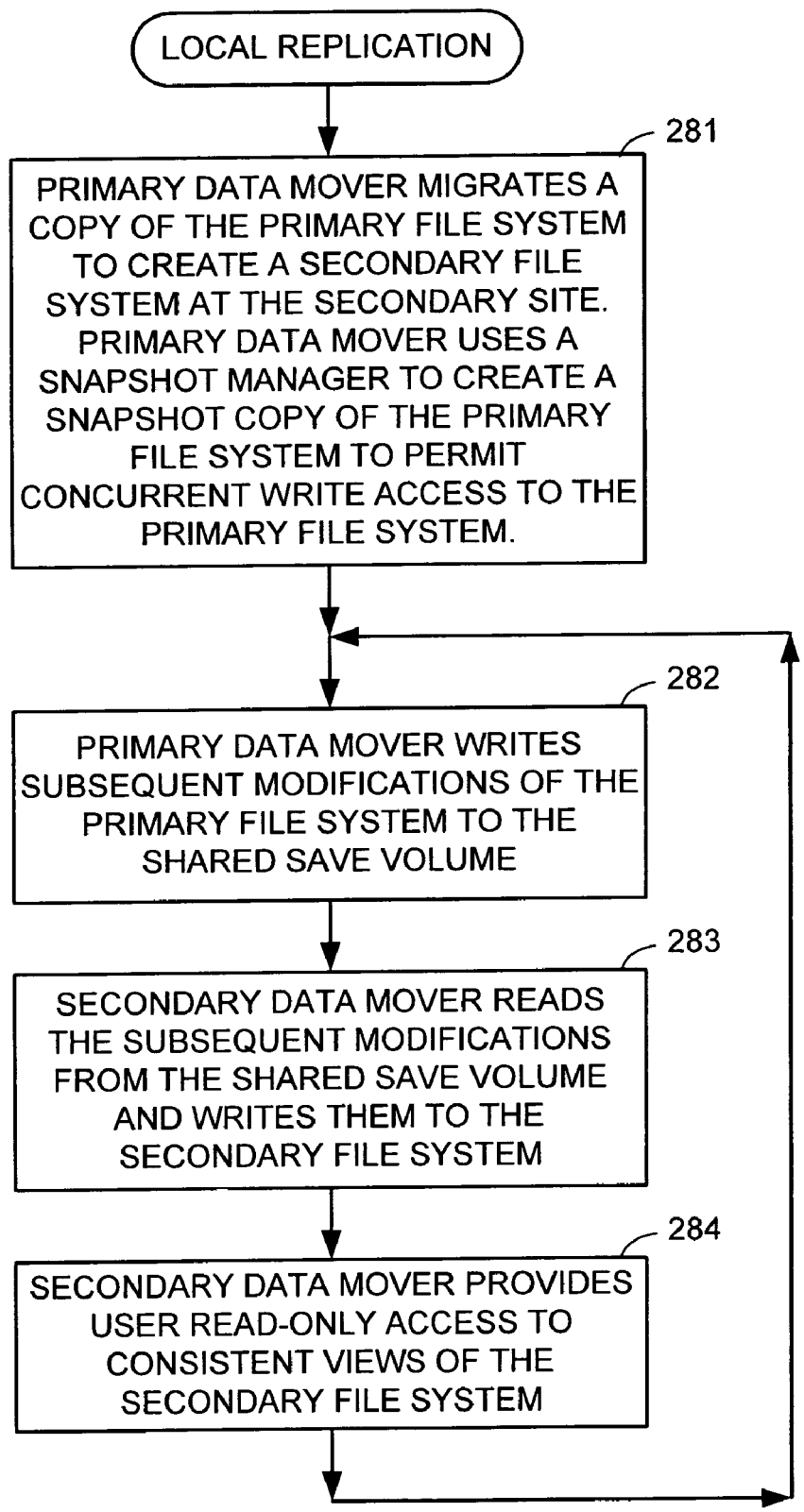
FIG. 6 is a flowchart showing local replication in the system of FIG. 4.

FIG. 6 shows a method of operating the system of FIG. 4 for local replication. In a first step 281, the primary data mover migrates a copy of the primary file system to create a secondary file system at the secondary site in such a way to permit concurrent write access to the primary file system. The migration, for example, may use the method shown in FIG. 17 of Ofek U.S. Pat. No. 5,901,327, in which a bit map indicates remote write pending blocks. Alternatively, the migration may use a snapshot copy mechanism, for example, as described in Kedem, U.S. Pat. No. 6,076,148, in which a bit map indicates the blocks that have changed since the time of snap-shotting of the primary file system. The snapshot method is preferred, because it is most compatible with the delta set technique for remote copy of subsequent modifications. For example, a snapshot manager creates a snapshot copy of the primary file system, as will be further described below with reference to FIGS. 25 to 27. The migration may involve taking a first snapshot copy of the primary file system, copying the first snapshot copy to the secondary file system, starting replication and creating a second snapshot copy of the primary file system, and then copying the differential between the first snapshot copy and the second snapshot copy from the primary file system to the secondary file system, in a fashion similar to that described further below with reference to steps 536 and 537 in FIG. 28. In any event, it is desired for the secondary file system to become a copy of the state of the primary file system existing at some point of time, with any subsequent modifications of the primary file system being transferred through the shared save volume.

In step 282, the primary data mover writes subsequent modifications of the primary file system to the shared save volume. In step 283, the secondary data mover reads the subsequent modifications from the shared save volume and writes them to the, secondary file system. In step 284, the secondary data mover provides user read-only access to consistent views of the secondary file system, by integrating the subsequent revisions into the secondary file system while providing concurrent read-only access to the secondary file system. This can be done by using a remote data facility to maintain a remote copy of a pair of delta volumes and to switch between the delta volumes as described in Suchitra Raman, et al., U.S. patent application Ser. No. 10/147,751 filed May 16, 2002, entitled "Replication of Remote Copy Data for Internet Protocol (IP) transmission, incorporated herein by reference. This can also be done by successively accumulating delta sets at the secondary, and accessing a block index or map of updated data blocks in the delta set.

Each delta set, for example, is a set of consistent updates to blocks of the secondary file system. The updated blocks are included in "delta chunks" transmitted from the primary file server to the secondary file server. Each delta set includes a number of delta chunks, and each delta chunk belongs to a single delta set. Each delta chunk is transmitted with a header including a generation count, a delta set number, and a chunk number within the delta set. When a delta set is accumulated, a block index or map is created to identify the updated blocks in the delta set. Once the delta set has been accumulated, a background integration process is started that writes the updates into the secondary file system, and the progress of the background process is recorded by updating the block index or map for the delta set when each updated block is written to the secondary file system. During the background process, read access to the secondary file system is permitted on a priority basis. For this read access to a specified block of the file system, the secondary file server first accesses the block index or map of the delta set, and if the specified block is in the delta set, the secondary file server returns the data of the block from the delta set. If the specified block is not in the delta set, then the secondary file server returns the data of the block from the secondary file system.

In FIG. 6, execution loops from step 284 back to step 282. In this fashion, the secondary file system is updated from the primary site concurrently with read-only access at the secondary site.

Figure 7:
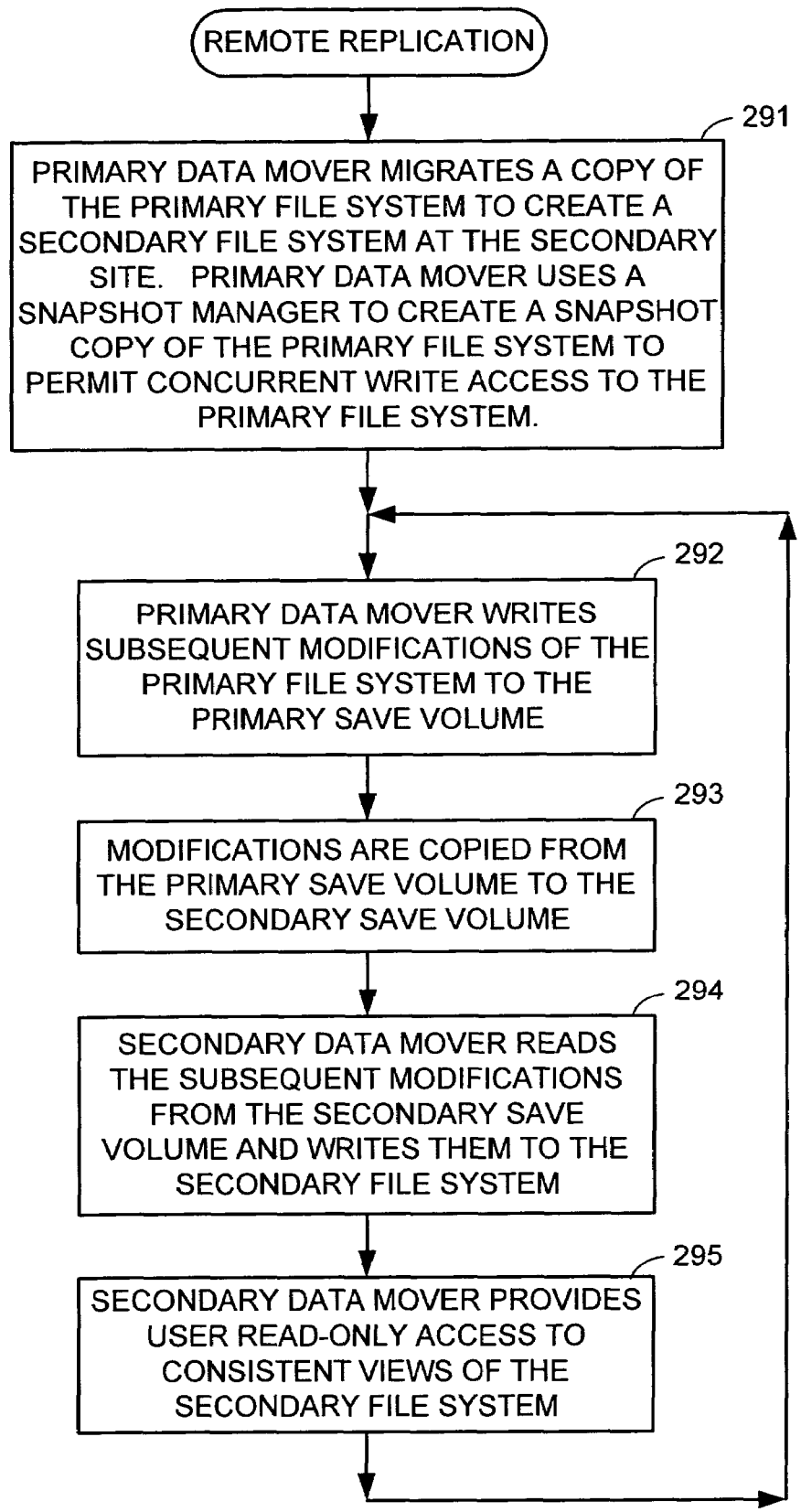
FIG. 7 is a flowchart showing remote replication in the system of FIG. 5.

FIG. 7 shows a method of operating the system of FIG. 5 for remote replication. In a first step 291, the primary data mover migrates a copy of the primary file system to create a secondary file system at the secondary site, in a fashion similar to step 281 in FIG. 6. In step 292, the primary data mover writes subsequent modifications of the primary file system to the primary save volume, in a fashion similar to step 282 in FIG. 6. In step 293, the modifications are copied from the primary save volume to the secondary save volume, by transmitting delta chunks. In step 294, the secondary data mover reads the modifications from the secondary save volume and writes them to the secondary file system. In step 295, the secondary data mover provides user read-only access to consistent views of the secondary file system, in a fashion similar to step 284 of FIG. 6. Execution loops from step 295 back to step 292. In this fashion, the secondary file system is remotely updated from the primary site concurrently with read-only access at the secondary site.

Figure 8:
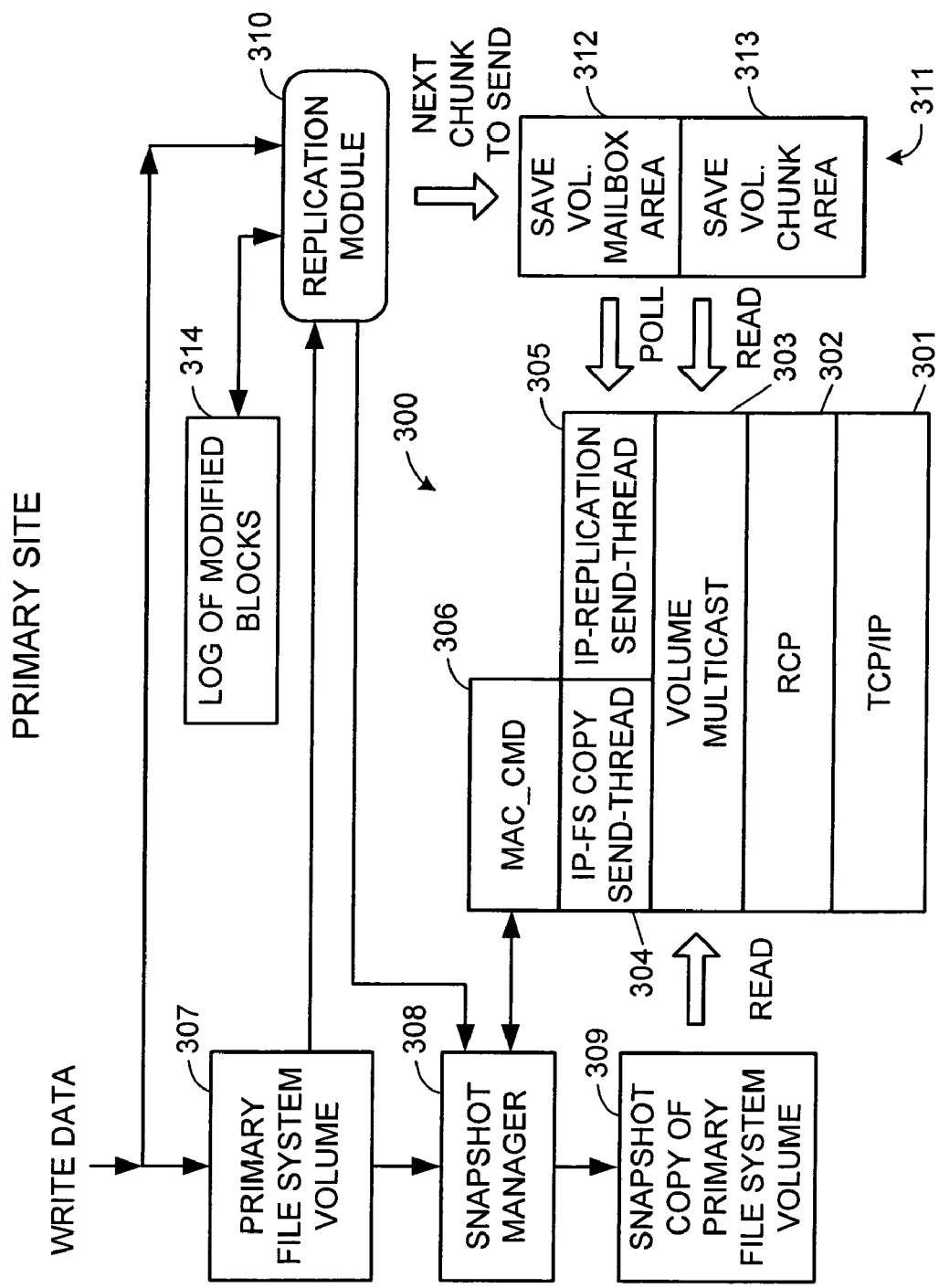
FIG. 8 is a block diagram of a primary site, including layered programming in a primary data mover.

FIG. 8 shows layered programming, 300 for a primary data mover. It is desired to use layered programming in accordance with the International Standard Organization's Open Systems Interconnection (ISO/OSI) model for networking protocols and distributed applications. As is well known in the art, this OSI model defines seven network layers, namely, the physical layer, the data link layer the network layer, the transport layer, the session layer, the presentation layer, and the application layer.

As shown in FIG. 8, the layered programming 300 includes a conventional TCP/IP transport layer 301. The layers above the TCP/IP transport layer 301 include a replication control protocol (RCP) session layer 302, a volume multicast presentation layer 303, and an IP-FS (file system) copy send-thread 304 and an IP-replication send-thread 305 at the program layer level. Over these program layers is a management and configuration command interpreter (MAC_CMD) 306 for system operator set-up, initiation, and supervisory control of the replication process.

In operation, the RCP layer 302 provides an application program interface (API) for multicasting data over TCP/IP. RCP provides callback, acknowledgement (ACK), and resumption of aborted transfers.

RCP provides the capability for a remote site to replicate and rebroadcast remote copy data. The remote site functions as a router when it rebroadcasts the remote copy data. RCP can also be used to replicate data locally within a group of data movers that share a data storage system.

To create a new remote copy in response to a supervisory command, the command interpreter 306 initiates execution of a replication module 310 if the replication module is not presently in an active mode. Then, the command interpreter 306 invokes a snapshot manager 308 to create a snapshot copy 309 of a primary file system volume 307. When the snapshot copy is created, the snapshot manager 308 obtains a current delta set number from the replication module 310 and inserts the current delta set number into the metadata of the snapshot. The current delta set number for the snapshot is all that the secondary needs to identify modifications that are made subsequent to the creation of the snapshot. In this fashion, any number of new remote copies can be created at various times during operation of the replication module, with the snapshot process operating concurrently and virtually independent of the replication module. For example, whenever synchronization of a remote copy is lost, for example due to a prolonged disruption of network traffic from the primary site to the remote site, a new remote copy can be created to replace the unsynchronized remote copy.

Once the snapshot copy 309 is accessible, the command interpreter 306 initiates execution of an instance of the IP-FS copy send-thread 304. The instance of the IP-FS copy send-thread 304 reads data from the snapshot copy 309 and calls upon the volume multicast layer 303 to multicast the remote copy data to all of the secondary data movers where the remote copies are to be created. This can be a copy by extent, so there is no copying of invalid or unused data blocks. For example, the volume multicast layer 303 is given a copy command (@vol., length) specifying a volume and an extent to be copied, and may also specify a group of destinations (an RCP group). The snapshot copy 309 of the primary file system identifies the next valid block to be copied, and the number of valid contiguous blocks following the next block. These blocks are copied at the logical level, so it does not matter what physical structure is used for storing the secondary file system at the secondary site. The copying is done locally, or by remote copy, for example by transporting the data block over IP. The volume multicast layer 303 invokes the RCP layer 302 to transport each data block.

During the remote copy process, whenever a modification is made to a block of the primary file system volume 307, the replication module 310 logs an indication of the modified block in a log 314 and later assembles the modification into a delta set chunk written to a primary save volume 311. The replication module 310 logs the indications in the log 314 on a priority or foreground basis as data is written to the primary file system volume 307, and also logs boundaries between delta sets. The replication module 310 later reads the log 314 to read the indicated modifications from the primary file system volume 307, assemble the indicated modifications into delta set chunks on a background basis, and store the delta set chunks in a save volume chunk area of the save volume 311. For example, the log is in the form of a queue of two bit-map tables, a new one of the tables being written to coincident with write operations upon the primary file system volume 307, and an old one of the tables being read to determine blocks to copy from the primary file system to create a new delta set in the save volume 311. When the delta set chunks become available for distribution from the save volume 311, the replication module 310 updates the save volume mailbox area 312 by storing each delta set chunk definition (@vol., length).

The IP-replication send-thread instance 305 polls the save volume mailbox area 312 to see if any delta set chunks have been stored in the save volume chunk area 313. If so, then the thread instance calls upon the volume multicast layer 303 to multicast the delta set chunks to the data movers that manage the storage of the respective remote file system copies. For example, for each delta set chunk, the IP-replication send-thread instance 305 issues a volume multicast command to the volume multicast layer 303. When the chunk multicast is completed, the IP-replication send-thread instance 305 updates its context on the save volume 311 in the mailbox area 312. At reboot after an interruption of multicast of a chunk, the IP-replication send-thread instance is able to restart the multicast of the chunk. The IP-replication send-thread instance also is responsible for retrying transmission of the chunk whenever the connection with the secondary is interrupted.

Figure 9:
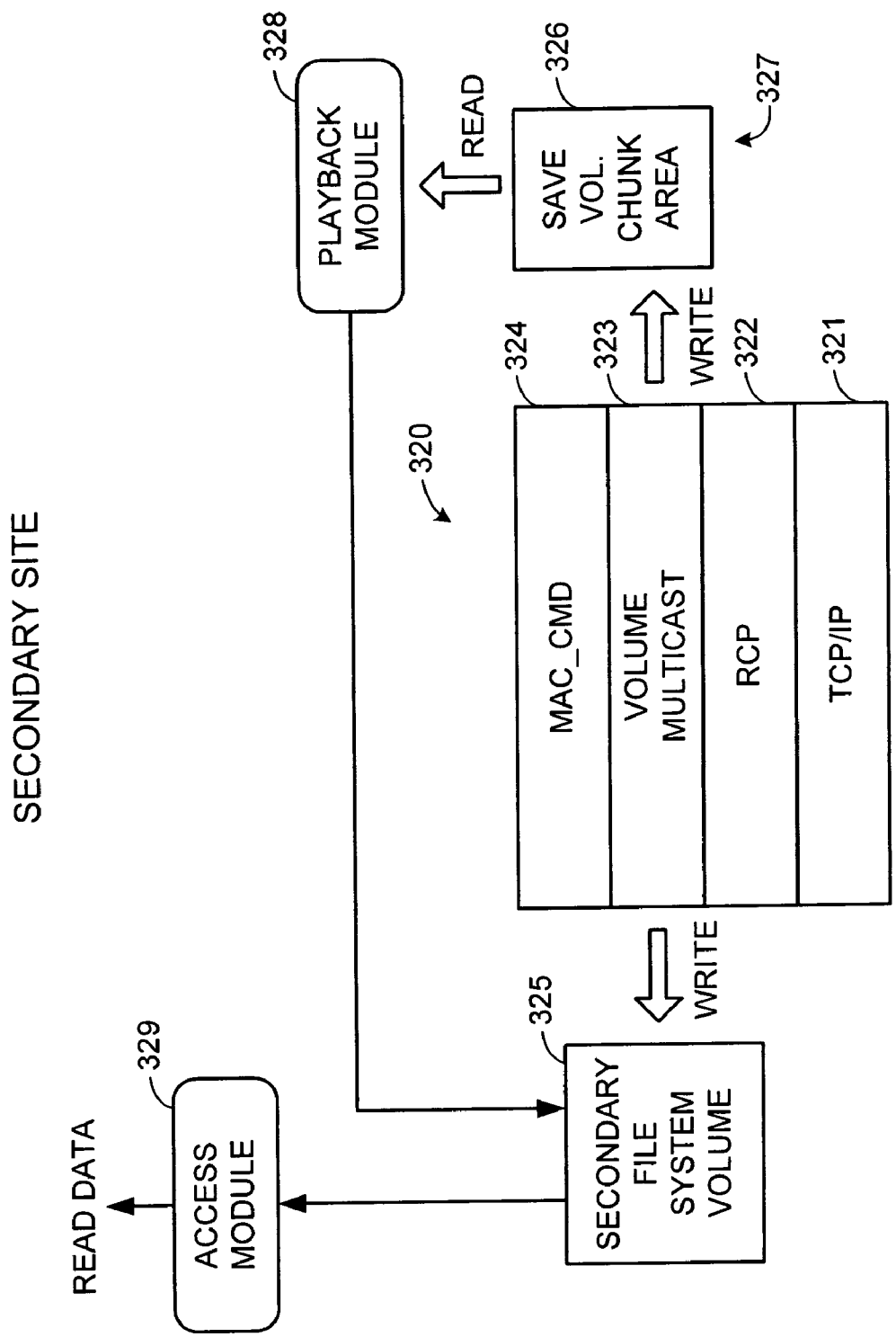
FIG. 9 is a block diagram of a secondary site, including layered programming in a secondary data mover.

FIG. 9 shows the layered programming 320 for a secondary data mover. The programming includes a TCP/IP layer 321, an RCP layer 322, a volume multicast layer 323, and a management and configuration command interpreter (MAC_CMD) 324. During creation of a new remote copy in a secondary file system volume 325, the volume multicast layer 323 writes remote copy data from the primary data mover to the secondary file system volume 325, and concurrently writes modifications (delta set chunks) from the primary data mover to a save volume chunk area 326 of a secondary save volume 327.

A header for the changes in a next version of the delta set is sent last, because there is no guarantee of the order of receipt of the P packets. The header of the delta set includes a generation count, the number of delta blocks for the next version of the delta set, a checksum for the header, and a checksum for the data of all the delta blocks. The receiver checks whether all of the changes indicated in the header have been received.

Once a complete remote snapshot copy has been reconstructed in the secondary file system volume 325, a playback module 328 is activated to read the modifications from the save volume chunk area 326 and integrates them into the secondary file system volume 325. From each delta-set chunk in the save volume area 326, the playback module 328 gets the block address and number of contiguous blocks to be written to the, secondary file system volume. An access module 329 provides read-only access to a consistent view of the secondary file system in the secondary file system volume 325.

Figure 10:
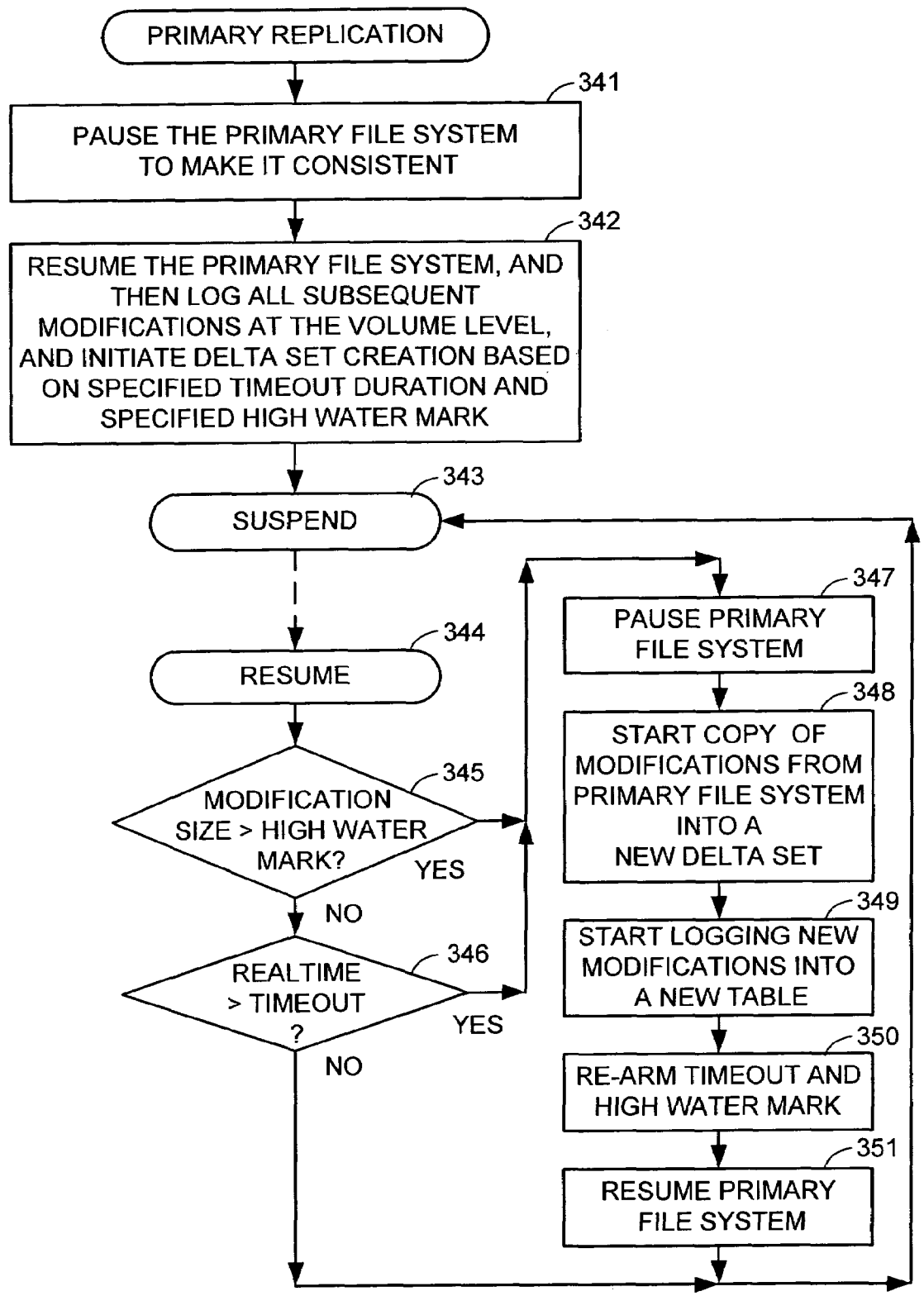
FIG. 10 is a flowchart of a process of replication at the primary site of FIG. 8.

FIG. 10 shows a procedure executed by the primary site of FIG. 8 to perform replication of the primary file system. When replication is started in a first step 341, the primary file system is paused to make it consistent. Migration of the primary file system to the secondaries can then be started using a remote copy facility or snapshot manager. Then, in step 342, concurrent write access to the primary file system is resumed, and all modifications made on the primary file system are logged at the volume level on a priority or foreground basis when each modification is made. In addition, a background process of delta-set creation is initiated.

Two configurable triggers specify the rate of delta set creation: a timeout parameter and a high water mark parameter. Whenever delta set creation is initiated, the current time, as indicated by a real-time clock, is added to a configurable timeout interval to produce the timeout parameter. The high water mark specifies an amount of modified data, in megabytes. The first trigger that occurs will trigger the creation of a delta set. The replication module creates the delta set by pausing the primary file system, copying the modified blocks from the primary file system to the delta set volume, and then resuming the primary file system. By logging indications of the modified blocks and later copying the modified blocks, multiple modifications to the same block are represented and transported once during a single delta set.

In step 343, the background process of delta set creation is temporarily suspended, for example, by placing the process on a task queue that is periodically serviced. In step 344, execution of the delta set creation process is resumed. In step 345, the modification size is compared to the high water mark. If the high water mark is not exceeded, then execution continues to step 346. In step 346, the present value of the real-time clock is compared to the timeout parameter. If the timeout parameter has not been exceeded, then execution loops back to step 343. Otherwise, execution continues to step 347. Execution also branches to step 347 from step 345 if the modification size is greater than the high water mark.

In step 347, the primary file system is paused. In step 348, a new delta set is created by starting the copying of modified blocks from the primary file system volume to the new delta set. In step 349, the logging of new modifications into a new table is started. In step 350, the time-out and high water mark is re-armed. In other words, a new value for the timeout parameter is computed as the current real time plus the configurable timeout interval, and the modification size is reset to indicate the size of the new modifications. In step 351, the primary file system is resumed. Execution loops from step 351 back to step 343 to suspend the background process of delta set creation.

To maintain the consistency of the delta set created in the primary save volume, the primary file system could remain paused and not resumed in step 351 until the copy process begun in step 348 is completed. Preferably, however, the copy process begun in step 348 is a snapshot copy process, so that write access to the primary file system may resume in step 351 before the copy process has been completed. For the example of the modification log being a queue of two bit-map tables, when a write access to a block in the primary file system is requested, the old bit map is accessed on a priority basis. If the corresponding bit in the old bit map indicates a modified block in the primary file system volume not yet copied to the save volume, then it is copied on a priority basis to the save, volume before the new write data is written to the primary file system volume. As soon as a modified block has been copied from the primary file system volume to the save volume, the corresponding bit in the old bit map is cleared. In this fashion, at the completion of the copy process, the entire old table will be in a reset state, ready to be used as the next new table.

When the copy process started in step 348 is completed, the replication module sets the save volume mailbox area to show that a new delta set is ready for transmission. Upon polling the mailbox area, the P-replication send-thread finds that the new delta set is ready for transmission, and invokes the volume multicast layer to transmit the delta set to the secondary sites. After step 351, execution loops back to step 343.

Figure 11:
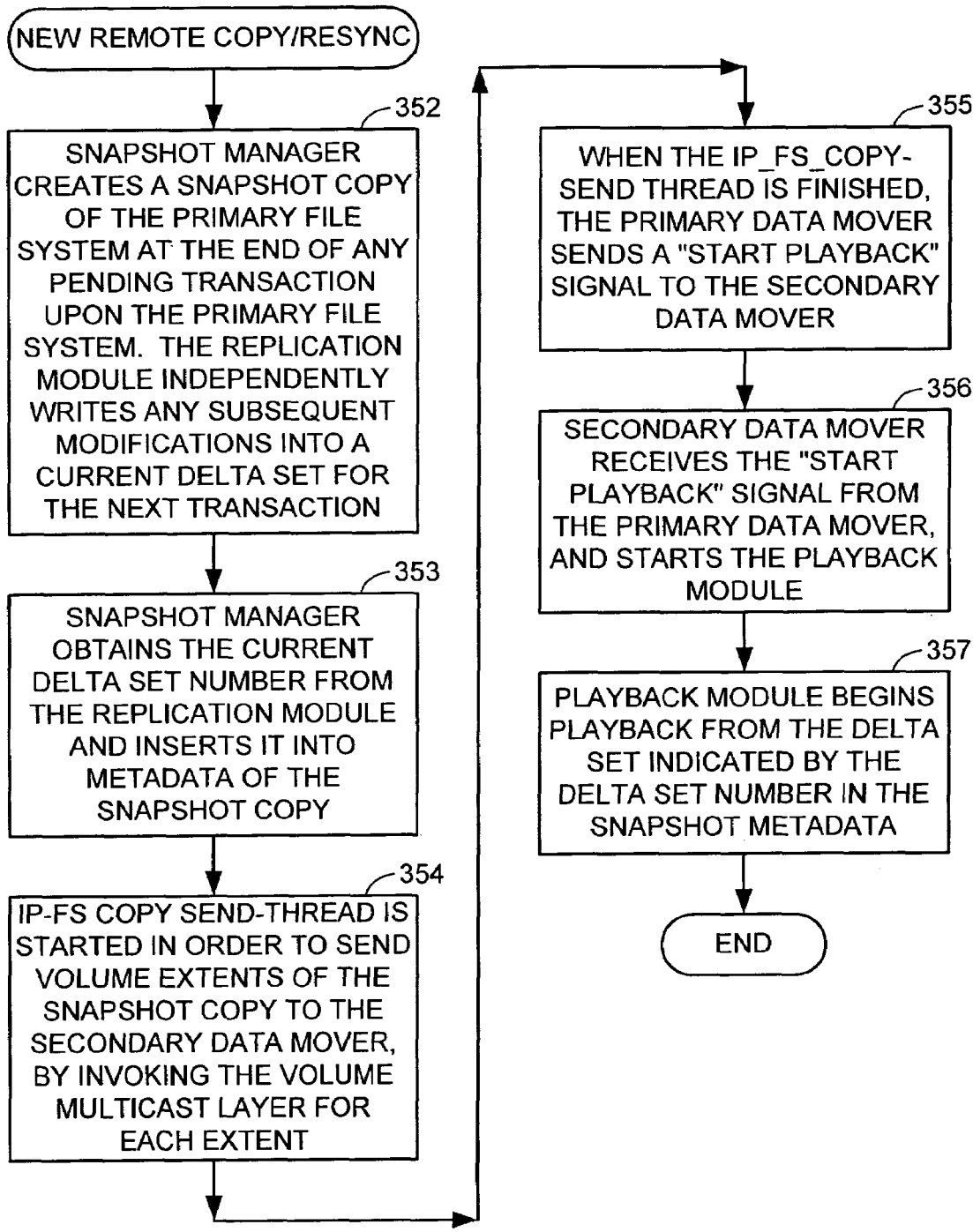
FIG. 11 is a flowchart of a procedure for producing a new remote copy of a primary file system concurrent with ongoing replication and multicasting of modifications to the primary file system.

FIG. 11 shows a flow chart of the overall procedure of creating a new remote copy, either for the first time at a secondary site or as a replacement for a remote copy that needs to be resynchronized with the primary file system. In a first step 352, the snapshot manager creates a snapshot copy of the primary file system at the end of any pending transaction upon the primary file system (e.g., when the primary file system becomes consistent after it is paused in step 341 of FIG. 10 or in step 347 of FIG. 10.) The replication module independently writes any subsequent modifications into a current delta set for the next transaction.

In step 353, the snapshot manager obtains the current delta set number from the replication module and inserts it into metadata of the snapshot copy. In step 354, the IP-FS copy send-thread is started in order to send volume extents of the snapshot copy to the secondary data mover, by invoking the Volume multicast layer for each extent.

In step 355, when the IP-FS copy send-thread is finished, the primary data mover sends a "start playback" signal to the secondary data mover. In step 356, the secondary data mover receives the "start playback" signal from the primary data mover, and starts the playback module. In step 357, playback module begins playback from the delta set indicated by the delta set number in the snapshot metadata.

The playback module (328 in FIG. 23) at the secondary site integrates the delta set modifications into secondary file system. Each time that a new delta set appears in the secondary save volume, the modifications can be integrated into the secondary file system, for example, by pausing the secondary file system, copying the modifications from the secondary save volume into the secondary file system, and resuming the secondary file system. Alternatively, a timeout interval and a high water mark value can be configured for the secondary site, so that the modifications may be integrated into the secondary file system at a rate less frequent than the rate at which the new delta sets appear in the secondary save volume. In this case, the modifications from the secondary save volume would not be integrated into the secondary file system until the timeout time is reached unless the amount of modifications in the save volume reaches the high water mark. As described above, the integration of the modifications can be performed concurrently with read-only access to a consistent view of the secondary file system.

Figure 12:
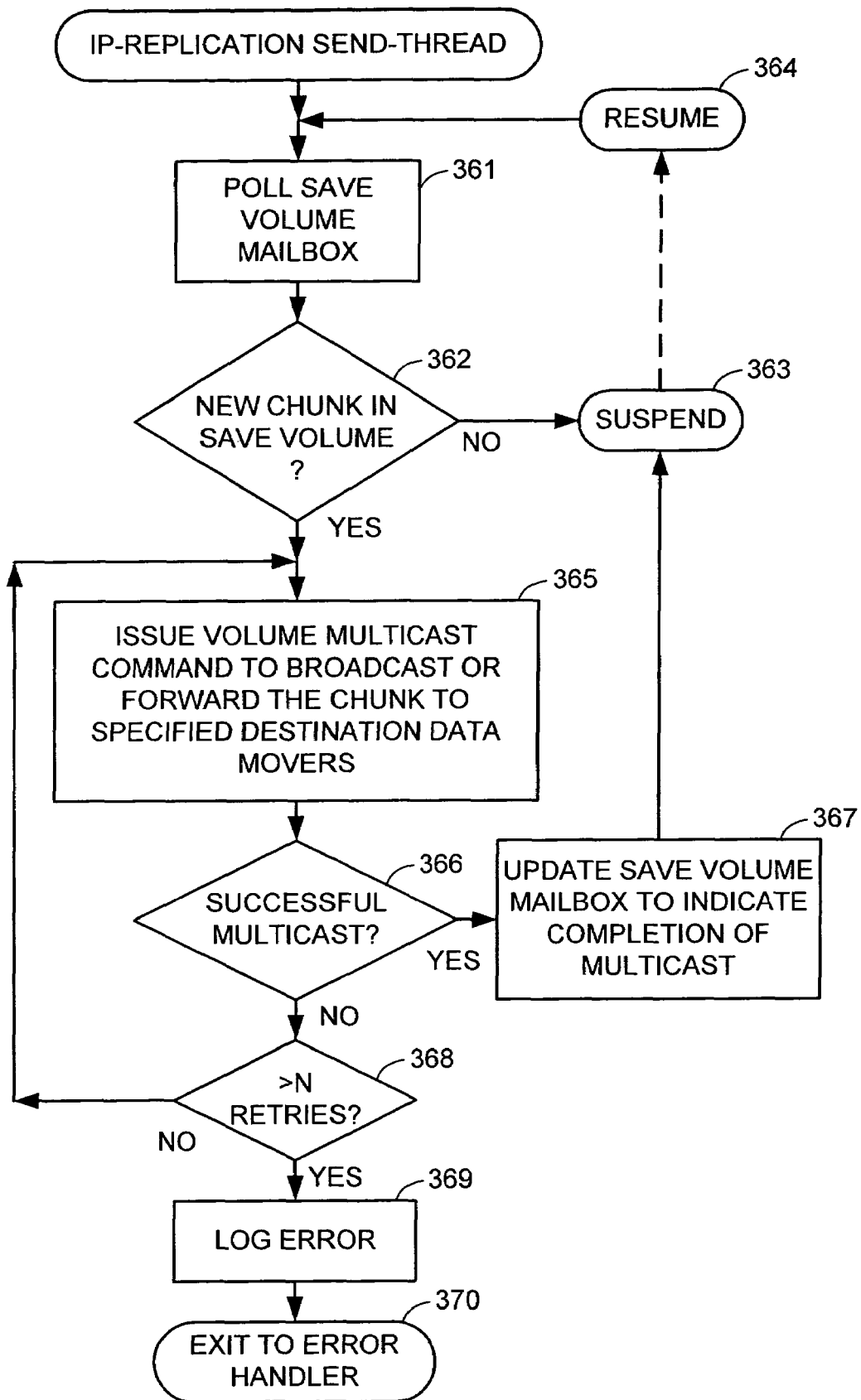
FIG. 12 is a flowchart of an IP-replication send-thread introduced in FIG. 8.

FIG. 12 shows a flowchart of the P-replication send-thread (305 in FIG. 8). In a first step 361, the thread polls the primary save volume mailbox area. If the mailbox area indicates that there is not a new delta set chunk in the primary save volume area, then the thread is finished for the present task invocation interval. Execution of the thread is suspended in step 363, and resumed in step 364 at the next task invocation interval.

If the mailbox area indicates that there is a new delta set chunk in the primary save volume, then execution continues from, step 362 to step 365. In step 365, the IP-replication send-thread issues a volume, multicast command to broadcast or forward the delta set chunk to specified destination data movers. In step 366, if the multicast has been successful, then execution branches to step 367. In step 367, the IP-replication send-thread updates the primary save volume mailbox to indicate completion of the multicast, and execution continues to step 363 to suspend execution of the thread until the next task invocation interval.

In step 366, if the multicast is not successful, then execution continues to step 368 to test whether more than a certain number (N) of retries have been attempted. If not, then execution loops back to step 365 to retry the multicast of step 365. If more than N retries have been attempted, then execution continues from step 368 to step 369. In step 369, the IP-replication send-thread logs the error, and then in step 370, passes execution to an error handler.

Figure 13:
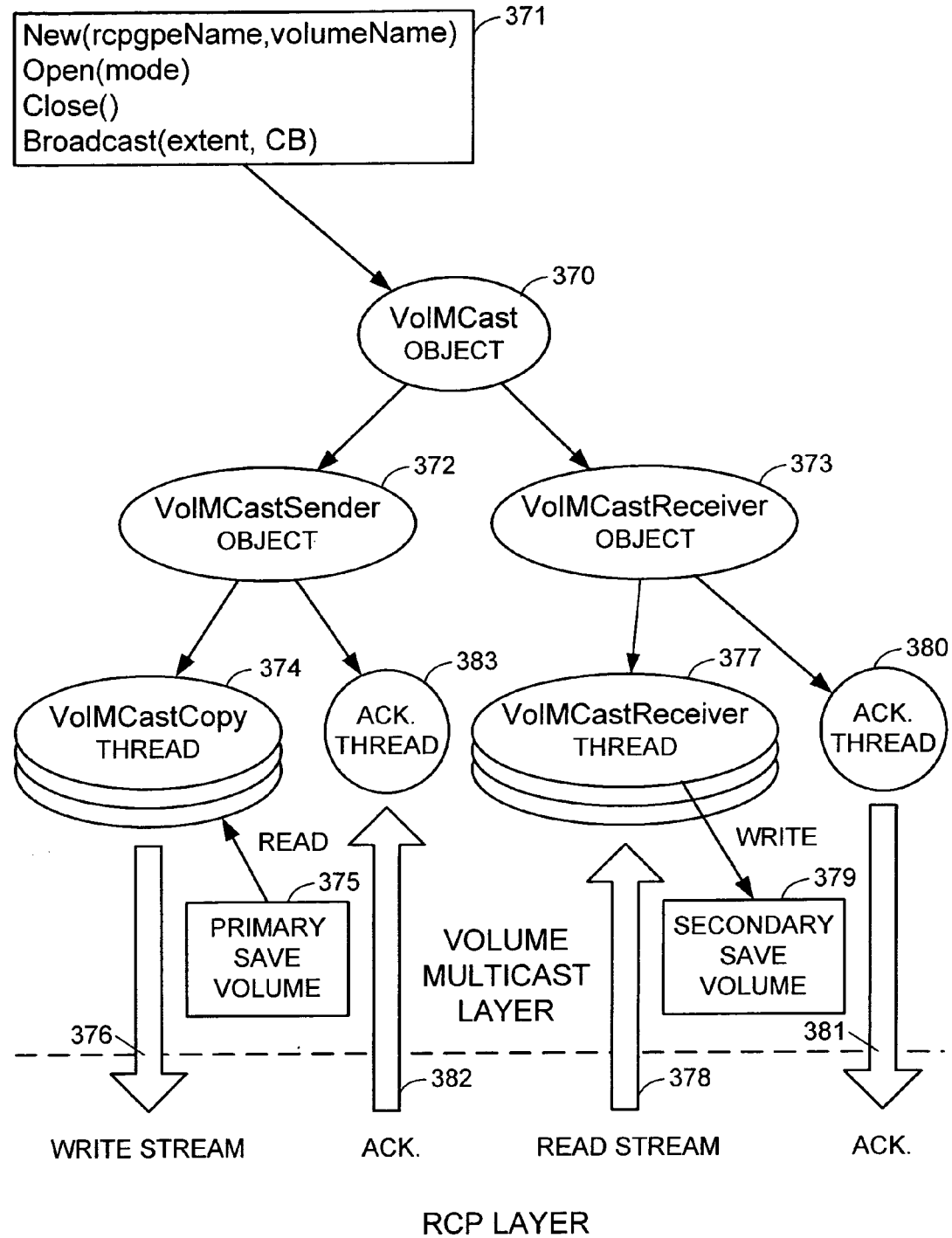
FIG. 13 is a block diagram of a volume multicast level in the data mover programming of FIG. 8 and FIG. 9.

FIG. 13 shows various objects defined by the volume multicast layer. The volume multicast layer provides multicast service to instances of a VolMCast object 370 representing a volume multicast relationship between a respective primary file system volume specified by a volume name (volumeName) and a respective group of secondary data movers specified by an RCP group name (rcpgpeName). For example, at configuration time, one or more RCP groups are defined in response to configuration commands such as:

.RCP_config<server_name>add<IP>

This configuration command adds the IP address (IP) of a specified destination data mover (server_name) to an RCP group.

Also at configuration time, a specified data mover can be defined to be a primary data mover with respect to the RCP group (a relationship called a MultiCastNode) in response to a configuration command such as:

.server_config<server-name>rep<groupname>add<IP> where "server_name" is the name for the primary data mover, "groupname" is the name of a configured RCP group, and "IP" is the IP address of the primary data mover. When configuration of the MultiCastNode object is finished, the MultiCastNode object will have its own name, a name for the primary data mover, an RCP group name, and a list of IP addresses to which the primary server should broadcast in order to transmit IP packets to all the secondary data movers in the RCP group.

The VolMCast object can then be built on top of a MultiCastNode object. The additional information required for the VolMCast object is, on the sender side, the primary or source file system volume and on each receiver side, the secondary or destination file system volume. For flexibility, it is permitted to specify a different volume name on each secondary data mover. By specifying the destination volume names during creation of the VolMCast object, it is not necessary to specify the destination volume names at each copy time. For example, the VolMCast object is defined by configuration commands to the primary data mover such as:

.server_config <server_name> "volmcast MultiCastNodeName> [ -src | -dest ] volume"

where <server_name> is the name of the MultiCast Node.

Once the VolMCast object has been defined, an IP-replication service can be configured for the object upon the primary data mover. Then the primary data mover will respond to commands for starting the replication service and stopping the replication service upon the VolMCast object. When replication is stopped on a secondary, the secondary file system is left in a consistent state. In other words, if a replay was in progress, the stop will complete when the replay is finished.

The primary data mover may respond to additional commands for create a new delta set on demand, updating the replication policy (high water mark and timeout interval parameters) on the primary file system or secondary file systems, and defining persistency of the replication process upon remount or reboot of the primary file system or any one of the secondary file systems. For example, at reboot the replication service is re-started on the primary file system and the secondary file system in the state it was at unmount or shutdown. A recovery of the replication context happens at reboot or on remount. The replica recovery is executed before the primary and secondary file systems are made available for user access. This allows all modifications during the recovery of the primary file system to be logged by the replication service.

As shown in FIG. 13, the volume multicast layer is responsive to a number of commands 371 from higher layers in the protocol stack. In addition to the configuration commands for defining a new VolMCast object relating a specified primary file system volume to a specified RCP group, an existing VolMCast object can be opened for either a sender mode or a receiver mode. An opened VolMCast object can be closed. Once a VolMCast object has been opened in a sender mode, it can be called upon to broadcast a control block (CB) to the secondary volumes of the VolMCast object, such as a control block specifying a remote copy of a specified extent of the primary volume.

Control blocks may specify various operations upon the secondary volumes of the VolMCast object, such as cluster file system commands for performing operations such as invalidations, deletions, renaming, or other changes in the configuration of the objects of the file system upon all copies (local or remote) of the file system. In this case, RCP is used for the broadcast or forwarding of the cluster file system commands to all the data movers that are to operate upon the local or remote copies of the file system, and for returning acknowledgement of completion of the operations upon all of the copies of the file system.

With reference to FIG. 13, the volume multicast layer defines a VolMCastSender object 372 instantiated when a VolMCast instance is opened in the sending mode, and a VolMCastReceiver object 373 instantiated when a VolMCast instance is opened in a receiving mode. The VolMCastSender object class and the VolMCastReceiver object class inherit properties of the VolMCast object class. When the volume multicast layer is called upon in a primary data mover to maintain remote "copies of a specified extent of a VolMCastSender instance, an instance of a VolMCastCopy thread 374 is created and executed. The VolMCastCopy thread instance accesses the delta sets from a primary save volume 375 to produce a write stream 376 of blocks sent down to the RCP layer. At the secondary data mover, an instance of a VolMCastReceiver thread 377 is instantiated and executed to receive a read stream 378 of blocks and write the copied delta sets into a secondary save volume 379. An instance of an acknowledgement thread 380 returns an acknowledgement 381 of completion of copying of a delta-set for an extent to the secondary file system. The acknowledgement is sent down to the RCP layer of the secondary data mover. At the primary, the RCP layer sends the acknowledgement 382 to an instance of an acknowledgement thread 383.

RCP is a session-layer protocol, for replication from one primary to multiple secondary sites. Control is initiated by the primary, except when recovering from aborted transfers. RCP uses TCP between the primary and secondary for control and data. Network distribution is by an application-level multicast (ALM) using the RCP as a forwarder. Port sharing with HTTP is used for crossing firewalls.

RCP may support other replication applications in addition to 1-to-N IP-based replication for wide-area distribution of read-only data. These other applications include 1-to-N volume mirroring, cluster file system commands, remote file system replication, and distribution and replication of other commands that may be recognized by the data movers.

The 1-to-N volume mirroring is a simplification of to 1-to-N IP-based replication for wide-area distribution of read-only data, because the volume mirroring need not synchronize a remote volume with any consistent version of the primary volume until the remote volume needs to be accessed for recovery purposes.

Remote file system replication also uses RCP for broadcast or forwarding an application command to a remote data mover to initiate a replication of a file system managed by the remote data mover. In a similar fashion, RCP may broadcast or forward other commands recognized by data movers, such as iSCSI or remote-control type commands for archival storage. For example, RCP could broadcast or forward remote control commands of the kind described in Dunham, U.S. Pat. No. 6,353,878 issued Mar. 5, 2002 entitled "Remote Control of Backup Media in a Secondary Storage Subsystem Through Access to a Primary Storage Subsystem," incorporated herein by reference.

The RCP forwarder is composed of two RCP sessions, an outbound session at the primary, and an inbound session at the secondary. The inbound RCP session receives a group name and looks up the group in a routing table. If routes for the group exist in the routing table, then an RCP forwarder is created at the secondary, including a data path by pointer passing from an "in" session to an "out" session.

An RCP group may be configured to include application-level multicast (ALM) topology. For example, ALM route configuration commands begin with an identifier number for the network file server ("cel") that contains the forwarder data mover, and an identifier number ("ser") for the forwarder data mover in the network server. The configuration commands end with a "nexthop" specification of an immediate destination data mover:

cel1-ser2: reproute add group=g1 nexthop=cell2-ser2
cel2-ser2: reproute add group=g1 nexthop=cell2-ser3
cel2-ser2: reproute add group=g1 nexthop=cell2-ser4

In effect, the forwarder data mover adds the "nexthop" specification to an entry for the RCP group in the routing table in the forwarder data mover. This entire entry can be displayed by the following configuration command:

cel2-ser2: reproute display

The entry is displayed, for example, as a list of the "nexthop" destination data movers. The entry can be deleted by the following configuration command:

cel2-ser2: reproute delete

Each immediate destination data mover may itself be configured as a forwarder in the RCP group. In this case, RCP commands and data will be forwarded more than once, through a chain of forwarders. The set of possible RCP routes from a primary or forwarder in effect becomes a tree or hierarchy of destinations.

The ALM commands may also include commands for creating sessions and sending control blocks or data. For example, the following ALM command creates a session and sends application data to all destinations in group "g1" from cell1-ser2 from a file (named "filename") using a test application (named "rcpfiletest").

cel1-ser2: repfiletest data=filename group=g1

Figure 14:
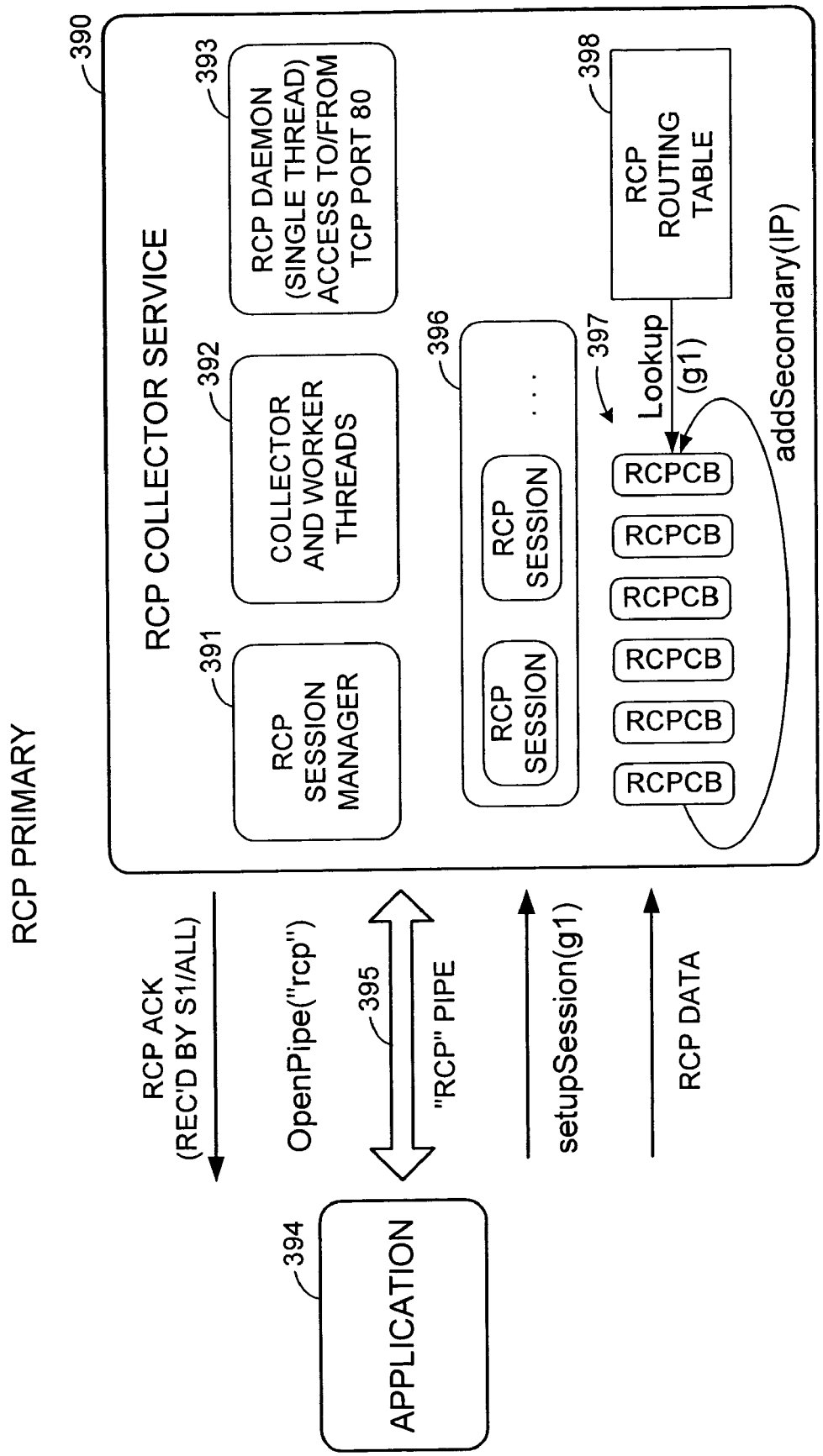
FIG. 14 is a block diagram of the RCP level in the primary data mover programming of FIG. 8.

FIG. 14 shows the RCP collector,service 390 at a primary site. The programming for the RCP collector service includes an RCP session manager 391, collector and worker threads 392, and a single-thread RCP daemon 393. The RCP session manager 391 responds to requests from higher levels in the protocol stack, such as a request from an application 394 to open an RCP pipe 395 between the application 394 and the RCP collector service 390. The application 394 may then send to the session manager 391 requests to setup sessions with RCP groups. A session queue 396 stores the state of each session, and a control block queue 397 keeps track of control blocks sent via TCP/IP to the secondary data movers in the RCP groups. An RCP routing table 398 identifies the immediate destinations of each RCP group to which the TCP/IP messages from the RCP collection service are to be sent, as well as any other destinations to which the messages will be forwarded. For communication of the TCP/IP messages between the RCP service and the network, TCP port :80 is opened in both directions (i.e., for input and output). The single thread RCP daemon 393 is used for interfacing with this TCP port :80.

Figure 15:
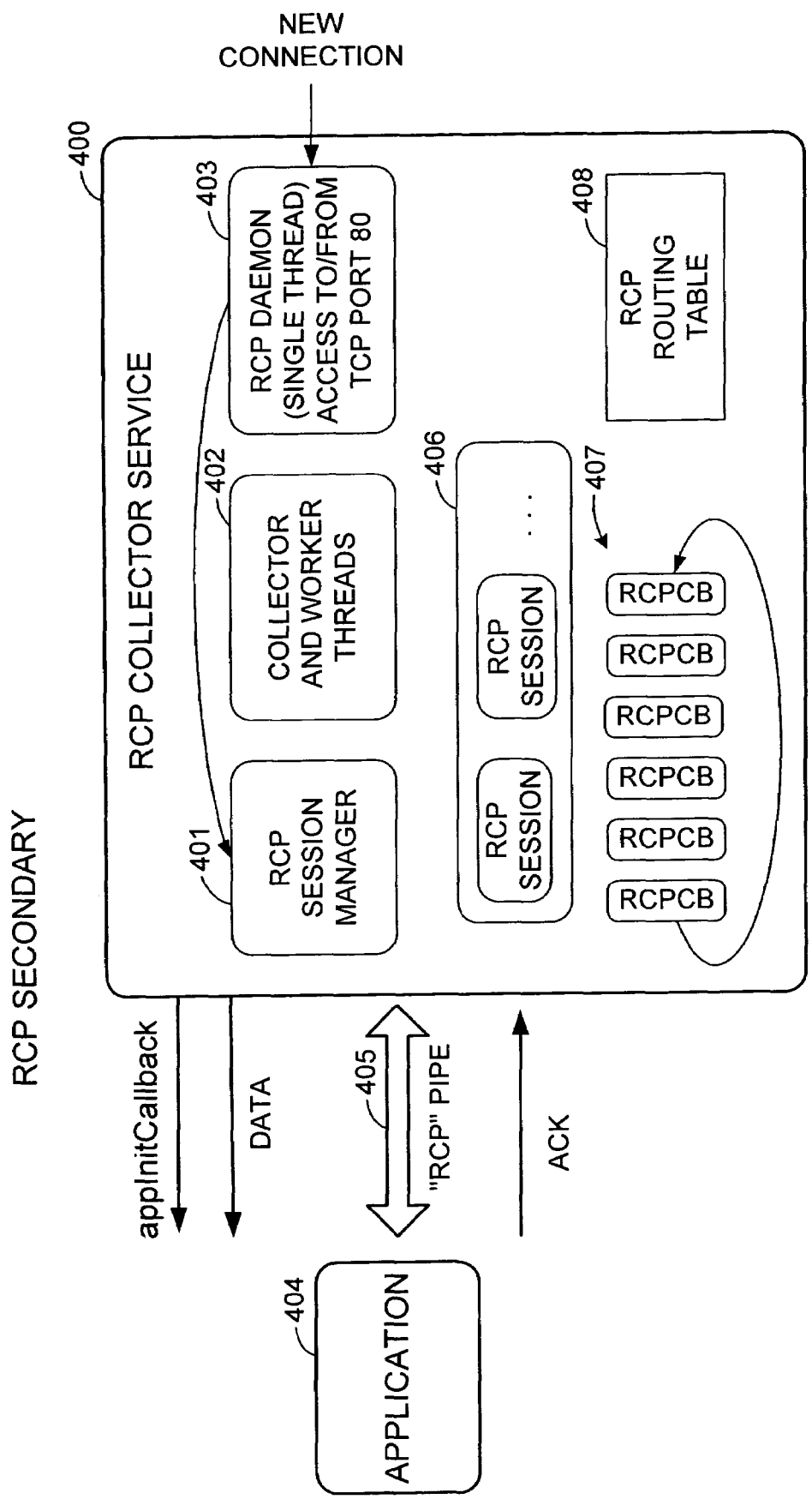
FIG. 15 is a block diagram of the RCP level in the secondary data mover programming of FIG. 9.

FIG. 15 shows the RCP collector service 400 at a secondary site. The RCP collector service at the secondary site is similar to the RCP collector service at the primary site, in that it includes an RCP session manager 401, collector and worker threads 402, a single thread RCP daemon 403 for access to/from TCP port :80, an RCP session state queue 406, an RCP control block queue 407, and an RCP routing table 408. The primary difference between the RCP collector service at the secondary site from the RCP collector service at the primary site is in the collector and worker threads 402. At the RCP secondary, the RCP commands and data are received from the TCP port :80 instead of from the application 404. The application 404 is the consumer of the RCP data, instead of a source for RCP data. The RCP collector service 400 at the secondary site may also serve as a forwarder for RCP commands, and therefore the RCP collector service and worker threads 402 at the secondary site include a forwarder thread that does not have a similar or complementary thread,in the RCP collector service at the primary site.

In operation, an application 404 can initialize the RCP collector service so that the RCP collector service will call back the application upon receipt of certain RCP commands from TCP port :80. For example, if a new connection command is received from TCP port :80, then the RCP daemon 403 forwards the new connection command to the RCP session manager. The RCP session manager 401 recognizes that this connection command is associated with an application 404 at the secondary site, opens an RCP pipe 405 to this application, and calls the application 404 indicating that the RCP pipe 405 has been opened for the RCP session. (The volume multicast receiver thread 377 of FIG. 13 is an example of such an application.) The application 404 returns an acknowledgement. If the new connection is for a new RCP session, then the session manager creates a new RCP session, and places state information for the new session on the RCP session queue 406. RCP control blocks and data may be received for the session from the TCP port :80. The data may be forwarded to the application, or to a file specified by the application. RCP control blocks to be executed by the RCP collector service 400 may be temporarily placed on the control block queue 407. RCP control blocks or data intended for other secondary site may be forwarded to the intended secondary sites.

Figure 16:
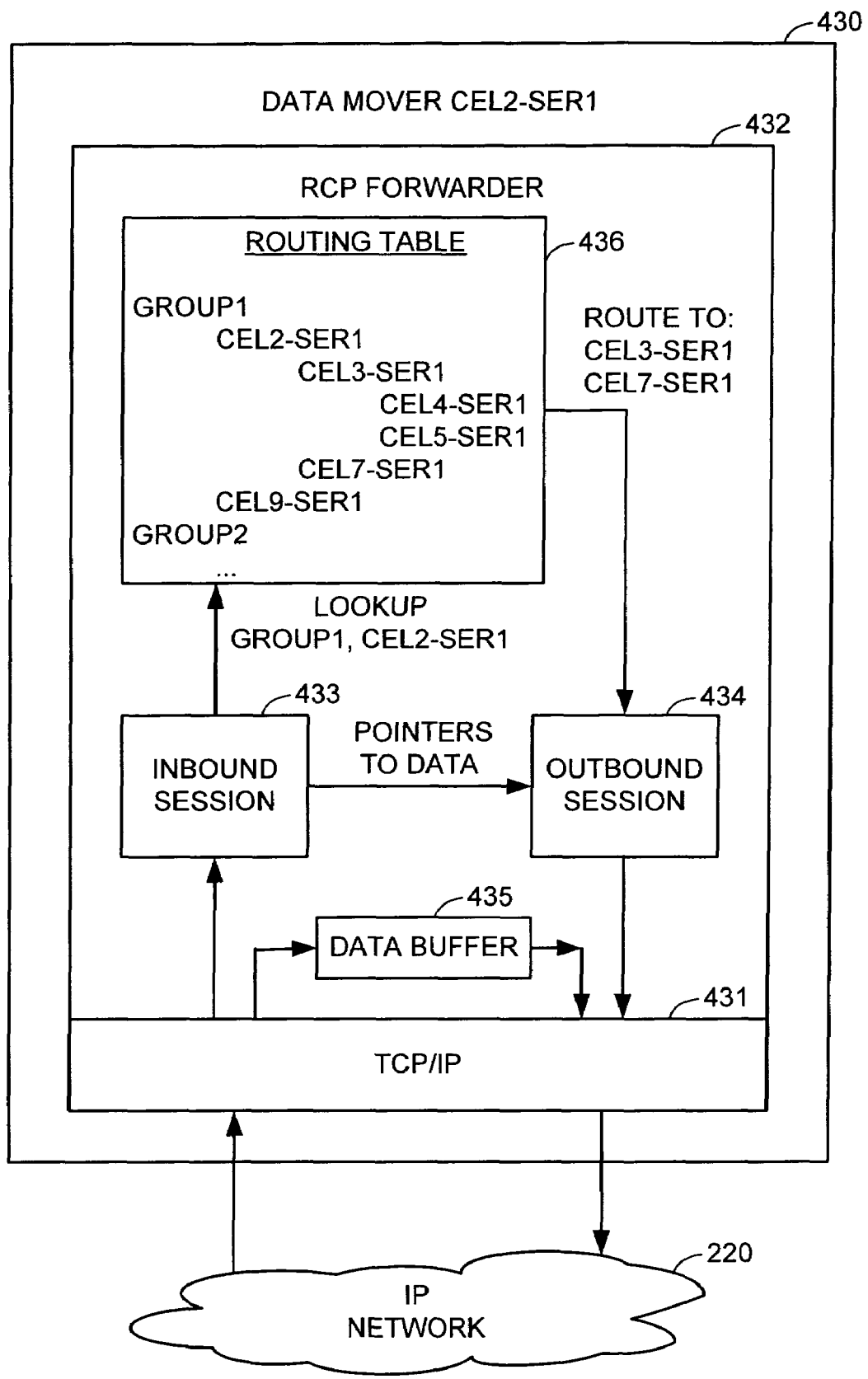
FIG. 16 is a block diagram of a RPC forwarder at the RPC level in a forwarder data mover.

FIG. 16 shows further details of the forwarding of RCP commands and data by a data mover 430 identified as Cel2-Ser1. The data mover 430 is programmed with a TCP/IP layer 431 for communication with the IP network 220, and an RCP layer 432 over the TCP/IP layer. For forwarding the RCP commands and data, the RCP layer 432 creates an inbound session 433 and an outbound session 434. The inbound session 433 receives RCP commands from the TCP/IP layer 431. The TCP/IP data stream is retained in a data buffer 435. When an RCP command calls for the forwarding of RCP commands or data to another data mover in a specified RCP group, the inbound session 433 performs a lookup for the group in a routing table 436.

In the example of FIG. 16, the routing table 436 includes a copy of all of the routing information for each group of which the data mover 430 is a member. In this case, for GROUP1, the primary data mover sends RCP commands to at least data movers CEL2-SER1 and CEL9-SER1. CEL2-SER1 (i.e., the data mover 430) forwards the RCP commands and RCP data to data movers CEL3-SER1 and CEL7-SER1. In particular, the inbound session 433 creates an outbound session 434 and creates a TCP/IP data path from the inbound session 433 to the outbound session 434 by passing pointers to the data in the data buffer. The outbound session 434 invokes the RCP/IP layer 431 to multicast the TCP data stream in the data buffer 435 over the IP network 220 to the data movers CEL3-SER1 and CEL7-SER1.

The data mover CEL3-SER1 in succession forwards the RCP commands to data movers CEL4-SER1 and CEL5-SER1. Normally, the data mover CEL2-SER1 (430) does not need to know that the data mover CEL3-SER1 forwards the RCP commands to data movers CEL4-SER1 and CEL5-

SER1, but if the data mover CEL2-SER1 (430) would fail to receive an acknowledgement from CEL3-SER1, then the data mover CEL2-SER1 could minimize the impact of a failure of CEL3-SER1 by forwarding the RCP commands to CEL4-SER1 and CEL5-SER1 until the failure of CEL3-SER1 could be corrected.

Figure 17:
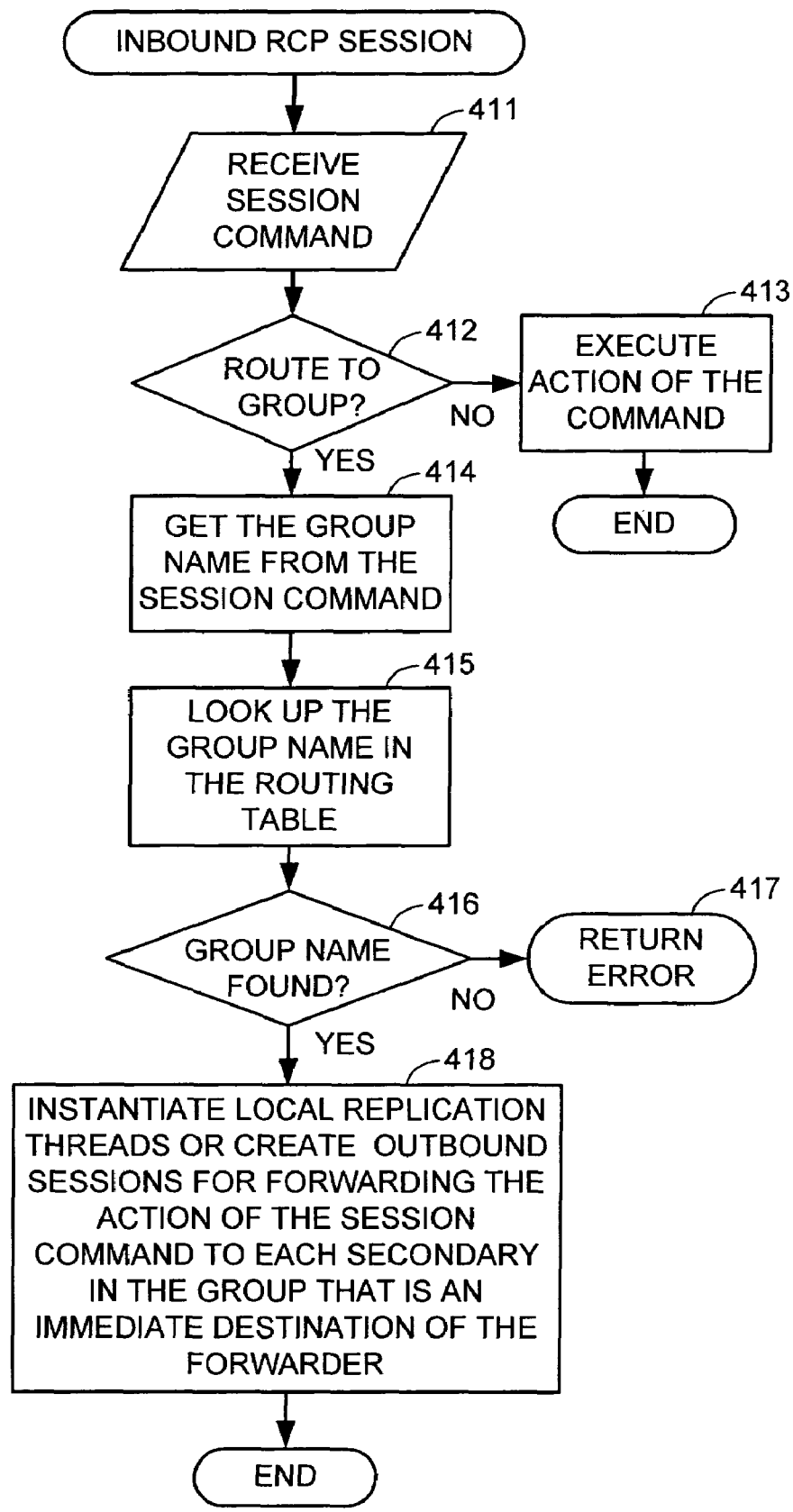
FIG. 17 is a flowchart of an inbound RCP session in the secondary data mover.

FIG. 17 shows a flowchart of how the RCP collector service at the secondary site processes an inbound RCP session command. In a first step 411, the RCP collector service receives a session command. In step 412, if this session command is not a command to be forwarded to other secondary sites, then execution branches to step 413 to execute the action of the command, and the processing of the session command is finished.

In step 412, if the session command is a command to be forwarded to other secondary sites, then execution continues from step 412, to step 414. In step 414, the RCP collector service gets the RCP group name from the session command. Then, in step 415, the RCP collector service looks up the group name in the RCP routing table (408 in FIG. 15). If the group name is not found, then execution branches from step 416 to step 417. In step 417, the RCP collector service returns an error message to the sender of the session command.

In step 416, if the group name is found in the RCP routing table, then execution continues from step 416 to step 418. In step 418, the RCP collector service forwards the action of the session command to each secondary in the group that is an immediate destination of the forwarder (i.e., the data mover that is the secondary presently processing the RCP session command). This is done by instantiating local replication threads or creating outbound sessions for forwarding the action of the session command to each secondary in the group that is an immediate destination of the forwarder. After step 418, processing of the RCP session command is finished.

Figure 18:
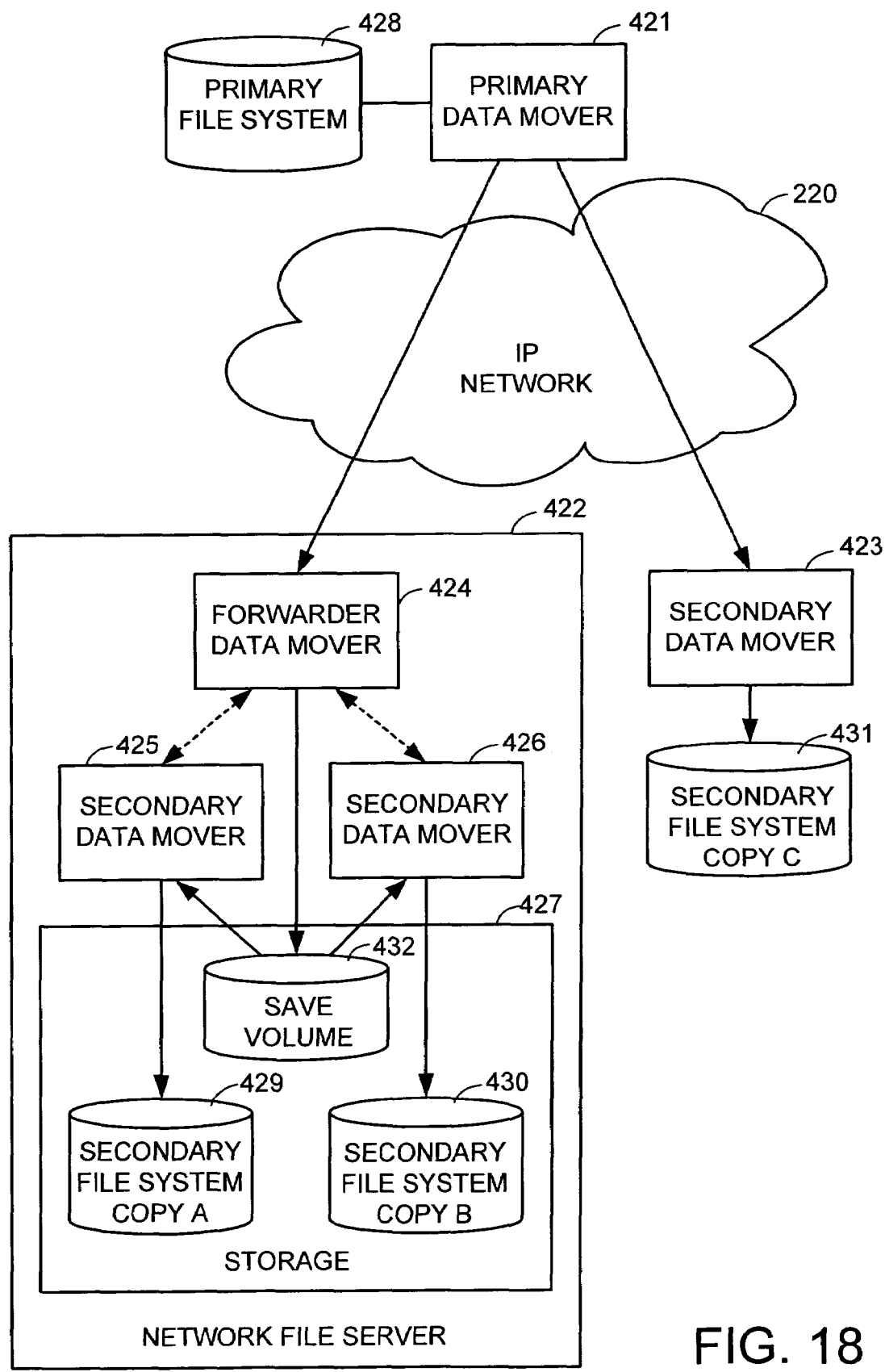
FIG. 18 is a block diagram showing a forwarder data mover performing local replication.

FIG. 18 shows an example of forwarding and local replication. In this example, the IP network 220 connects a primary data mover 421 to a network file server 422 and a secondary data mover 423. The network file server 422 includes three data movers 424, 425, and 426, and storage 427. The primary data mover manages network access to a primary file system 428. The data mover 424 functions as a forwarder data mover. The data mover 425 functions as a secondary data mover managing access from the network to a secondary file system (copy A) 429. The data mover 426 functions as a secondary data mover managing access from the network to a secondary file system (copy B) 430. The data mover 423 manages network access to a secondary file system (copy C) 431.

In operation, when the primary data mover 421 updates the primary file system 428, it multicasts the modified logical blocks of the file system volume over the IP network 220 to the forwarder data mover 424 and to the secondary data mover 423. The forwarder data mover 424 receives the modified blocks, and performs a local replication of the blocks to cause the secondary data mover 425 to update the secondary file system (copy A) 429 and the to cause the secondary data mover 426 to update the secondary file system (copy B) 430.

To perform the local replication, the forwarder data mover 424 has its volume multicast layer (323 in FIG. 9) save the modified blocks in a save volume 432 in the storage 427, and then the forwarder data mover 424 sends replication commands to the local secondary data movers 425 and 426. Each local secondary data mover 425, 426 has its playback module (328 in FIG. 9) replay the modifications from the save volume 432 into its respective secondary file system copy 429, 430.

Figure 19:
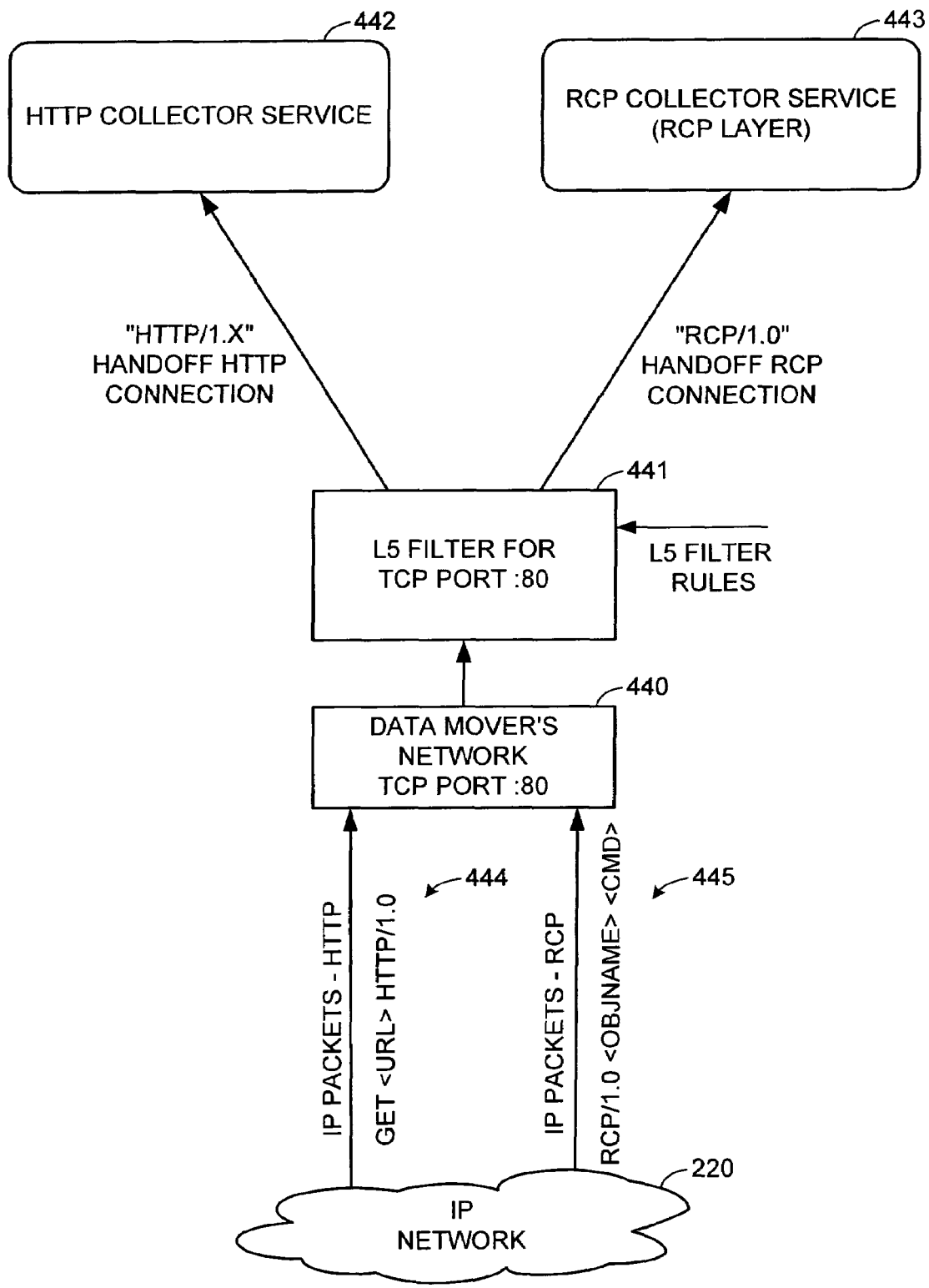
FIG. 19 is a block diagram showing the sharing of a data mover's single TCP port for RCP connections with Hypertext Transfer Protocol (HTTP) connections.

FIG. 19 shows the sharing of the: data mover's network TCP port :80 (440) between HTTP and RCP. This configuration is used in all data movers having the RCP collector service; i.e., primary, secondary, or forwarder. The TCP data channel from TCP port :80 (440) provides an in-order byte stream interface. IP packets 444 for HTTP connections and IP packets 445 for RCP connections from the network 220 are directed to the data movers TCP port :80 (440). The. TCP port :80 (440) is opened in both directions (i.e., input and output). In the input direction, the data mover uses a level 5 (L5) filter 441 for demultiplexing the IP packets for the HTTP connections from the P packets for the RCP connections based on an initial segment of each TCP connection. The L5 filter hands the TCP connection off to either a HTTP collector service 442 or an RCP collector service 443. (The RCP collector service 443 is the collector service 390 in the RCP primary of FIG. 14 or the RCP collector service 400 in an RCP secondary of FIG. 15.) For example, if the initial segment of a TCP connection contains "HTTP/1.X", then the L5 filter 441 directs the P packets for the connection to the HTTP collector service 442. If the initial segment of the TCP connection contains "RCP/1.0", then the IP packets for the TCP connection are directed to the RCP collector service 443. (In an alternative arrangement, the connection could be split as is done in a conventional stand-alone IP switch.)

Data Recovery With Internet Protocol Replication With or Without Full Resync

Figure 20:
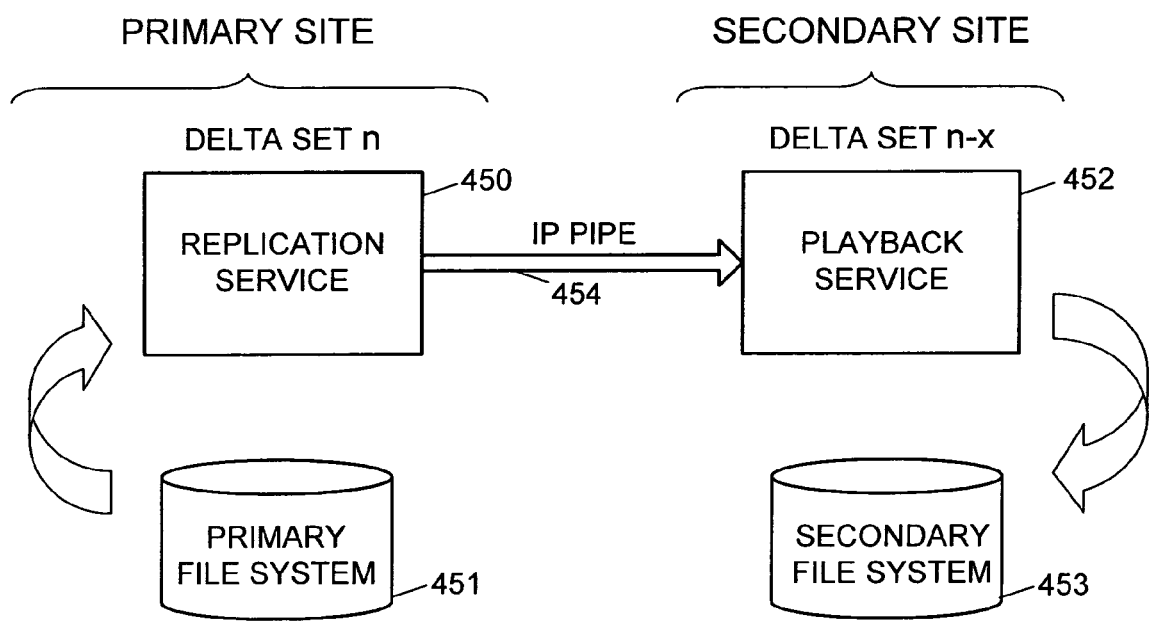
FIG. 20 is a block diagram showing the state of a remote replication system before a disaster at the primary site.

A remote replication system may protect against data loss resulting from a disaster. For example, FIG. 20 shows the state of a remote replication system before a disaster. The remote replication system copies data in an asynchronous fashion from a primary data storage system at the primary site to a secondary data storage system at a secondary site. The primary and secondary data storage systems could be file servers, for example as shown in FIG. 1.

As shown in FIG. 20, the primary site includes a replication service 450 replicating changes made to a primary file system 451, and the secondary site includes a playback service 452 writing the changes into a secondary file system 453. The replication service 450 transfers the changes in "delta sets" sent over an IP pipe 454 to the playback service 452. The disaster occurs at the primary site during this transfer. At this time, the playback service 452 is a few delta sets behind the replication service 450; for example, the playback service is playing back delta set (n–x) when the replication service 452 is replicating delta set (n).

Once the disaster causes the primary site to go down, the secondary site can be activated to service client read/write requests. When the primary site comes back up, it can be re-synchronized to the secondary site, in many cases without making a full copy of the file system. Then replication can be re-established as it was before the disaster. This recovery process has been designed to minimize data loss and the down time of both the primary and secondary site.

Figure 21:
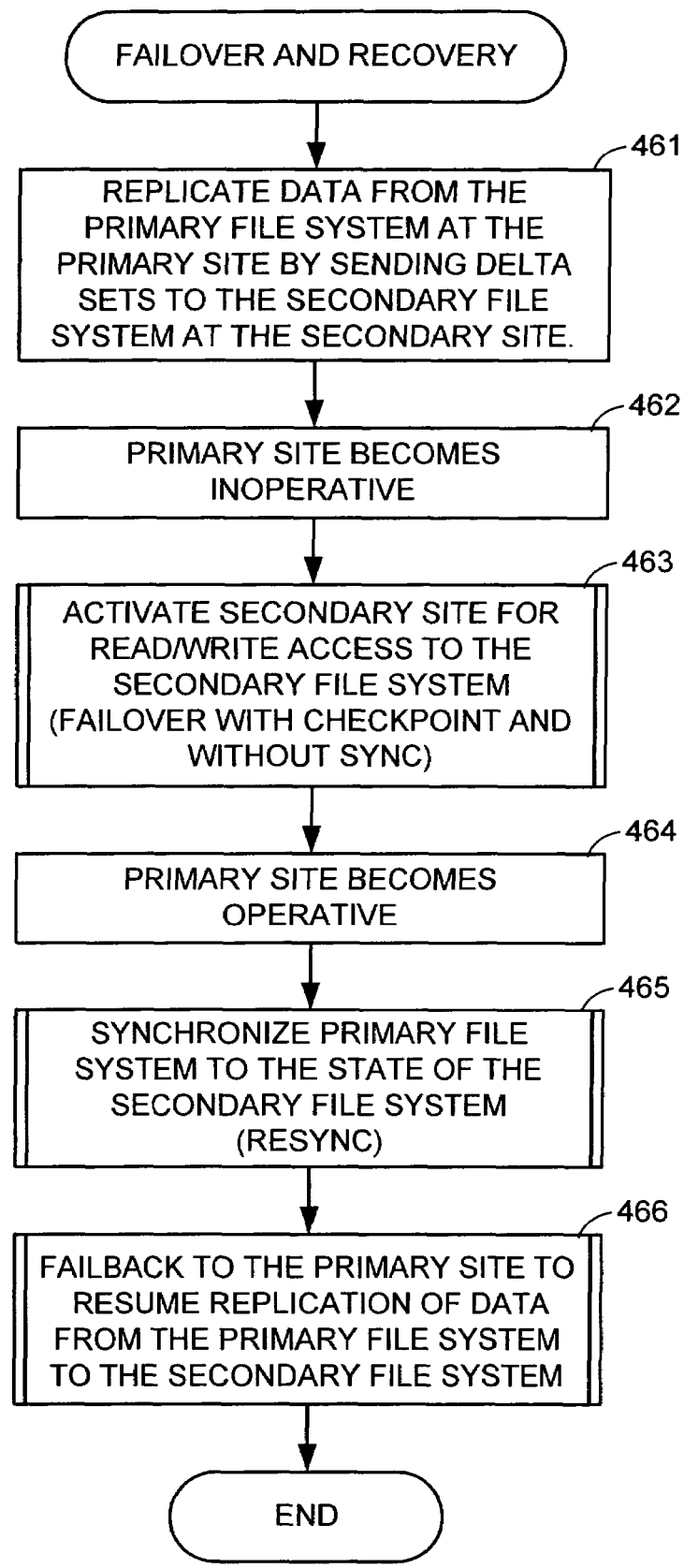
FIG. 21 is a flowchart of a failover and recovery method performed upon the, remote replication system of FIG. 20 in order to recover from the disaster at the primary site.

FIG. 21 is a flowchart of the preferred recovery process. Initially, in step 461, data is replicated from the primary file system at the primary site by sending delta sets to the secondary file system at the secondary site Then in step 462, the primary site becomes inoperative. In response, in step 463, the secondary site is activated for read/write access to the secondary file system. This, is done by a subroutine for failover with a checkpoint and without sync, as further described below with respect to FIG. 23. Eventually, in step 464, the primary site becomes operative. In response, in step 465, the primary file system is synchronized to the state of the secondary file system, as further described below with respect to FIG. 28. Then in step 466, read/write access to the primary file system and replication of data from the primary file system to the secondary file system is resumed in a failback operation, as further described below with reference to FIG. 30.

Figures 22, 24:
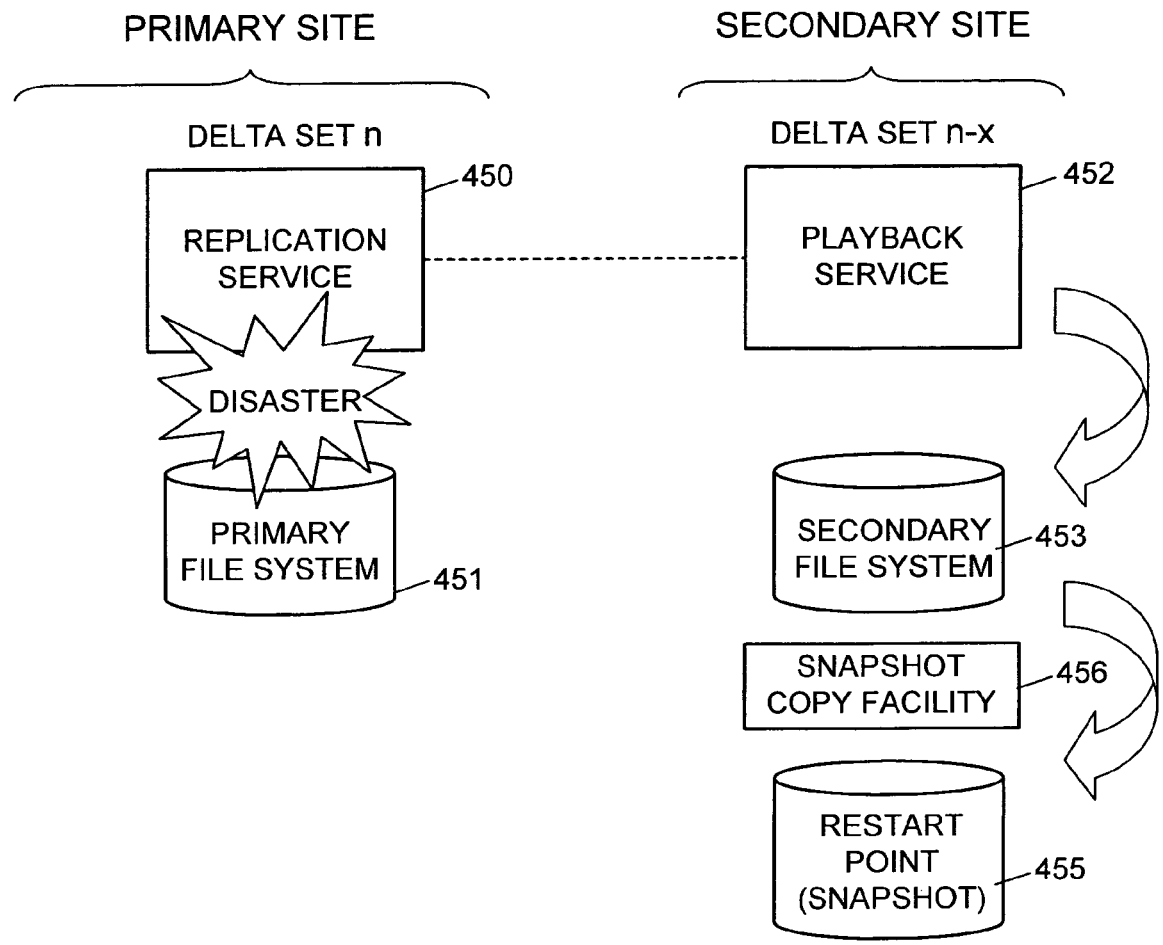
FIG. 22 is a block diagram showing the state of the remote replication system of FIG. 20 after failover from the primary site to the secondary site.
FIG. 24 shows a block map that can be used to create a snapshot copy of the secondary file system at a restart point during the failover of FIG. 23.

FIG. 22 shows the state of the remote replication system of FIG. 20 during the failover operation. The (n−x) deltasets are played back into the secondary file system 453, to put the secondary file system 453 into a state called a "restart point". A snapshot copy facility 456 creates a snapshot 455 of the "restart point" in order to facilitate synchronization of the primary file system with the secondary file system once the primary site becomes operative. The playback service 452 is stopped, and the secondary file system 453 is remounted as read/write. The snapshot copy facility 456 keeps a record of changes made to the secondary file system 453 after the "restart point."

Figure 23:
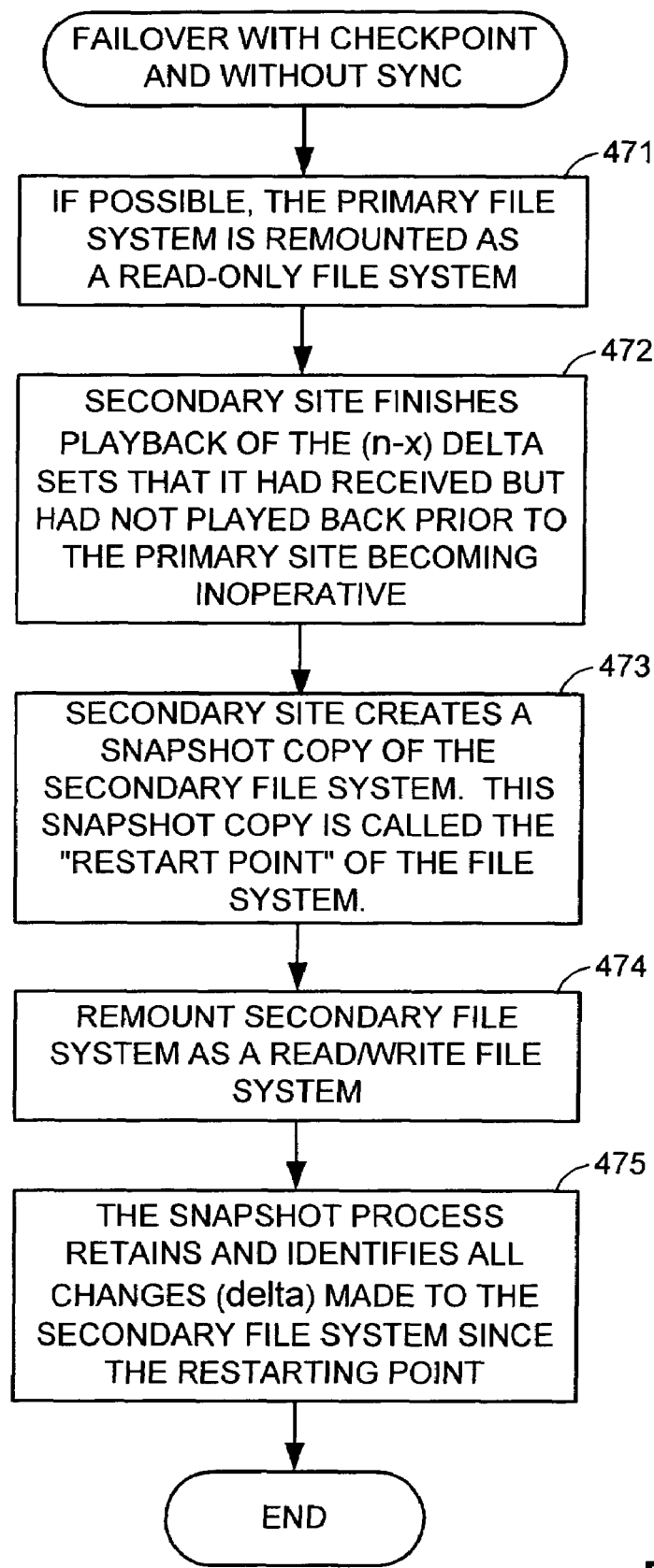
FIG. 23 is a flowchart of a subroutine of failover with a checkpoint and without sync, as used in the flowchart of FIG. 21.

FIG. 23 shows a flowchart of the failover operation. In step 471, if possible, the primary file system is remounted as a read-only file system. Next, in step 472, the secondary site finishes playback of the (n−x) delta sets that it had received but had not played back prior to the primary site becoming inoperative. In step 473, the secondary site creates a snapshot copy of the "restart point" of the secondary file system. This snapshot is stamped with the last delta set having been replayed into the secondary file system prior to the creation of the snapshot. In other words, an identifier of this last delta set is stored as an attribute of the snapshot. In general, whenever a snapshot is made of a file system during playback of delta sets into the file system, the snapshot is stamped with the last delta set having been replayed. In step 474, the secondary file system is remounted as a read/write, file system. In step 475, the snapshot process retains and identifies all changes (delta) made to the secondary file system since the restarting point.

Preferably the snapshot copy facility 456 retains and identifies the changes at a logical volume level of data storage. For example, the present state of the secondary file system is stored in a "clone volume," and old versions of the logical blocks that have been changed in the clone volume are saved in a "save volume". In order to conserve storage, the logical blocks of the save volume are dynamically allocated to the old versions of the changed blocks as the changes are made to the clone volume. As shown in FIG. 24, for each logical block that has been changed in the clone volume, a block map 480 identifies the logical block address ($S_i$) of the old version of the block in the save volume and the corresponding logical block address ($B_i$) of the changed block in the clone volume.

Figure 25:
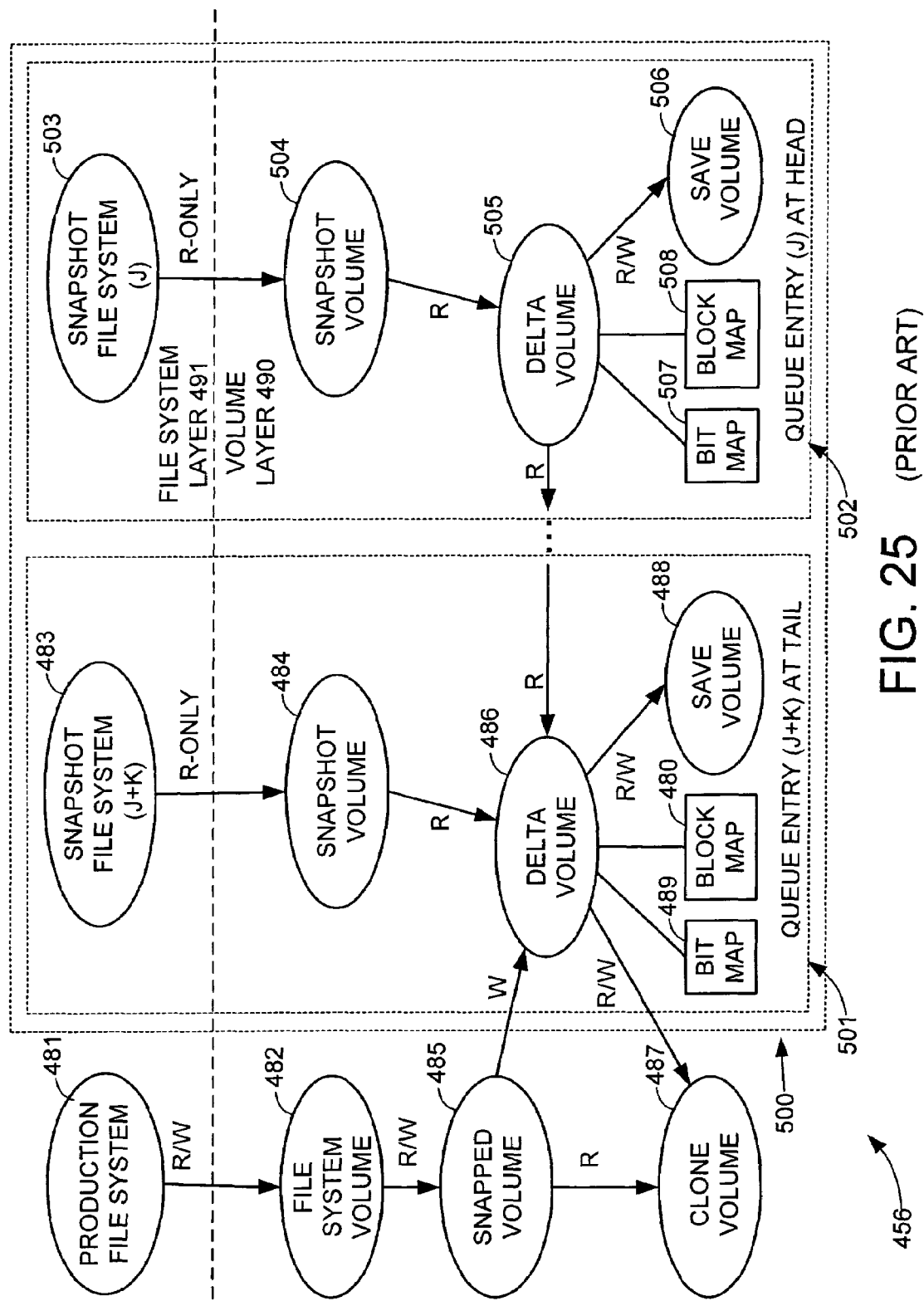
FIG. 25 shows a snapshot copy facility that can be used to create the snapshot copy of the secondary file system at the restart point during the failover of FIG. 23.

FIG. 25 shows details of the preferred snapshot copy facility 456, which provides multiple snapshots 483, 503 of a production file system 481. (Two successive snapshots of the secondary file system are used, for example, in the resync subroutine further described below with reference to FIG. 28.) The content of each snapshot file system 483, 503 is the state of the production file system 481 at a particular point in time when the snapshot was created. The snapshot copy facility 456 provides a hierarchy of objects in a volume layer 490 supporting the file systems in a file system, layer 491. The production file system 481 is supported by read/write access to a file system volume 482. Each snapshot file system 483, 503 provides read-only access to a respective snapshot volume 484, 504.

Additional objects in the volume layer 490 of FIG. 25 permit the content of each snapshot file system to be maintained during concurrent read/write access to the production file system 481. The file system volume 482 is supported by a snapped volume 485 having read access to a clone volume 487 and write access to a delta volume 486. The delta volume 486 has read/write access to the clone volume 487 and read/write access to a save volume 488.

In the organization of FIG. 25, the actual data is stored in blocks in the clone volume 487 and a respective save volume 488, 506 in storage for each snapshot. The delta volume 486 also accesses information stored in a bit map 489 and the block map 480. The bit map 489 indicates which blocks in the clone volume 487 have prior versions in the save volume 488. In other words, for read-only access to the snapshot file system, the bit map 489 indicates whether the delta volume should read each block from the clone volume 487 or from the save volume 488. For example, the bit map is stored in memory and it includes a bit for each block in the clone volume 487. The bit is clear to indicate that there is no prior version of the block in the save volume 488, and the bit is set to indicate that there is a prior version of the block in the save volume 488.

Consider, for example, a production file system 481 having blocks a, b, c, d, e, f, g, and h. Suppose that when the snapshot file system 483 is created, the blocks have values a0, b0, c0, d0, e0, f0, g0, and h0. Thereafter, read/write access to the production file system 481 modifies the contents of blocks a and b, by writing new values a1 and a2 into them. At this point, the following contents are, seen in the clone volume 487 and in the save volume 488:

Clone Volume: a1, b1, c0, d0, e0, f0, g0, h0
Save Volume: a0, b0

From the contents of the clone volume 487 and the save volume 488, it is possible to construct the contents of the snapshot file system 483. When reading a block from the snapshot file system 483, the block is read from the save volume 488 if found there, else it is read from the clone volume 487.

FIG. 25 further shows that a snapshot queue 500 maintains respective objects supporting multiple snapshot file systems 483, 503 created at different respective points in time from the production file system 481. In particular, the snapshot queue 500 includes a queue entry (J+K) at the tail 501 of the queue, and a queue entry (J) at the head 502 of the queue. In this example, the snapshot file system 483, the snapshot volume 484, the delta volume 486, the save volume 488, the bit map 489, and the block map 480 are all located in the queue entry at the tail 501 of the queue. The queue entry at the head of the queue 502 includes similar objects; namely, the snapshot file system (J) 503, a snapshot volume 504, a delta volume 505, a save volume 506, a bit map 507, and a block map 508.

The snapshot copy facility 456 may respond, to a request for another snapshot of the production file system 481 by allocating, the objects for a new queue entry, and inserting the new queue entry at the tail of the queue, and linking it to the snapped volume 485 and the clone volume 487. In this fashion, the save volumes 488, 506 in the snapshot queue 500 are maintained in a chronological order of the respective points in time when the snapshot file systems were created. The save volume 506 supporting the oldest snapshot file system 503 resides at the head 502 of the queue, and the save volume 488 supporting the youngest snapshot file system 483 resides at the tail 501 of the queue.

Figure 26:
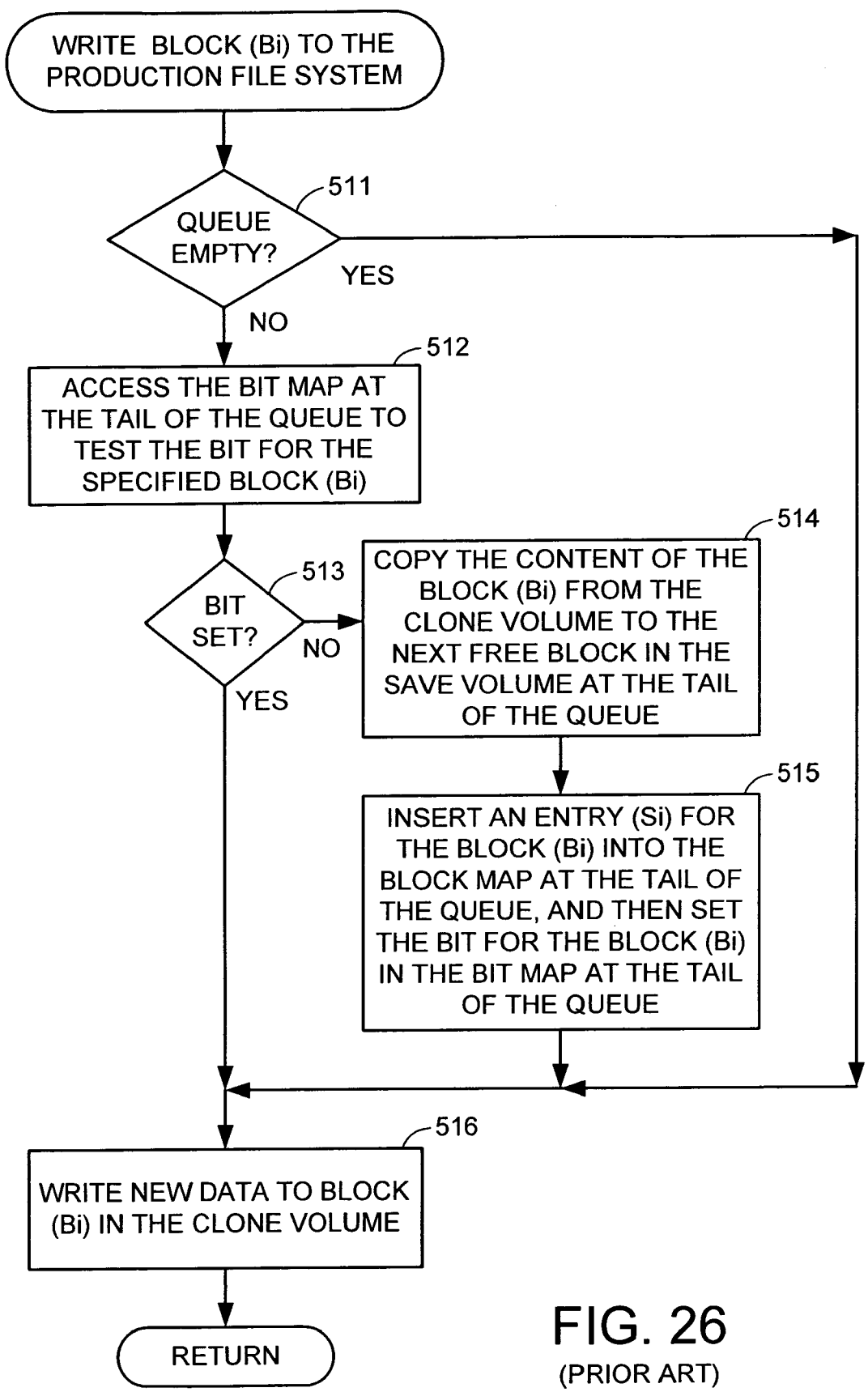
FIG. 26 is a flowchart of a procedure for writing a block of data to a production file system in the snapshot copy facility of FIG. 25.

FIG. 26 shows a procedure performed by the snapshot copy facility for writing a specified block ($B_i$) to the production file system. In step 511, if the snapshot queue is not empty, execution continues to step 512. In step 512, the bit map at the tail of the snapshot queue is accessed in order to test the bit for the specified block ($B_i$). Then in step 513, if the bit is not set, execution branches to step 514. In step 514, the content of the specified block ($B_i$) is copied from the clone volume to the next free block in the save volume at the tail of the snapshot queue. Execution continues from step 514 to step 515. In step 515, the save volume block address ($S_i$) of the free block is inserted into the entry for the block ($B_i$) in the block map at the tail of the queue, and then the bit for the block ($B_i$) is set in the bit map at the tail of the queue. After step 515, execution continues to step 516. Execution also continues to step 516 from step 513 if the tested bit is found to be set. Moreover, execution continues to step 516 from step 511 if the snapshot queue is empty. In step 516, new data is written, to the specified block ($B_i$) in the clone volume, and then execution returns.

Figure 27:
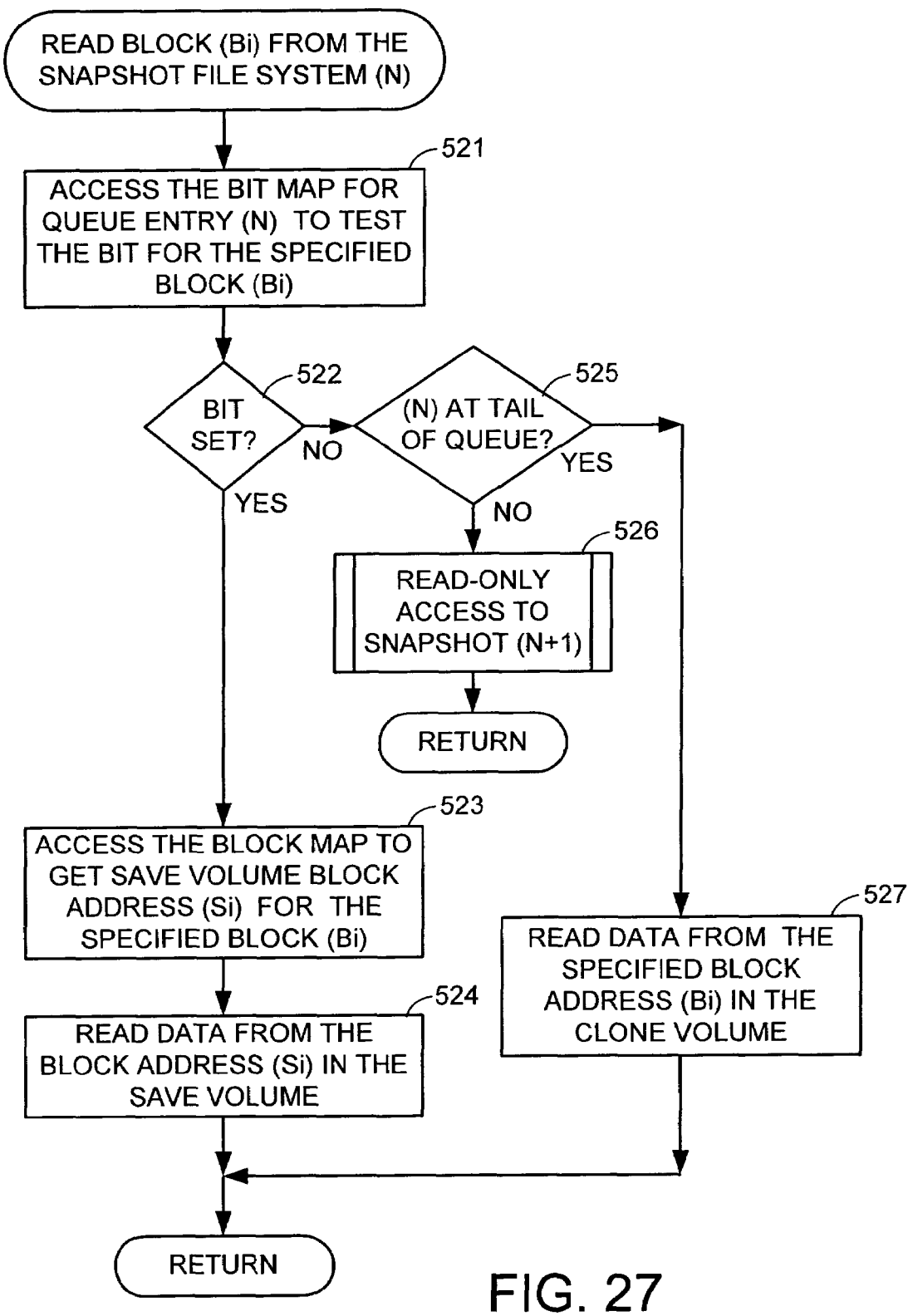
FIG. 27 is a flowchart of a procedure for reading a block of data from a snapshot file system in the snapshot copy facility of FIG. 25.

FIG. 27 shows a procedure performed by the snapshot copy facility for reading a specified block ($B_i$) from a specified snapshot file system (N). In the first step 521, the bit map is accessed for the queue entry (N) to test the bit for the specified block ($B_i$). Then in step 522, if the tested bit is set, execution continues to step 523. In step 523, the block map is accessed to get the save volume block address ($S_i$) for the specified block ($B_i$). Then in step 524 the data is read from the block address ($S_i$) in the save volume, and then execution returns.

If in step 522 the tested bit is not set, then execution branches to step 525. In step 525, if the specified snapshot (N) is not at the tail of the snapshot queue, then execution continues to step 526 to perform a recursive subroutine call upon the subroutine in FIG. 27 for read-only access to the snapshot (N+1). After step 526, execution returns.

If in step 525 the snapshot (N) is at the tail of the snapshot queue, then execution branches to step 527. In step 527, the data is read from the specified block ($B_i$) in the clone volume, and execution returns.

Figure 28:
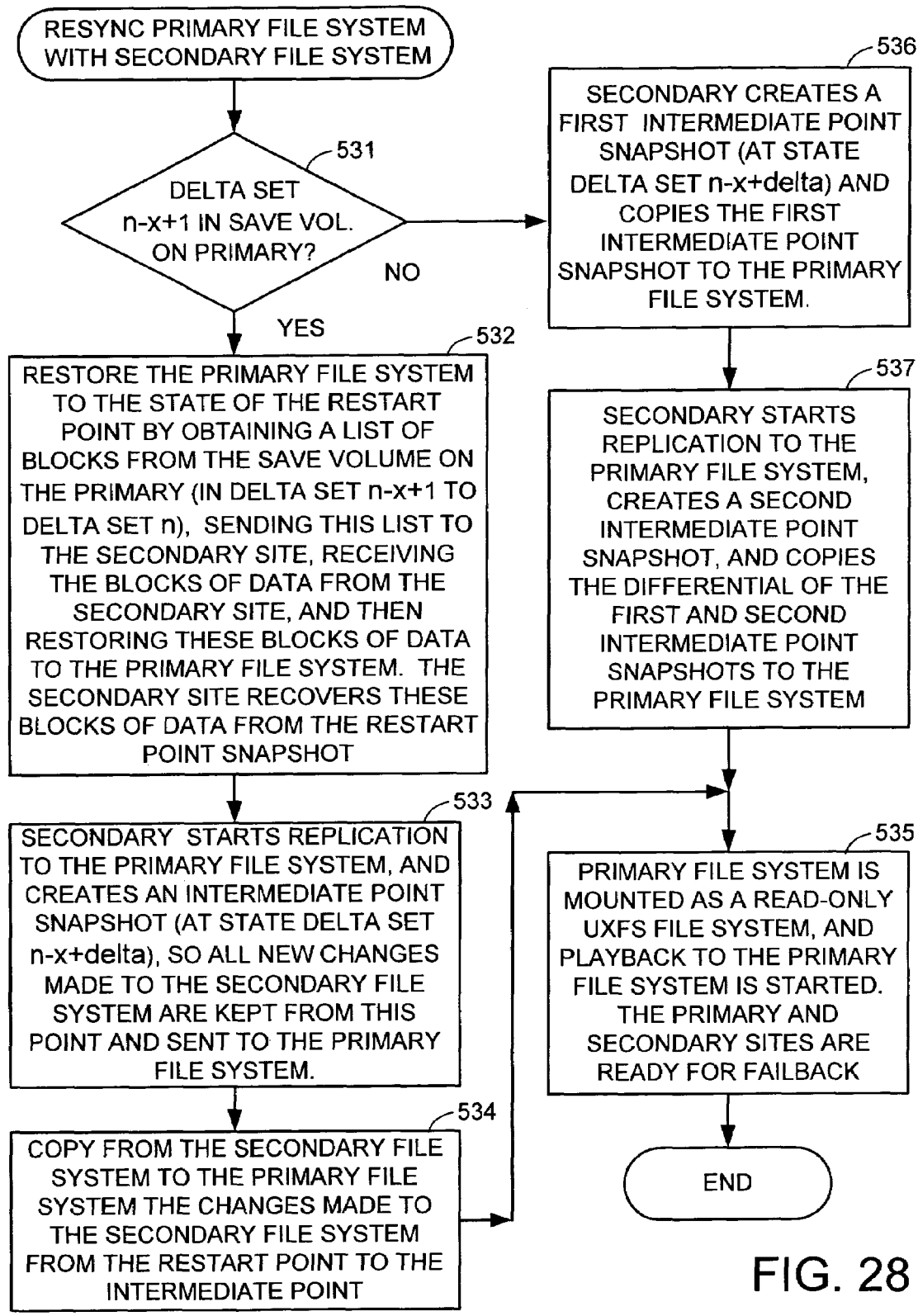
FIG. 28 is a flowchart of a subroutine to resync the primary file system with the secondary file system, as used in the flowchart of FIG. 21.

FIG. 28 shows the subroutine to resync the primary file system with the secondary file system, as used in the flowchart of FIG. 21. In a first step 531 in FIG. 28, the delta set identifier (n−x) for the restart point is read from the delta set attribute of the restart point snapshot, and it is incremented by one to compute (n−x+1). The save volume at the primary site is searched for the delta set (n−x+1). Execution continues from step 531 to step 532 if the delta set n−x+1 is found in the save volume at the primary site. In this case, the primary site should also have all of the delta sets from delta set n−x+1 to delta set n, and the primary file system can be restored to the state of the restart point in step 532 by an "undo" of the data blocks of these delta sets. The primary file system is restored with "before images" of these data blocks in order to "undo" the changes. The delta sets n−x+1 to n contain "after images" of these data blocks. The "before images" of these data blocks are stored in the secondary site in the snapshot of the secondary file system at the restart point. Therefore, to restore" the primary file system to the state of the restart point, the snapshot copy facility at the secondary site reads the "before images" from the "restart point" snapshot, and the secondary site executes a remote copy of these "before images" to the primary file system.

In step 532, the primary site restores the primary file system to the state of the restarting point by obtaining a list of blocks from the save volume at the primary site, including the blocks in delta set n−x+1 to delta set n. The primary site sends this list to the snapshot copy facility at the secondary site. The secondary site retrieves the data of these blocks from the snapshot at the restart point, and returns the data to the primary site. The primary site receives these blocks of data and restores them to the primary file system.

In step 533, the snapshot copy facility starts replication to the primary file system, and creates an intermediate point snapshot (at state delta set n−x+δ), so all new changes made to the secondary file system since the intermediate point are kept and sent to the primary file system. However, they are not yet played back into the primary file system. At this point, the primary file system is mounted as a "raw" file system, so it is not accessible to users.

In step 534, the changes made to the secondary file system from the restart point to the intermediate point are copied from the secondary file system to the primary file system. These changes are maintained by the snapshot copy facility at the secondary site. For the snapshot copy facility as shown,in FIG. 25, for example, assume that the restart point is the snapshot J and the intermediate point is the snapshot J+K where K is one. In this case, the changed blocks are identified in the bit map 507, and the data of the changed data blocks are found by reading from the intermediate point snapshot file system. To retrieve these changes, the snapshot copy facility scans the bit map 507 to find any set bit indicating a change in the save volume, and if the bit is set, the snapshot copy facility notes the block address ($B_i$). The snapshot copy facility then reads the snapshot file system (J+K) 483 at this block address ($B_i$). The snapshot copy facility continues this process until it has finished scanning the bit map 507.

In FIG. 28, after step 534, execution continues to step 535. In step 535, the primary file system is mounted as a read-only UxFS file system, and playback to the primary file system is started. At this point, the resync is finished, and the primary and secondary sites are ready for failback.

In step 531, if the delta set n−x+1 cannot be found in the save volume from before failover (459 in FIG. 29) at the primary site (for example, because the save volume was destroyed during the disaster), then execution branches from step 531 to step 536. In this case, the secondary file system is migrated to the primary file system, and a warning message is logged and displayed to the system administrator to signal that the full copy was required. In step 536, the secondary creates a first intermediate point snapshot (at state delta set n−x+δ), and copies the first intermediate point snapshot to the primary file system. At this time, read/write access to the secondary file system is permitted on a priority basis. Then in step 537, the secondary starts replication to, the primary file system, and creates a second intermediate point snapshot, so all new changes made to the secondary file system since the second intermediate point are kept and sent to the primary file system by the replication process. However, these new changes are not yet played back into the primary file system. At this point, the primary file system is mounted as a "raw" file system, so it is not accessible to users. Moreover, in step 537, the differential of the first and second intermediate point snapshots (i.e., the changes made to the secondary file system from the first intermediate point snapshot to the second intermediate point snapshot) are copied to the, primary file system. Then execution continues to step 535, to mount the primary file system as a read-only UxFS file system, and to start playback to the primary file system. Also in step 535, the restart snapshot and the intermediate snapshot can be deleted.

The migration method of steps 536 to 537 is used in order to reduce the likelihood that read/write access to the secondary file system and replication to the primary file system would be interrupted by the primary and secondary save volumes (274, 275 in FIG. 5) becoming full. Each save volume functions as a wrap-around buffer. The primary save volume will store updates received in step 537 from the secondary site until playback to the primary file system is started in step 535. If the primary save volume would become full in step 537, a TCP flow control signal is sent from the primary site to the secondary site to suspend transmission of further updates. When transmission of further updates is suspended, the further updates can be stored in the secondary save volume (275 in FIG. 5) until the secondary save volume would become full. If the secondary save volume would become full, then read/write access to the secondary file system and replication to the primary file system would be suspended until playback to the primary file system is started in step 535 and updates are removed from the primary and secondary save volumes.

Figure 29:
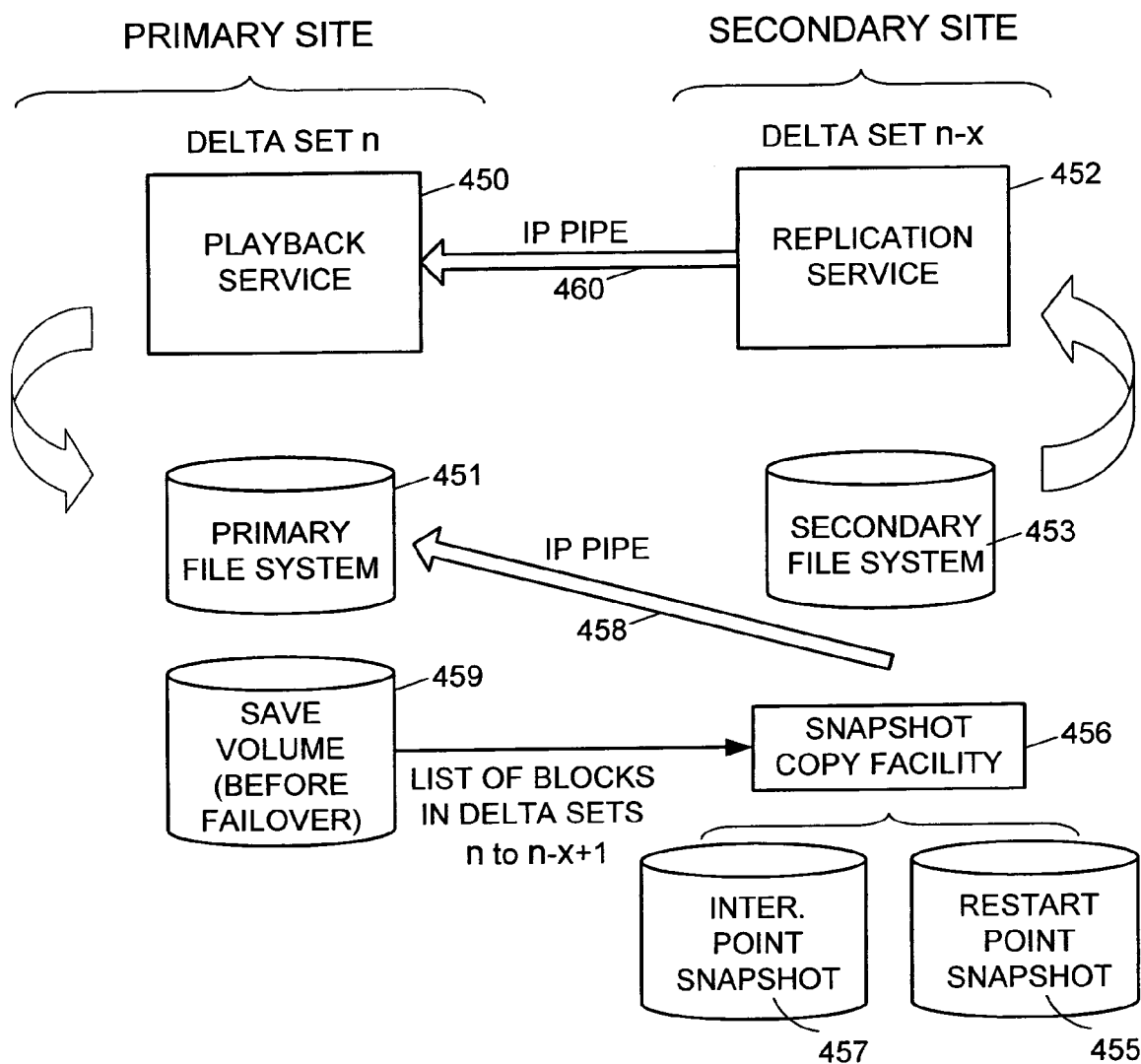
FIG. 29 shows the state of the remote replication system of FIG. 20 during the resync procedure.

FIG. 29 shows the state of the remote replication system of FIG. 20 during the resync procedure. At the secondary site, the snapshot copy facility 456 has created the intermediate point snapshot 457. A list of blocks in the delta sets n to n−x+1 is obtained from the save volume 459 at the primary site and sent to the snapshot copy facility 456 at the secondary site. The snapshot copy facility 456 returns "before images" of the requested blocks over an IP pipe 458 to the primary file system 451 to restore the primary file system to the state of the restart point snapshot, and then sends the changes from the restart point to the intermediate point. The replication service 452 at the secondary site is replicating changes to the secondary file system since the intermediate point, and is sending these changes over the IP pipe 460 to the playback service 450. Transmission of these changes since the intermediate point over the IP pipe 460 is concurrent with transmission of changes prior to the intermediate point over the IP pipe 458. Once the primary file system 451 has been synchronized to the intermediate point 457, the playback service 450 at the primary site is activated to play these changes into the primary file system 451. If the primary site should crash during the copy process of steps 534 or 536, then the copy process can be restarted automatically.

Figure 30:
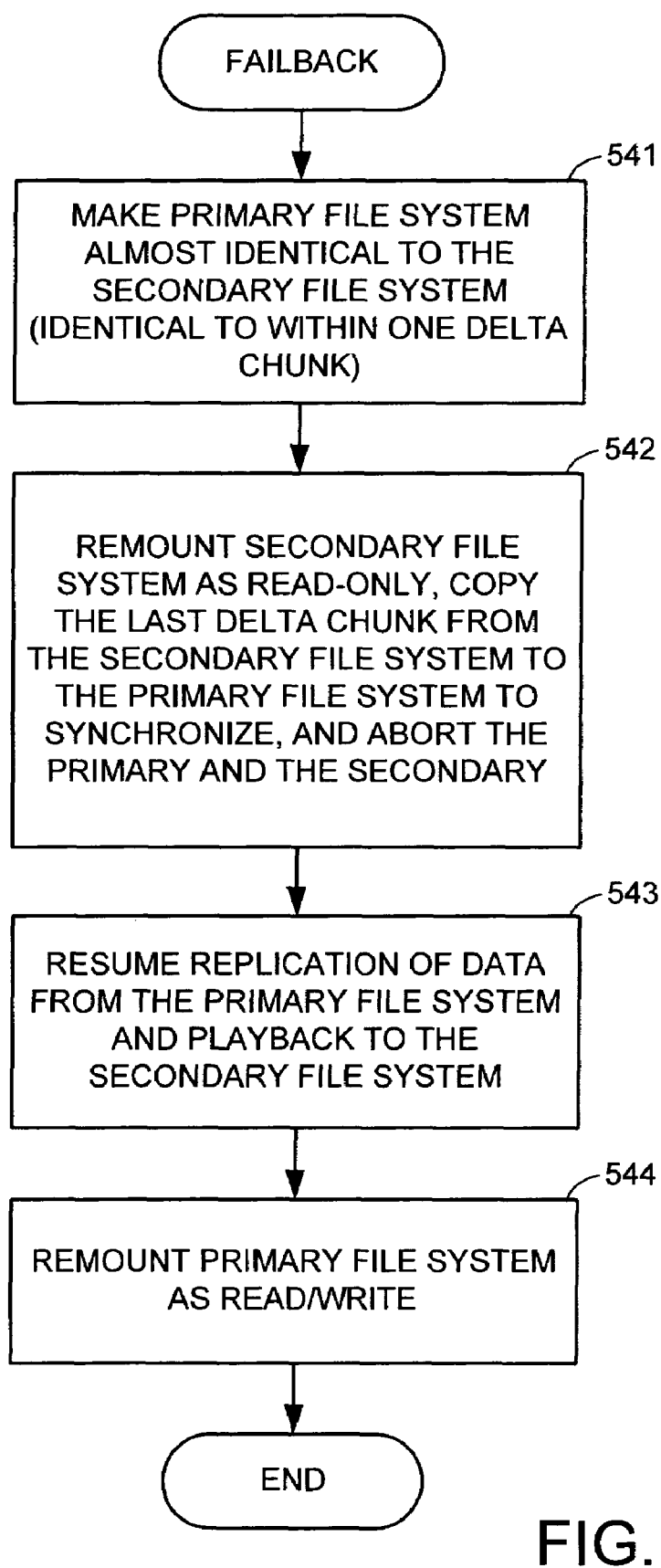
FIG. 30 is a flowchart of a subroutine to failback to the primary file system, as used in the flowchart of FIG. 21.

FIG. 30 is a flowchart of the subroutine to failback to the primary file system. In a first step 541, the primary file system is made almost identical to the secondary file system by the replication process. For example, when the primary file system is within one delta chunk of the secondary file system, execution continues to step 542. In step 542, the secondary file system is re-mounted as read-only, and the last delta chunk is copied from the secondary file system, to the primary file system in order to synchronize the primary file system from the secondary:,file system. Once synchronized, the, primary and secondary are aborted, in order to terminate the processes of replication from the secondary, playback to the primary, and copying from the secondary to the primary. At this point, the primary file system contains all the data that the secondary file system had before the disaster and the additional data that the secondary file system had accumulated after the disaster. Then in step 543, there is a resumption of the replication of data from the primary file system and playback to the secondary file system. Then in step 544, the primary file system is remounted as read/write. Therefore, the recovery process permits replication to be restarted as it was before the disaster. Some data might have been lost at failover time since replication is asynchronous. This is dependent on the number "x" of delta sets that the secondary file system was behind the primary file system when the disaster occurred at the primary. The less the number "x" of delta sets the closer the final recovered file system would be to the original file system.

A number of commands have been devised for conducting the above recovery procedure when network file servers (such as shown in FIGS. 1 and 5) are used at the primary and secondary sites. These commands include a $fs_replicate-failover command, a $fs_replicate-resync command, a $fs_replicate-status command, $fs_replicate-failback command, and a $fs_copy-start command.

The $fs_replicate-failover command has the following format:

$fs_replicate-failover <pfs>:cel=<server><sfs>[-sync][-now]

where <pfs> is the primary file system, <server> is the server of the primary file system, <sfs> is the secondary file system, [-sync] is an option that is set when the user wants the failover to happen when both the primary file system and the secondary file system are "in sync" (i.e., identical state), and [-now] is an option to specify immediate failover. The $fs_replicate-failover command is executed on the control station for the secondary file system.

When the [-sync] option is not set, this command will internally stop the replication and playback of <sfs>, making sure that all of the delta sets available on secondary site are re-played. Then it will try to stop the replication on <pfs> as well, unless the [-restartpoint] option is set. Then <sfs> will be remounted "rw". If possible, <pfs> is remounted "ro". No [-sync] option should be specified if the primary control station or server is down. In this case, after failover, some data could be lost.

When the [now] option is set, the playback of <sfs> is immediately stopped, without replaying any of the delta sets available on the secondary site.

When the [-sync] option is specified, the primary control station and the server must be up, else the command will fail. The primary file system <pfs> is re-mounted as read-only and a last delta set is created. Once the last delta set is played back to the secondary, the replication process is stopped on the <sfs>/<pfs>. The secondary file system <sfs> now contains all the data that the <pfs> had before the failover. The secondary file system <sfs> is now mounted "rw".

Figure 31:
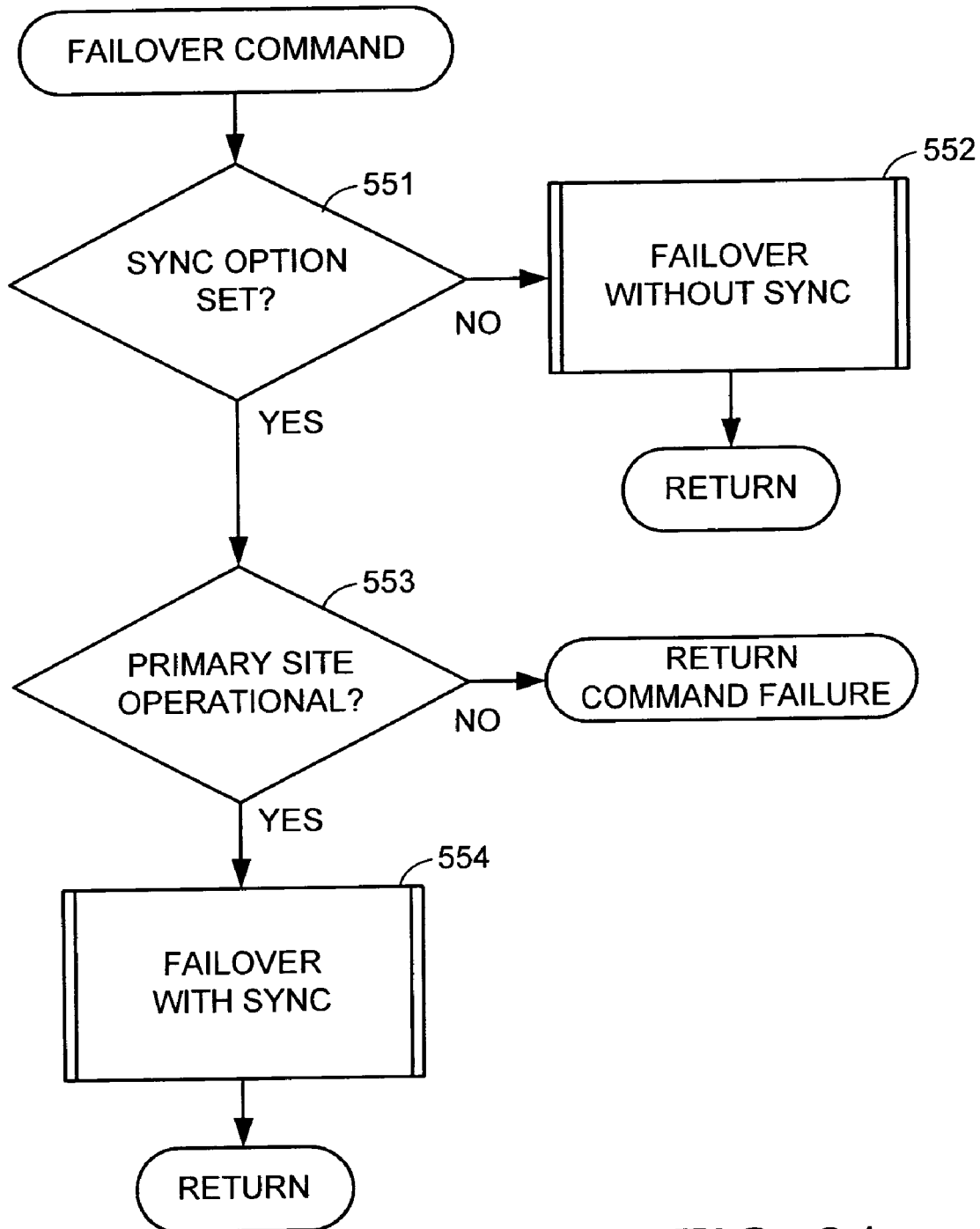
FIG. 31 is a flowchart of execution of a failover command having a sync option and a checkpoint option.

FIG. 31 shows a flowchart of execution of the $fs_replicate-failover command. In a first step 551, if the sync option is not set, then execution branches to step 552 to perform a failover without sync procedure, as described below with reference to FIG. 32. After step 552, execution is finished. In step, 551, if the sync option is set, then execution continues to step 553. In step 553, if the primary site, is not operational, execution returns reporting a command failure. Otherwise, if the primary site is operational, execution continues to step 554, to perform a failover with sync procedure, as described below with reference to FIG. 33.

Figure 32:
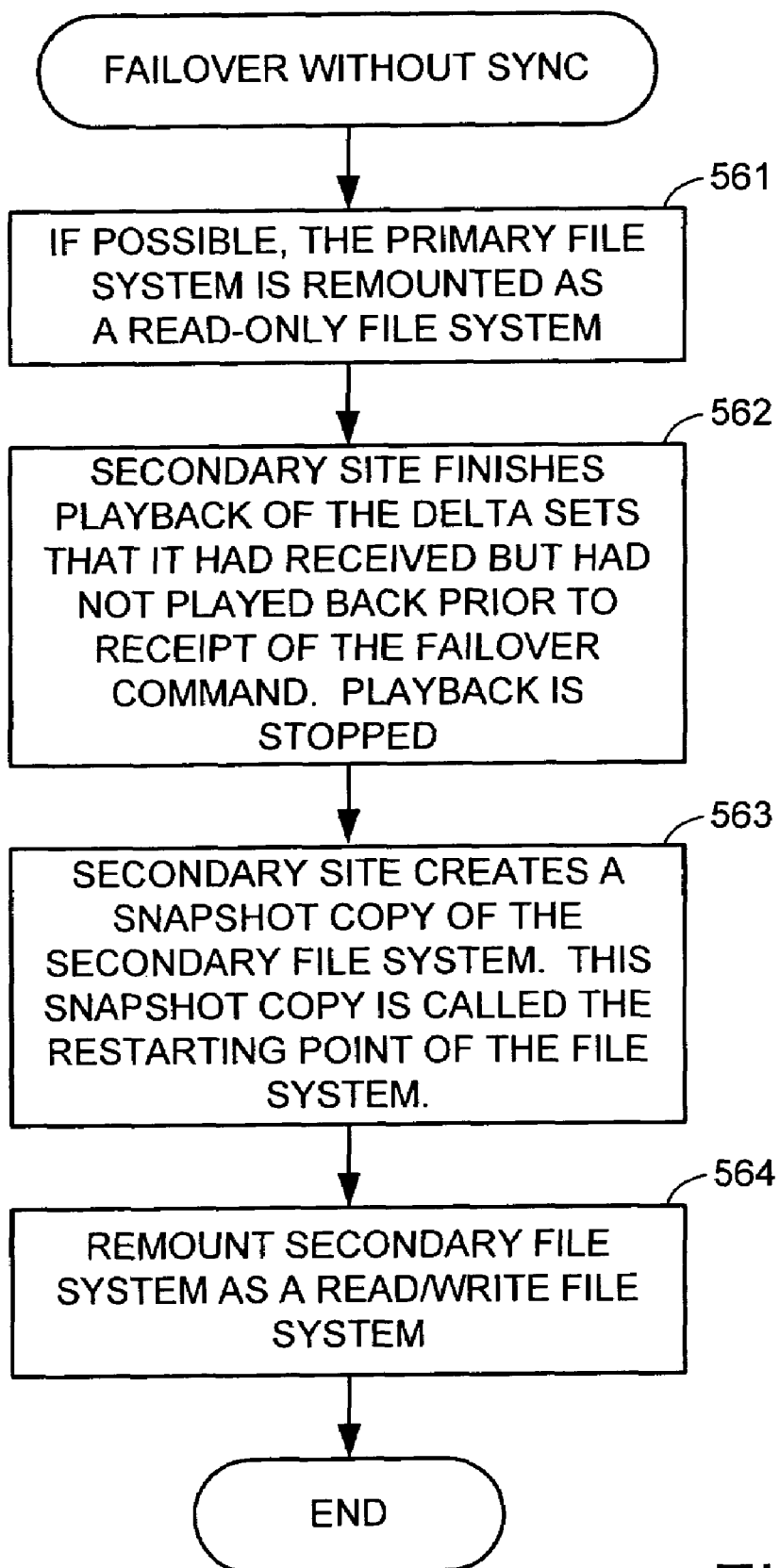
FIG. 32 is a flowchart of a subroutine for failover without sync, as used in the flowchart of FIG. 31.

FIG. 32 shows a flowchart of the failover without sync procedure. In step 561, if possible, the primary file system is remounted as a read-only file system. Then in step 562, the secondary site finishes playback of the delta sets that it had received but had not played back prior to receipt of the failover command. In step 563, the secondary site creates a snapshot copy of the secondary file system. This snapshot is called the restarting point of the file system. In step 564, the secondary file system is remounted as a read/write file system, and execution of the failover command is finished.

Figure 33:
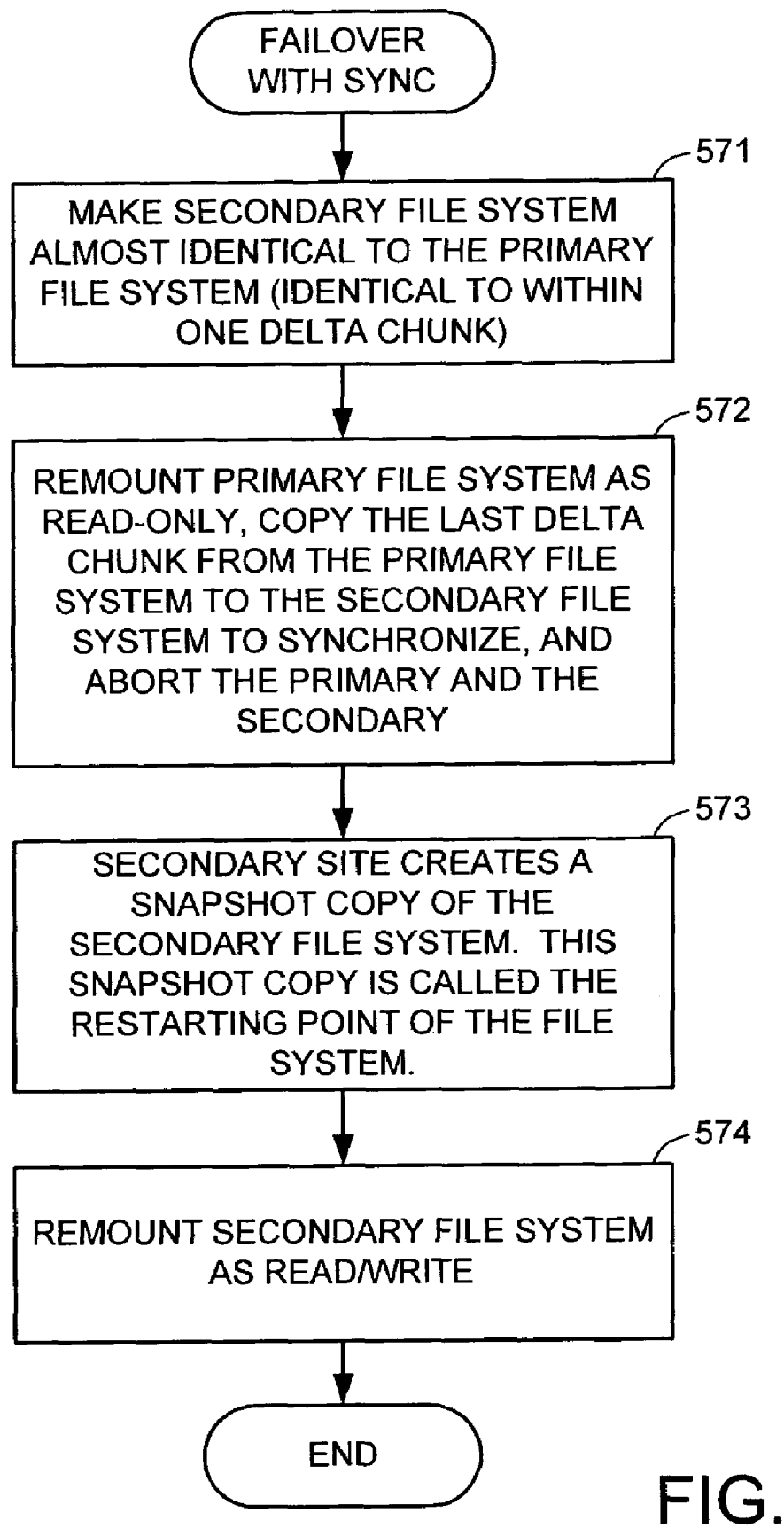
FIG. 33 is a subroutine for failover with sync, as used in the flowchart of FIG. 31.

FIG. 33 shows a flowchart of the failover with sync procedure. In a first step 571, the secondary file system is made almost identical to the primary file system by the replication process. For example, once the secondary file system is within one delta set chunk of the primary file system, execution continues to step 572. In step 572, the primary file system is remounted as read-only, the last delta chunk is copied from the primary file system to the secondary file system in order to synchronize the secondary file system to the primary file system, and then the primary and secondary are aborted to terminate the processes of replication from the primary, playback to the secondary, and copying from the primary to the secondary. Then in step 573, the secondary site creates a snapshot copy of the secondary file system. This snapshot copy is called the restarting point of the file system. Finally, in step, 574, the secondary file system is remounted as read/write.

The $fs_replicate-resync command has the following format:

$fs_replicate-resync sfs pfs:cel=server1 where sfs is the secondary file system (this is now the source file system), pfs is the primary file system (this is the file system to be restored, a raw file system mounted on a server which has its IP interfaces configured), server1 is the site where a disaster occurred, and <ckpt_name> is the restart point name.

The $fs_replicate-status command has the following format:

$fs_replicate-status <pfs> <sfs>:cel=<remote_server> where <pfs> is the primary file system, <sfs> is the secondary file system, and <remote_server> is the server of the secondary site. This command can be used on the control station for the primary site, and also on the control station for the secondary site. Typically this command is used on the primary site when the user wants to check the status of the replication process, to determine when it is reasonable to failback. It is considered reasonable to failback when the difference between the primary, file system and the secondary file system is very small. To assist the user, the primary site responds to this command by providing an indication of the number of blocks that are different between the primary file system and the secondary file system.

Following is an example of the information Provided when the $fs_replicate-status command is executed:

```
[nasadmin@cel_sfs nasadmin]$ fs_replicate -info sfs10
-v 128
```

| id = | 59 |
| name = | sfs10 |
| type = | replication |
| current_delta_set = | 16 |

| -continued | |
| --- | --- |
| current_block_number = | 1088 |
| current_transfer_rate = | 17.0667 blocks/second |
| avg_transfer_rate = | 25.7444 blocks/second |
| id = | 31 |
| name = | pfs10:cel_ip2 |
| type = | playback |
| current_delta_set = | 16 | outstanding delta sets:

| Delta | Source_create_time | Blocks |
| --- | --- | --- |
| 15 | 11/26 20:11:56 | 1 |

| | Source | | | Destination | | | |
| --- | --- | --- | --- | --- | --- | --- | --- |
| Delta | Create Time | Dur | Blocks | Playback Time | Dur | Blocks | Dsin Group |
| 15 | 11/26 20:11:56 | 0 | 1 | | | | |
| 14 | 11/26 20:01:56 | 0 | 1 | | | | |
| 13 | 11/26 19:51:56 | 0 | 1 | 11/26 21:08:48 | 0 | 1 | 2 |
| 12 | 11/26 19:41:56 | 0 | 1 | | | | |
| 11 | 11/26 19:31:56 | 0 | 1 | 11/26 20:48:48 | 0 | 1 | 2 |
| 10 | 11/26 19:21:56 | 0 | 1 | | | | |
| 9 | 11/26 19:11:56 | 0 | 1 | 1/26 20:28:28 | 0 | 1 | 2 |
| 8 | 11/26 18:52:40 | 0 | 1 | 11/26 20:08:09 | 0 | 1 | 1 |
| 7 | 11/26 18:42:40 | 0 | 1 | | | | |
| 6 | 11/26 18:32:40 | 0 | 1 | 11/26 19:48:09 | 0 | 1 | 2 |
| 5 | 11/26 18:22:39 | 0 | 1 | | | | |
| 4 | 11/26 18:12:39 | 0 | 1 | 11/26 19:28:08 | 0 | 1 | 2 |
| 3 | 11/26 18:02:39 | 0 | 4 | 11/26 19:07:23 | 0 | 4 | 1 |

The $fs_replicate-failback command has the following format:

$fs_replicate-failback <pfs> <sfs>:cel=<remote_server> where <pfs> is the primary file system (a UxFS file system mounted as "ro"), and <sfs> is a secondary file system. This command is used when the user wants to failback to the primary site (after re-build phase). No data is lost and the replication will continue but it will be reversed (the primary file system, which runs playback, will then run replication and vice-versa for the secondary file system). This command can also be used to change the direction of replication, in the absence of any failure or disruption.

The $fs_replicate-failback command is, executed on the site that the replication service is running (i.e., the site having the file system that is mounted as read/write). Typically, the $fs_replicate-failback command is executed on the primary site after it has been rebuilt. Then the primary file system is a raw file system that is restored from the secondary file system. The secondary file system is re-mounted read write. Replication is stopped on the secondary and playback is stopped on the primary. After the primary file system and the secondary file systems are in sync, the primary file system is converted to a UxFS file system and re-mounted as read/write. Replication is turned back on and the flow of data is now from the primary file system to the secondary file system. Playback is started on the secondary file system. This command can be used to "swap" primary and secondary without having to do a full copy and without having to restart replication. On error, it should be possible to re-issue the fs_replicate-failback command and proceed if the error condition has been cleared.

The $fs_copy-start command has the following format:

$fs_copy-start <fs_ckpt2> <sfs>:cel=<remote_server> -fromfs <fs_ckpt1> where <fs_ckpt1> is the primary file system ckpt1, <fs_ckpt2> is the primary file system ckpt2, <sfs> is the secondary file system, and <remote_server> is the server of the secondary site. This command is used internally by the fs_replicate-resync command. It could also be used for other purposes, for example, as described below with reference to FIGS. 36-38. This command copies the delta from fs_ckpt1 to fs_ckpt2 over to the secondary file system, knowing that the, state of the secondary file system was equal to fs_ckpt1.

The following is an example of how the commands can be used to recover from a disaster.
1. After the disaster, decide the option to use for failover.
2. $fs_replicate-failover pfs:cel=cel_pfs sfs
3. Verify that sfs can accept read/write operation.
4. Initialize replication from sfs to pfs:
   On PFS control station:
      server_mount server_2-o ro pfs/pfs
   On SFS control station:
      $fs_replicate-resync pfs:cel=cel_pfs sfs
5. Verify that replication from sfs to pfs is running without a problem.
6. $fs_replicate-failback sfs pfs:cel=cel_pfs
7. Verify that replication from pfs to sfs is running without a problem.

Replication of Snapshots Using IP File System Copy Differential

As described above with reference to steps 534 and 537 of FIG. 28, a file system copy differential was used to replicate an intermediate point snapshot during recovery of a file system from a disaster. A general-purpose file system copy differential command ($fs_copy-start) was also introduced.

Figure 34:
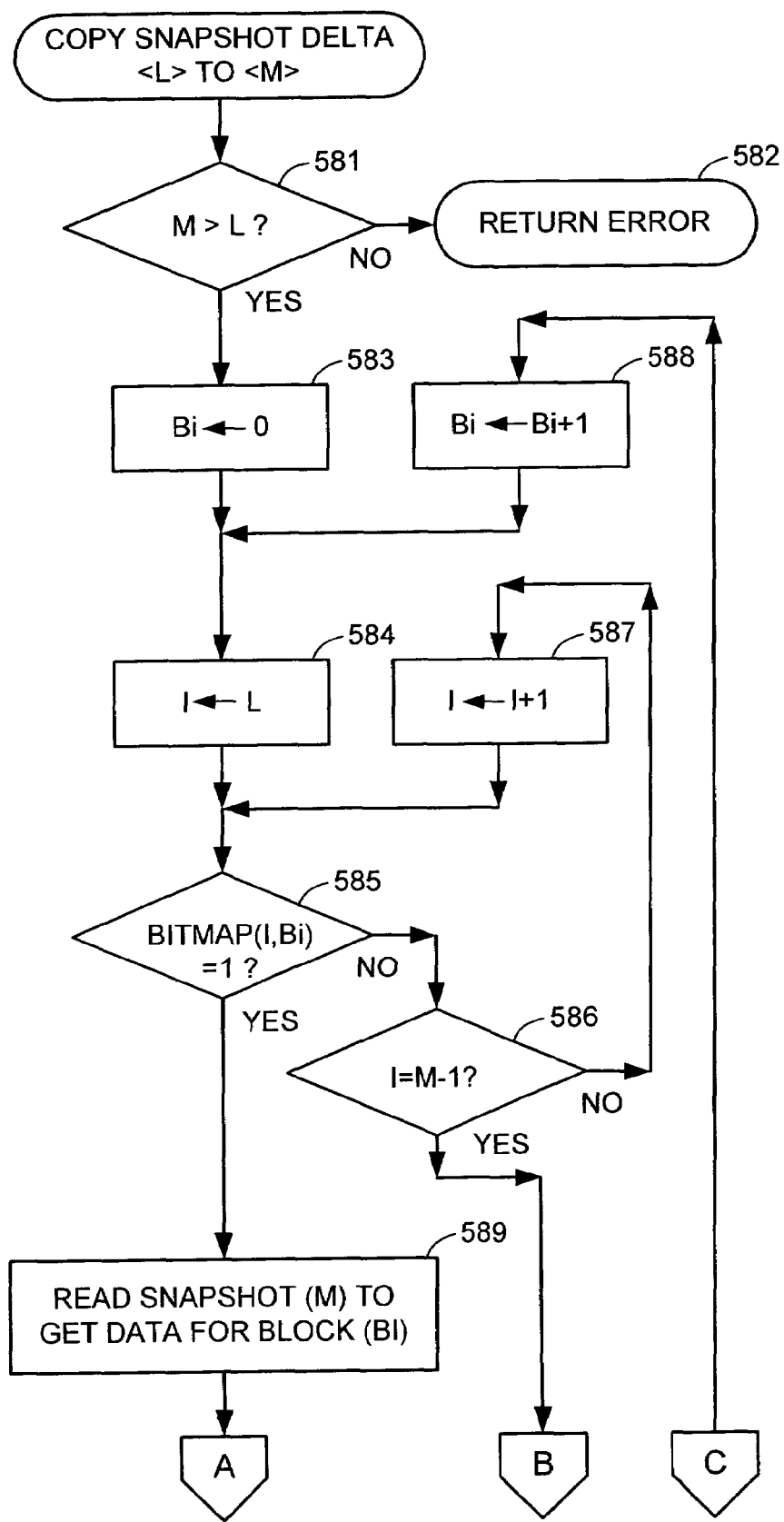
FIGS. 34 and 35 comprise a flowchart of a procedure for copying snapshot delta for snapshots L to M.

FIG. 34 shows a flowchart of a procedure for the $fs_copy-start command. Here L is the index of the snapshot fs_ckpt1, and M list the index of the snapshot fs_ckpt2. In a first step 581, M is compared to L, and execution branches to step 582 to return an error if M is not greater than L. Otherwise, execution continues to step 583.

The following steps execute the $fs_copy-start command by scanning one or more of the bit maps of the snapshot copy facility of FIG. 25. Each bit map indicates whether or not each block of a respective snapshot changed from the snapshot to the next snapshot. Therefore, by examining the bit maps for the snapshots L to M−1, it is determined whether or not each block has changed from snapshot L to M. If so, the new value of the block is read from the snapshot M. The bit maps are scanned in block order so that the new blocks are read from the snapshot M of the primary (i.e., the source) file system and transmitted to the secondary (i.e., the destination) file system in the order of their block indices ($B_i$).

In step 583, the block index ($B_i$) is set to zero. In step 584, a snapshot index (I) is set to L. In step 585, the bit map for the snapshot (I) is indexed with the block index ($B_i$) to determine whether or not the block was changed between snapshot (I) and snapshot (I+1). If in step 585 the bit for the block ($B_i$) is not set in the bit map for the snapshot (I), then no such change occurred, and execution continues to step 586. In step 586, if the snapshot index I is not equal to M−1, then execution continues step 587. In step 587, the snapshot index I is incremented by one. After step 587, execution loops back to step 585.

In step 585, if the bit for the block ($B_i$) is set in the bit map for the snapshot (I), then execution branches to step 589. In step 589, the snapshot (M) is read to get the new data for the block ($B_i$). Execution continues to step 590 of FIG. 35. In step 590, the block index ($B_i$) and the new data for the block ($B_i$) from the snapshot (M) are returned for copying into the secondary file system. Then in step 591, if the block index ($B_i$) is at the end of the production volume, then execution is finished. If not, execution loops back to step 588 of FIG. 34. In step 588, the block index ($B_i$) is incremented by one, and execution loops back to step 584, to continue scanning for the next value of the block index.

Figure 35:
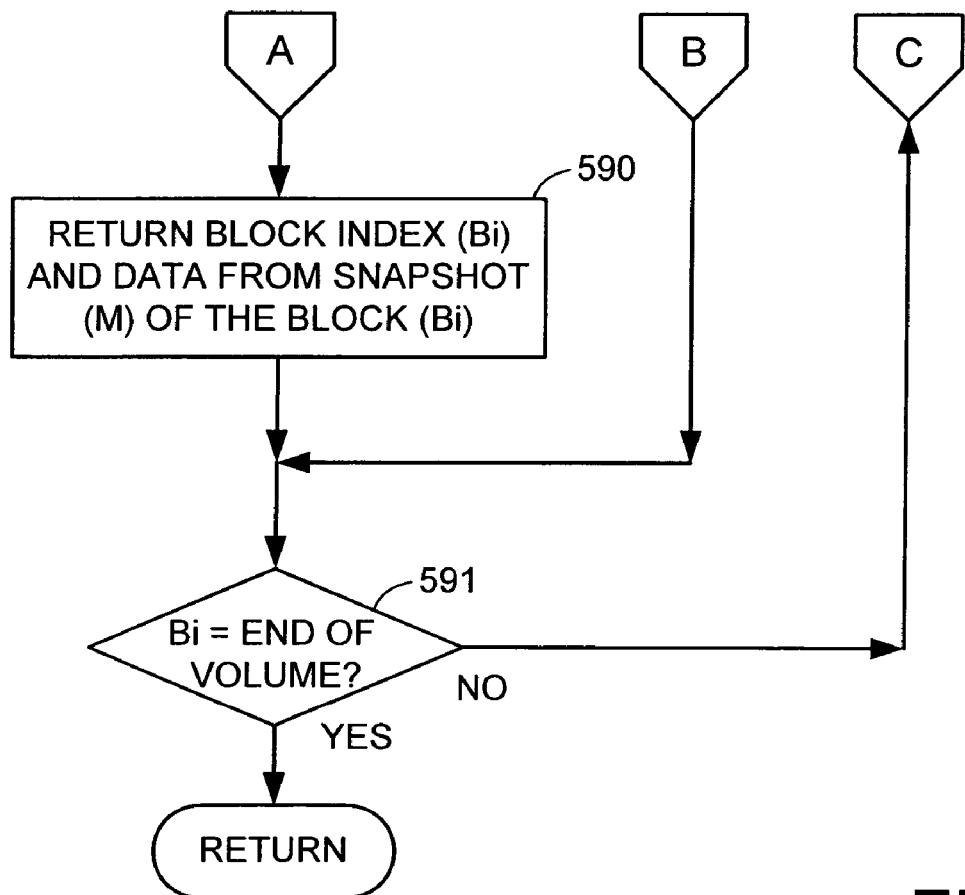

In step 586 of FIG. 34, if I is equal to M−1, then execution continues to step 591 of FIG. 35.

It should be understood that the flowchart of FIGS. 34-35 represents a program executed by at least one processor in a data storage system such as a network file server. The processor, for example, is a data mover computer (e.g., 232 in FIG. 1). The program, for example, is initially contained in a program storage device such as a floppy disk (e.g., 238 in FIG. 1) and down-loaded into storage of the data mover computer.

The program in the flowchart of FIGS. 34-35 has an inner loop including steps 585, 586, 587 that indexes the snapshots L to snapshot M−1. This sequence includes the snapshot L and the snapshots that are both younger than the snapshot L and older than the snapshot M. The program in the flowchart of FIGS. 34-35 has an outer loop including steps 584, 585, 586, 591, and 588 that indexes the blocks. When a bit in the indexed bit map is found to be set in step 585, the inner loop is exited to return the block index ($B_i$) and the data in the snapshot M for block ($B_i$).

The snapshot copy differential has been described above for facilitating recovery of a file system after a disaster. The snapshot copy differential can also be used for wide-area distribution of updates on an as-needed basis. This reduces network traffic for the case where a client has an old local version of a file system and needs a new version of the file system. A new local version of the file system can be constructed by copying the, appropriate changes into the old local version of the file system.

Figure 36:
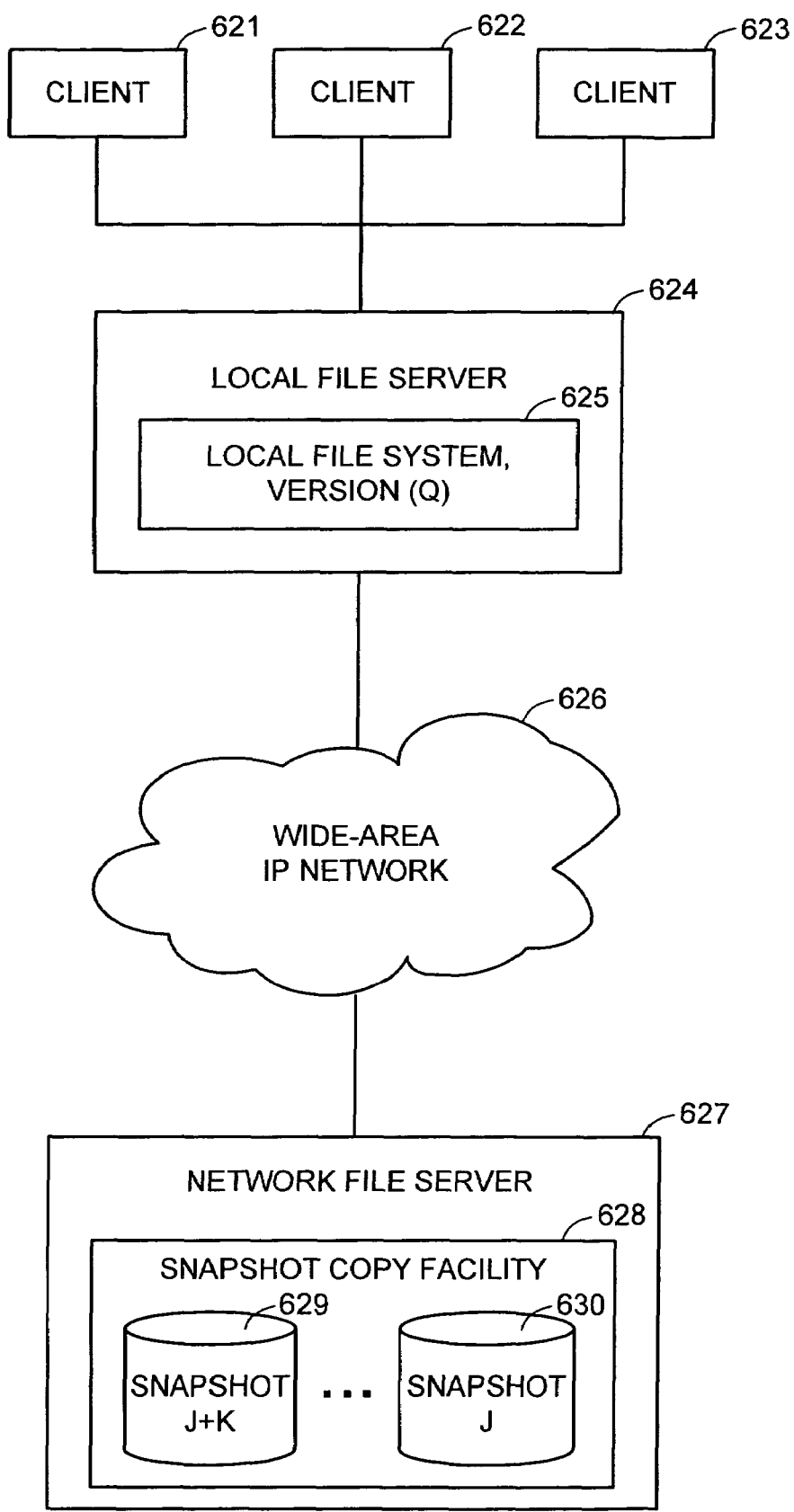
FIGS. 36 shows a block diagram of a data network in which snapshot deltas are transmitted over a wide-area network from a network file server to a local file server in order to update the local file system as needed.

FIG. 36, for example, shows a block diagram of a data network in which snapshot deltas are transmitted over a wide-area network 626 from a network file server 627 to a local file server 624 in order to update a local file system 625 as needed. The local file server 624 services local clients 621, 622, and 623. When a client needs a more recent version of the file system, and the local file system 625 is not the most recent version, then the local file server may request a specified version from the network file server 627, or the client may request the most recent version available.

The network file server 627 has a snapshot copy facility 628 storing multiple snapshots 629, 630. If the local file system 625 in the local file server 624 is one of the multiple snapshots, then the network file server 627 may respond to a request from the local file server 624 by obtaining from the snapshot copy facility 628 a snapshot copy differential that would contain all of the updates necessary to convert the local file system 624 to a more recent snapshot of the file system. In the usual case, the local file server 624 would request all of the updates necessary to convert the local file system 625 to the most recent snapshot copy. However, it is also possible for the local file server 624 to request the updates for a specified version that would not necessarily be the most recent snapshot copy.

Figure 37:
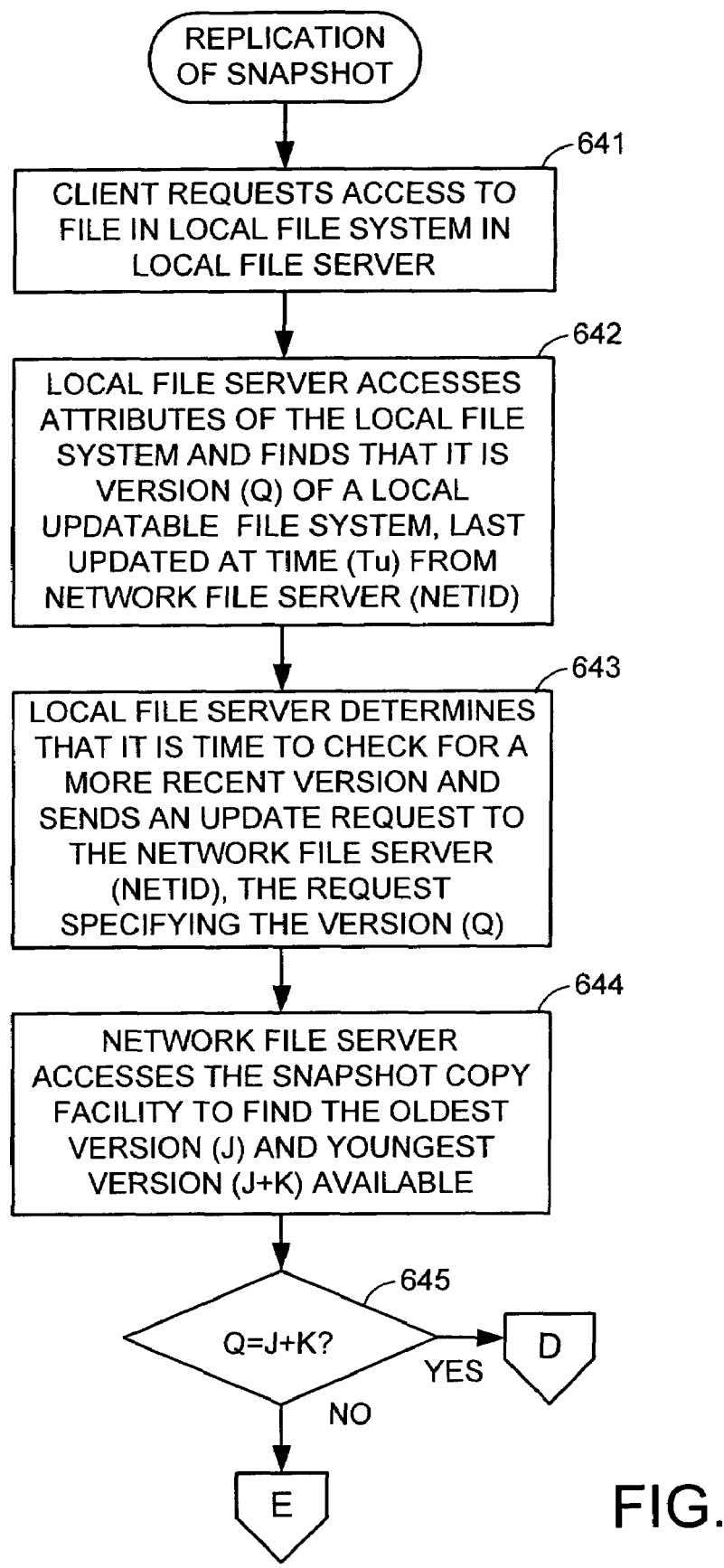
FIGS. 37 and 38 comprise a flowchart of a procedure for replicating snapshots in the data network of FIG. 36.
Figure 38:
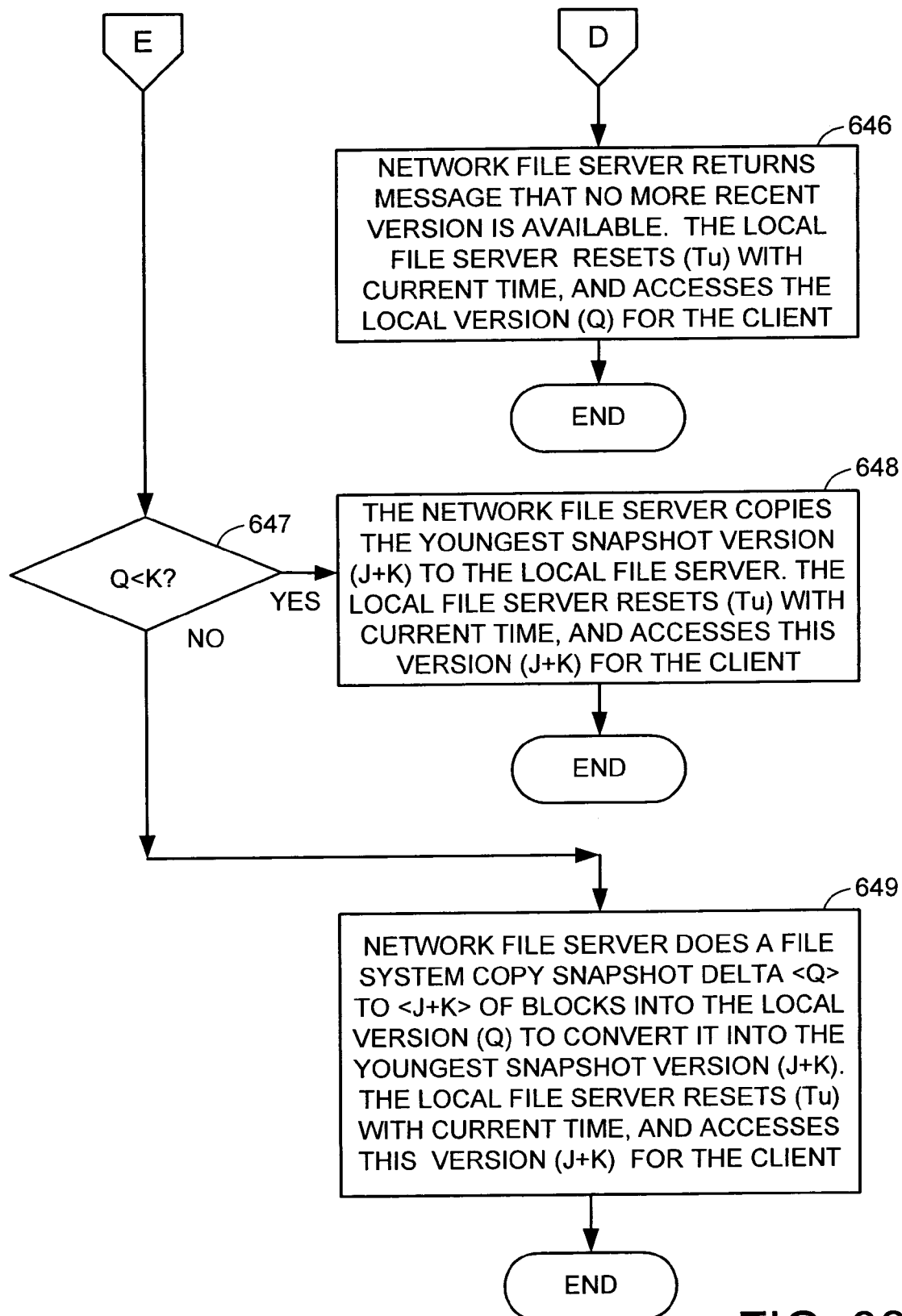

FIGS. 37 and 38 show a flowchart of a procedure for the replication of the most recent snapshot in the system of FIG. 36 using the snapshot copy differential. In a first step 641, the client requests access to the file in the local file system in the local file server. In step 642, the local file server accesses attributes of the local file system and finds that it is version (Q)

of a local updatable file system, last updated at time (Tu) from a network file server having a network identifier (NETID). The local file server uses the time of last update (Tu) to determine that it is time to check for a more recent version, and sends an update request to the network file server (NETID). For example, the file system has an attribute specifying a minimum update interval (Tmin), and it is not time to request an update unless the minimum update interval has elapsed since the time of the last update. The request specifies the version (Q) already in the local file server. In response, the network file server accesses the snapshot copy facility to find the oldest version (J) and the youngest version (J+K) stored in the network file server. In step 645, Q is compared to J+K. If Q=J+K, then execution branches to step 646 of FIG. 38. In step 646, the network file server returns a message that no more recent version is available. The local file server resets the time of last update (Tu) to the current time, and accesses the local version (Q) for the client. Upon completion of step 646, the snapshot replication process is finished.

If in step 645 Q is not equal to J+K, then execution continues to step 647 of FIG. 38. In step 647, Q is compared to K. If Q is less than K, then execution branches to step 648. In this case, the version (Q) is not a snapshot in the snapshot copy facility because the version (Q) is too old. In step 648, the network file server copies the youngest snapshot version (J+K) to the local file server. The local file server replaces the local version (Q) with the new version (J+K), resets the time of last update (Tu) to, the current time, and accesses the new local version (J+K) for the client. Upon completion of step 648, the snapshot replication process is finished.

In step 647, if Q is not less than K, then execution continues to step 649. In step 649, the network file server does a file system copy snapshot delta <Q> to <J+K> of blocks into the local version (Q) to convert it into the youngest snapshot version (J+K). The local file server resets the time of last update (Tu) to the current time, and accesses this local snapshot version (J+K) for the client. Upon completion of -step 649, the snapshot replication process is finished.

In a preferred snapshot copy facility, as described below with reference to FIGS. 41 to 46, there is kept a meta bit map for each snapshot copy for indicating blocks of the production file system that are not used in the snapshot copy. Further details of such a snapshot copy facility are described in Philippe Armangau, et al., "Data Storage System Having Meta Bit Maps for Indicating Whether Data Blocks are Invalid in Snapshot is Copies," U.S. patent application Ser. 10/213,241 filed Aug. 6, 2002, incorporated herein by reference. The snapshot copy facility maintains the meta bit maps in order to store the "before image" of a block in the save volume at the tail of the snapshot queue only when the block is being written to and the "before image" is needed for responding to any request for reading a snapshot copy. This reduces the number of blocks that are stored in the save volumes. However, in this case, the bit map for each snapshot (L) indicates whether or not a block has been stored in the save volume for the snapshot (L), and no longer will indicate all of the blocks that have been changed after snapshot (L) and before snapshot (L+1). In particular, if a block was not in use for snapshot (L), and was written to after snapshot (L) and before snapshot (L+1), then the "before image" of the block will not be written into the save volume for snapshot (L).

When it is known that a block is not used in the snapshot copy (M), then there is no need for the snapshot copy facility to return the block when responding to a request for the snapshot delta of snapshot <L> to snapshot <M>. Therefore, for the preferred snapshot copy facility, it is desirable to modify the procedure of FIG. 34 in order use the information in the meta bit map for the snapshot <M>. In this case, the procedure of FIG. 34 should also be modified to account for the fact that the save volumes no longer store the "before images" for all of the blocks that may have changed between the successive snapshot copies.

Figure 39:
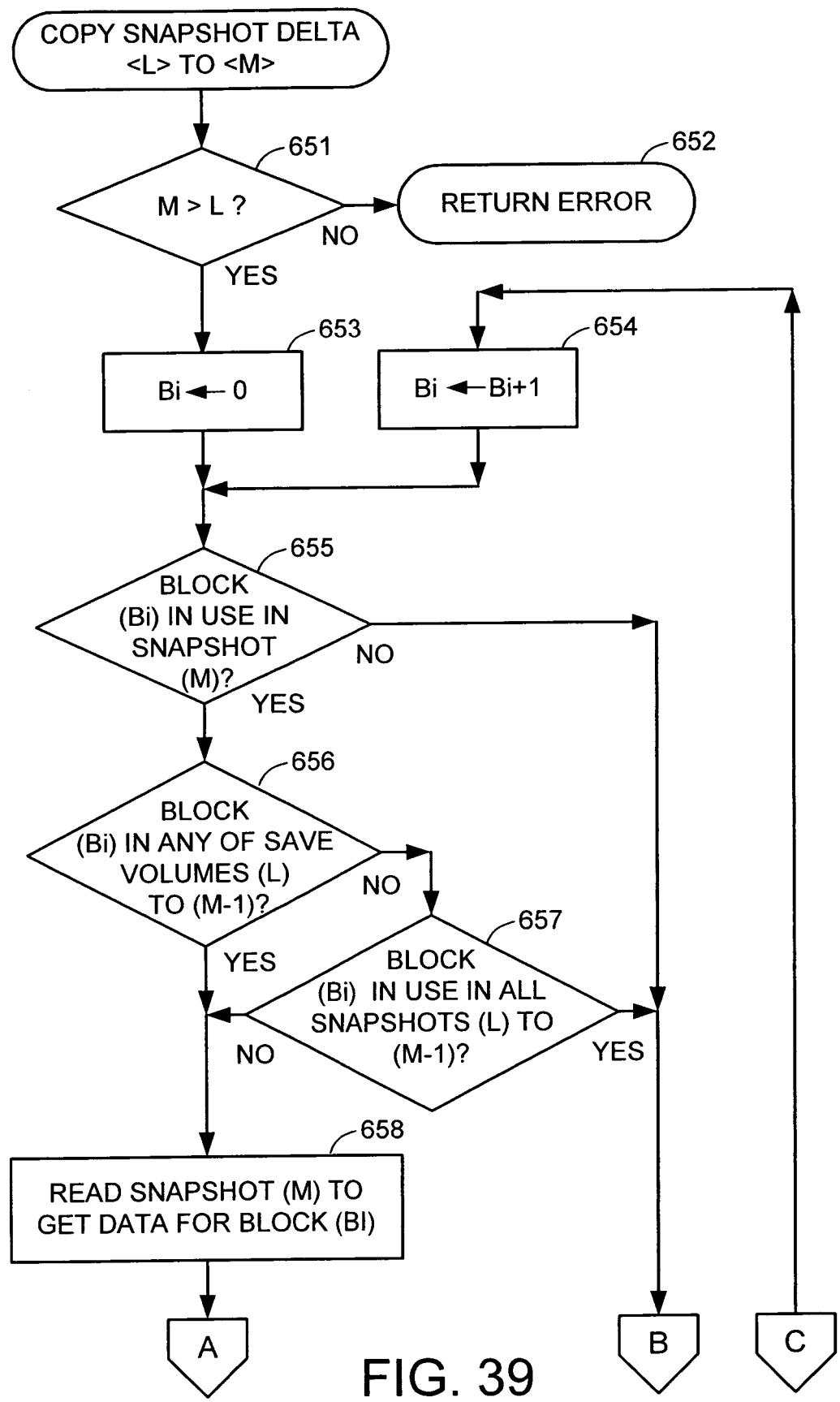
FIG. 39 is a modified version of the flowchart of FIG. 34, showing how to copy a snapshot delta from a snapshot copy facility that keeps track of blocks of a production file system that are not in use in the snapshot copies of the production file system.

FIG. 39 shows how the flowchart of FIG. 34 can be modified for use with the preferred snapshot copy facility of FIGS. 41 to 46. Steps 651, 652, and 653 of FIG. 39 are similar to steps 581, 582, and 583 of FIG. 34. Step 654 of FIG. 39 is similar to step 588 of FIG. 34, and step 658 of FIG. 39 is similar to step 589 of FIG. 34.

In FIG. 39, after step 653 or step 654, execution continues to step 655. In step 655, if the block ($B_i$) is not in use in the snapshot (M), then execution branches to step 591 of FIG. 35. Therefore, a block not in use in the snapshot (M) is not returned in response to the command to copy the snapshot delta <L> to <M>. If the block ($B_i$) is in use in the snapshot (M), then execution continues from step 655 to step 656. In step 656, if the block ($B_i$) is in any of the save volumes (L) to (M−1), then execution continues to step 658 to read the block ($B_i$) from the snapshot (M) in order to return this version of the block ($B_i$) in response to the command to copy the snapshot delta <L> to <M>. In step 656, if the block ($B_i$) is in any of the save volumes (L) to (M−1), then execution branches to step 657. In step 657, if the block ($B_i$) is in use in all of the snapshots (L) to (M−1), then execution branches to step 591 of FIG. 35. In this case, the block ($B_i$) did not change from snapshot (L) to snapshot (M), because if it did, a "before image" would have been stored in one of the save volumes (L) to (M−1). In step 657 of FIG. 39, if it is hot true that the block ($B_i$) is in use in all of the snapshots (i.e., it is true that the block ($B_i$) is not in use in at least one of the snapshots (L) to, (M−1)), then execution continues from step 657 to step 658 to read the block ($B_i$) from the snapshot (M) in order to return this version of the block ($B_i$) in response to the command to copy the snapshot delta <L> to <M>. In this case, it is possible that the block changed from snapshot (L) to snapshot (M) despite the fact that the block ($B_i$) in not in any of the save volumes (L) to (M−1).

Figure 40:
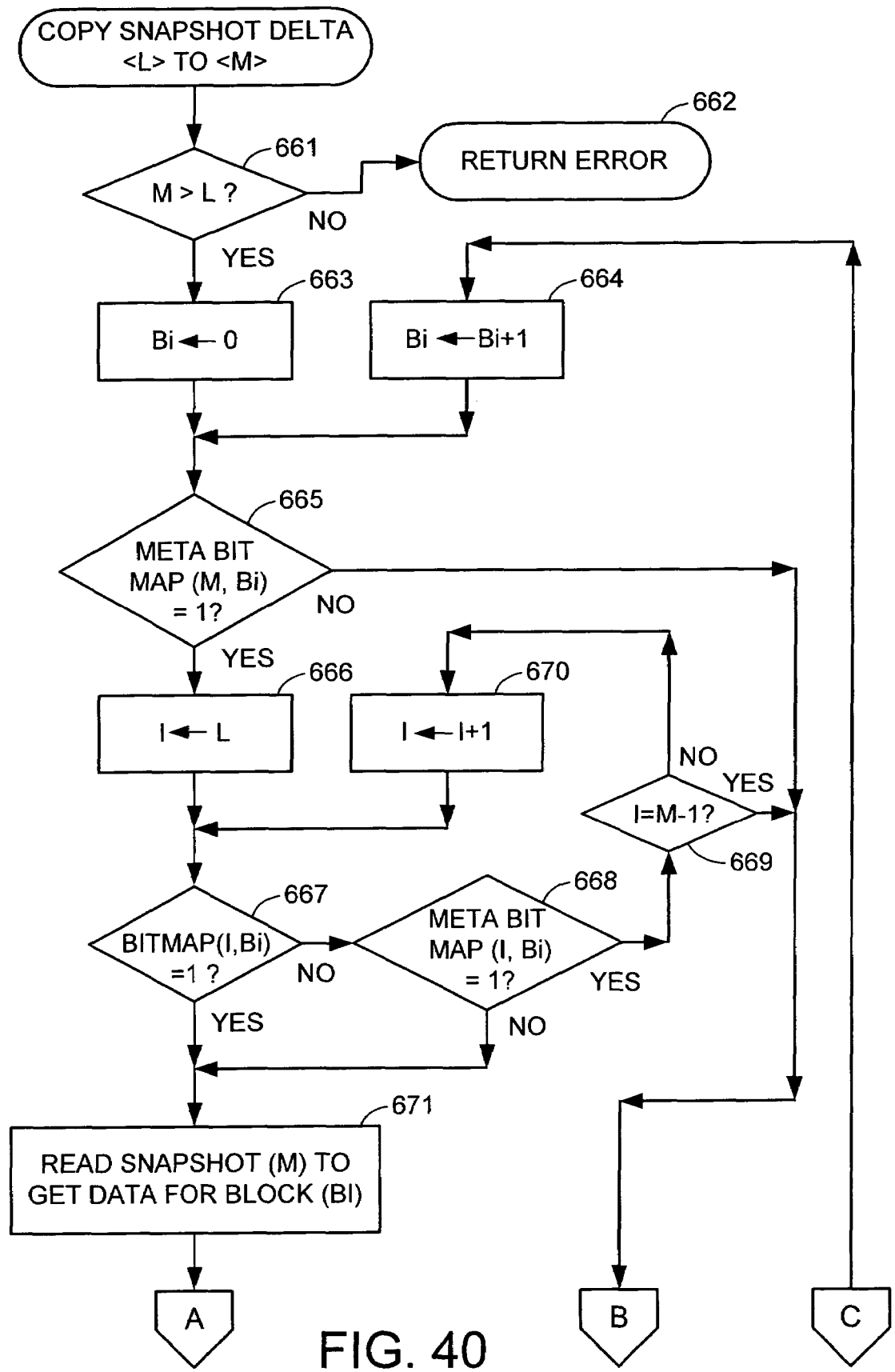
FIG. 40 shows a specific instance of the flowchart of FIG. 39 for a snapshot copy facility that uses respective meta bit maps for indicating the blocks in a production file system that are not used in the snapshot copies of the production file system.

FIG. 40 shows a preferred implementation" of the procedure of FIG. 39. Steps 661 to 665 of FIG. 40 are similar to steps 651 to step 655 of FIG. 39. In step 665, the meta bit map for snapshot (M) has a value for the block ($B_i$) indicating whether or not the block ($B_i$) is in use for the snapshot (M). In particular, a value of 1 indicates that the block ($B_i$) is in use for the snapshot (M). Steps 666, 669, and 670 of FIG. 40 are similar to step 584, 586 and 587 of FIG. 34. From step 666 or step 670, execution continues to step 667.

In step 667, if the bit map for snapshot (I) has a value of 1 for the block ($B_i$), then execution continues to step 671 to read the snapshot (M) to get data for the block ($B_i$), in order to return the data in response to the command to copy the snapshot delta <L> to <M>. In this case, the save volume for block (I) includes a "before image" for the block ($B_i$). Otherwise, if the bit map for snapshot (I) does not have a value of 1 for the block ($B_i$), execution branches from step 667 to step 668. In step 668, if the meta bit map for the snapshot (I) does not have a value of 1 for the block ($B_i$), execution continues to step 671 to read the snapshot (M) to get data for the block ($B_i$), in order to return the data in response to the command to copy the snapshot delta <L> to <M>. In this case, the block ($B_i$) is not in use in the snapshot (I). Otherwise, if the meta bit map for the snapshot (I) has a value of 1 for the block ($B_i$), execution continues to step 669.

Maintenance of Meta Bit Maps in the Snapshot Copy Facility

In the above description of the snapshot copy process, and in particular with respect to FIG. 25, it was assumed that the original contents of a block of the production file system must be saved to the most recent save volume before the contents of the block are modified by a write access to the production file system. In practice, however, the original contents are often invalid, and therefore need not be saved. For example, many applications start with an empty file, and the file increases in size as data is written to the file. In some of these applications, the file rarely decreases in size. However, storage for the file may be released when the file is deleted from the file server, for example, when the file is transferred to archival storage. In some applications, the extent of a file may be dynamically decreased concurrent with read/write access to the file.

There are significant advantages to identifying when read/write access to the production file system is about to modify the contents of an invalid data block. If this can be done in an efficient manner, then there can be a decrease in the access time for write access to the production file system. A write operation to an invalid block can be executed immediately, without the delay of saving the original contents of the data block to the most recent save volume at the tail of the snapshot queue. Moreover, there is a saving of storage because less storage is used for the save volumes. There is also a decrease in memory requirements and an increase in performance for the operations upon the snapshot file systems, because smaller bit and block hash indices can be used, and the reduced amount of storage for the snapshots can be more rapidly restored to the production file system, or deallocated for re-use when Snapshots are deleted.

An efficient way of identifying when read/write access to the production file system is about to modify the contents of an, invalid data block is to use a meta bit map having a bit for indicating whether or not each allocated block of storage in the production file system is valid or not. For example, whenever storage is allocated to the production file system by the initial allocation or the extension of a clone volume, a corresponding meta bit map is allocated or extended, and the bits in the meta bit map corresponding to the newly allocated storage are initially reset.

Figure 41:
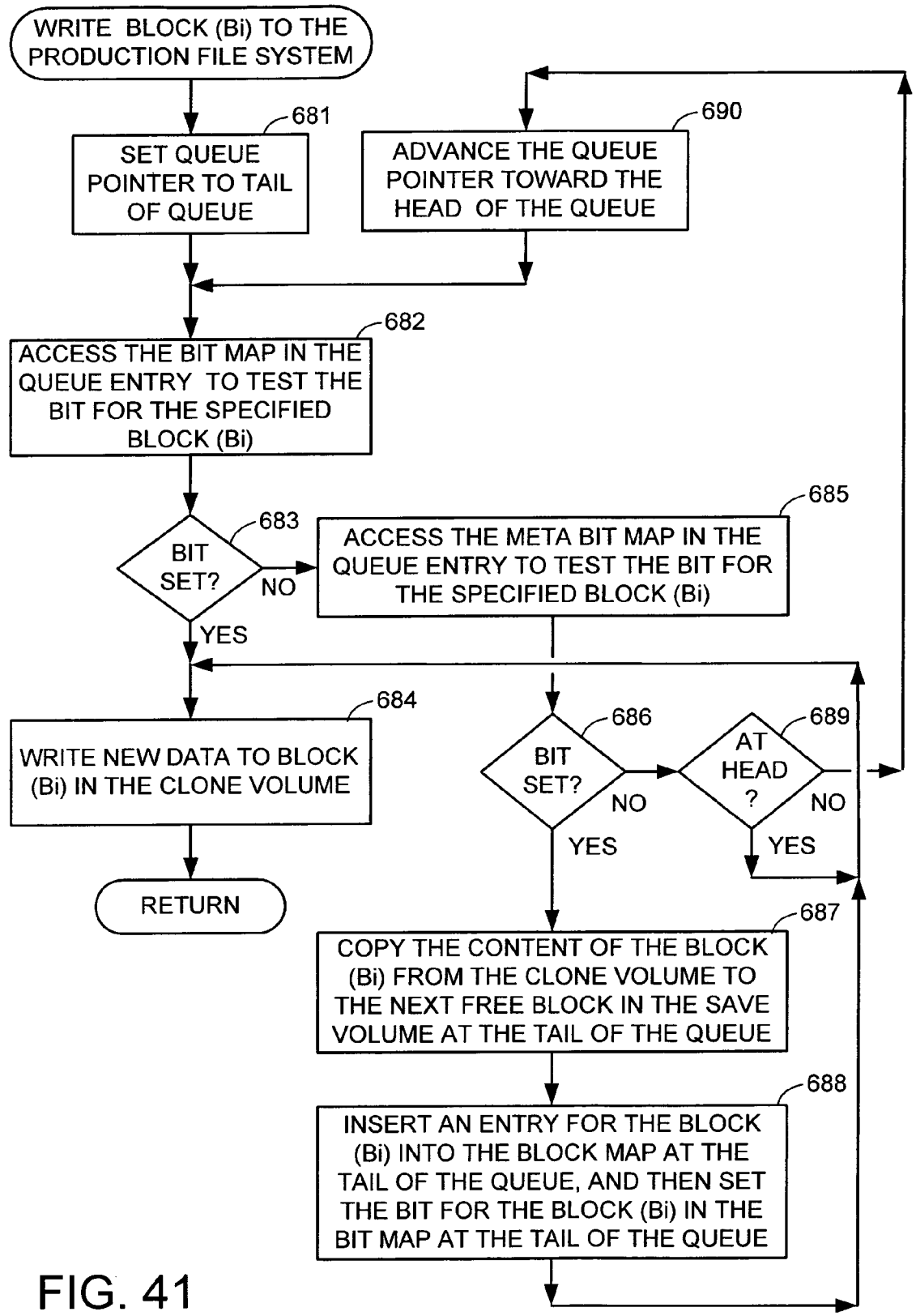
FIG. 41 is a flowchart for writing a specified data block to the production file system for a snapshot copy facility that uses a meta bit map for indicating the blocks in a production file system that are not presently in use.

FIG. 41 shows a procedure for writing a specified block (Bi) to the production file system when there is a meta bit map for indicating invalid data blocks in the production file system. In a first step 681, a queue pointer is set to point to the queue entry at the tail of the snapshot queue. Next, in step 682, the bit map in this snapshot queue entry is accessed to test the bit for the specified block (Bi). Next, in step 683, if the tested bit is found to be set, then execution continues to step 684. In step 684, new data is written to the specified block (Bi) in the clone volume, and then execution returns.

In step 683, if the bit in the bit map is not set, then execution branches to step 685. In step 685, the meta bit map in the snapshot queue entry is accessed to test the bit for the specified block (Bi). Then, in step 686, execution continues to step 687 if this bit is found to be set. In step 687, the content of the block (Bi) is copied from the clone volume to the next free block in the save volume at the tail of the snapshot queue. In step 688, an entry for the block (Bi) is inserted into the block map at the tail of the snapshot queue, and then the bit for the block (Bi) is set in the bit map at the tail of the snapshot queue. Execution continues from step 688 to step 684, to write new data to the block (Bi) in the clone volume.

In step 686, if the tested bit is found not to be set, then execution branches to step 689. If the queue pointer is pointing to the head of the queue, then execution branches to step 684, to write new data, to the block (Bi) in the clone volume. Otherwise, if the queue pointer is not pointing to the head of the snapshot queue, then execution continues to step 690 to advance the queue pointer to the next snapshot queue entry toward the head of the snapshot queue. After step 690, execution loops back to step 682.

Figure 42:
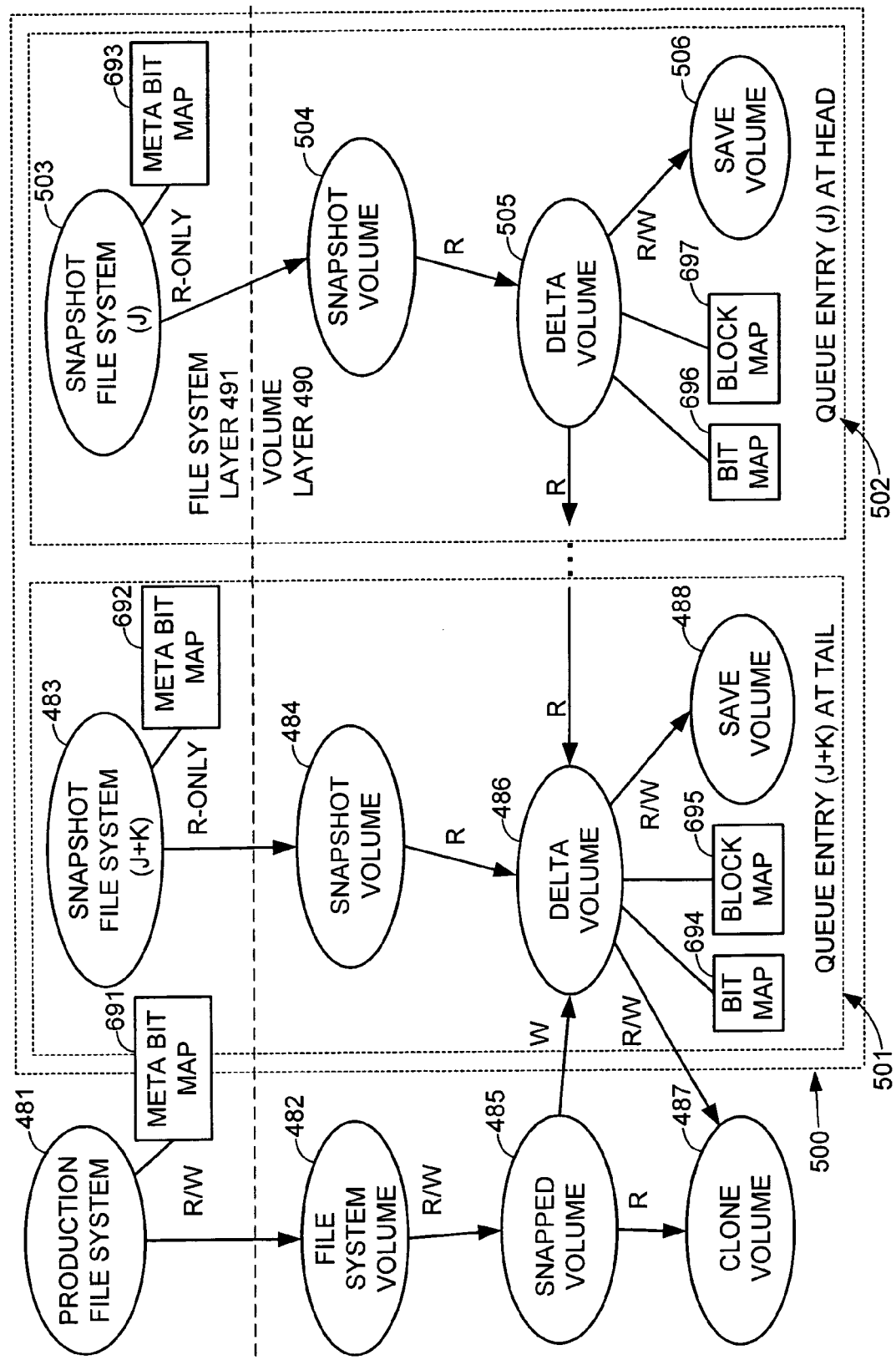
FIG. 42 is a diagram of a preferred organization of multiple snapshots in the snapshot copy facility.

FIG. 42 shows an organization of the snapshots in the network file server when a respective meta bit map 692, 693 is maintained for each snapshot in addition to the meta bit map 691 for the production volume. It is desired to maintain a respective meta bit map for each snapshot so that whenever the production file system is restored with a snapshot file system, the meta bit map for the production file system can be restored with the meta bit map for each snapshot. For example, a meta bit map of the production file system is included in the production file system, so that whenever a snapshot copy of the production file system is created, a snapshot copy of the meta bit map is also created. Consequently, when the production file system is restored with a snapshot, the meta bit map of the production volume is replaced with the meta bit map of the snapshot.

As shown in FIG. 42, a meta bit map 691 is linked to the production file system 481 for indicating invalid blocks in the production file system. Each entry in the snapshot queue 500 includes a respective meta bit map linked to the snapshot file system in the entry. For example, the queue entry (J+K) at the tail 501 of the queue has a meta bit map 692 linked to the snapshot file system 483, and the queue entry (J) at the head 502 of the queue includes a meta bit map 693 linked to the delta volume 505.

To reduce the memory and storage requirements for maintaining the bit maps 694, 696 and block maps 695, 697, the each bit map is organized as a set of pages indexed by a page table, and the each block map is organized as a set of hash lists indexed by a hash table. The bit maps and block maps 694, 695 at the queue entry (J+K) at the tail of the queue are initially created in a random access memory cache and written back to storage of the save volume 488 when a next snapshot of the production file system 481 is created. Thereafter the bit maps and block maps can be deallocated from the random access memory in order to free up cache memory, and later staged from storage to the cache memory when needed for read access to their respective snapshots.

Figure 43:
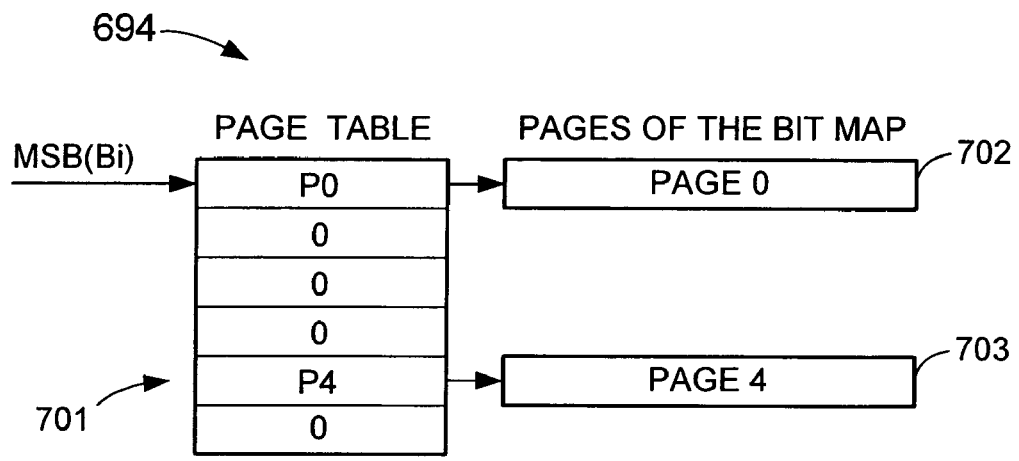
FIG. 43 shows a bit map including a page table and a set of pages; for use in the snapshot organization of FIG. 42.

FIG. 43 shows that the bit map 694 is organized as a page table 701 indexed by a set of most significant bits (MSB) of the block index (Bi), and pages 702 and 703 of the bit map linked to respective entries of the page table. The page table 701 includes a set of entries, each of which is either zero, indicating that the entire page is zero and therefore the page is not stored in storage or random access memory, or is a pointer to a page of the bit map.

Figure 44:
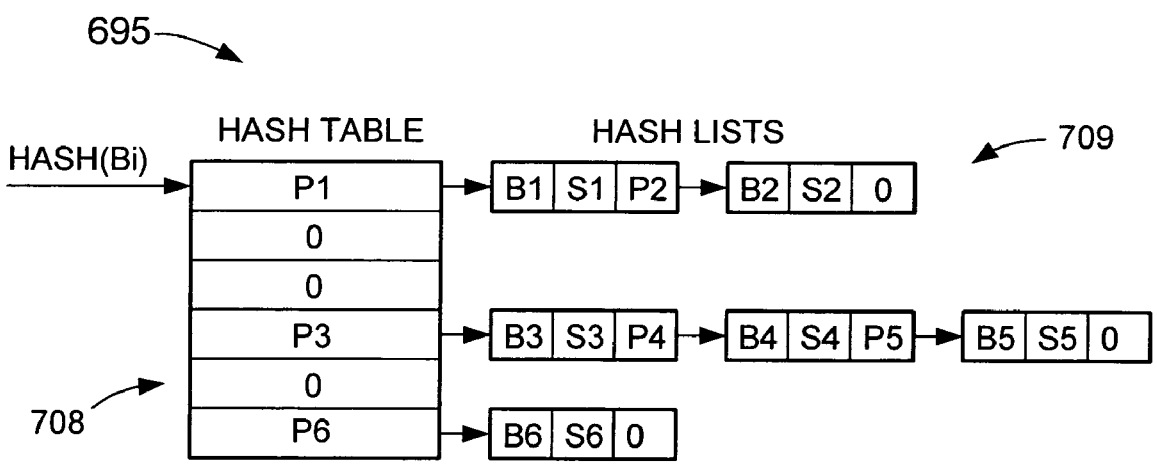
FIG. 44 shows a block map including a hash table and hash lists, for use in the snapshot organization of FIG. 42.

FIG. 44 shows that the block map 695 is organized as a hash table 708 indexed by a hashing of the block index (Bi), and a set of hash lists 709 linked to respective entries of the hash table 708. Each non-zero entry in the hash table 708 points to a respective one of the hash lists 709. Each entry in each hash list includes a block address ($B_i$) to a block in the clone volume, a corresponding block address ($S_i$) of the block in the save volume, and a value that is either zero indicating the end of the has list, or a pointer to the next entry in the list.

It is not necessary to retain the bit map 694 for the snapshot because the block map 695 can be accessed to provide the same information that is contained in the bit map 694. In particular, the block map 695 can be accessed simply to determine whether or not a specified block (Bi) is found in the block map, and therefore can be found in the save volume for the corresponding snapshot. However, the bit map 694 can be accessed more quickly to provide this information. Therefore, for applications such as backup where the snapshots would be accessed very infrequently, it may be desirable to conserve storage by discarding the bit map for the snapshot at the tail of the queue once the next snapshot is created. Otherwise, for an application such as described above with respect to FIGS. 36-38 where the snapshots would be accessed frequently, the bit map for the snapshot at the tail of the snapshot queue may be written to storage and maintained in a random access cache memory as needed.

Figure 45:
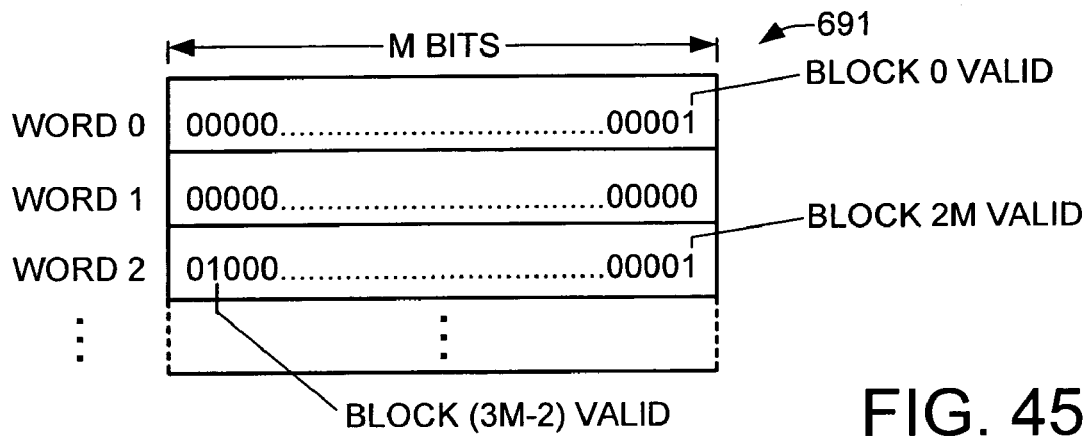
FIG. 45 shows a specific construction for and interpretation of a meta bit map for the production volume.

FIG. 45 shows that the meta bit map 691 has a respective bit corresponding to each block in the clone volume, and in this example, each bit in the meta bit map corresponds to one and only one block in the clone volume. The meta bit map 691 includes a series of words, each with a multiple of M bits. In this example, a bit having a value of zero indicates a corresponding block that is invalid, and a bit having a value of one indicates a corresponding block that is valid.

Figure 46:
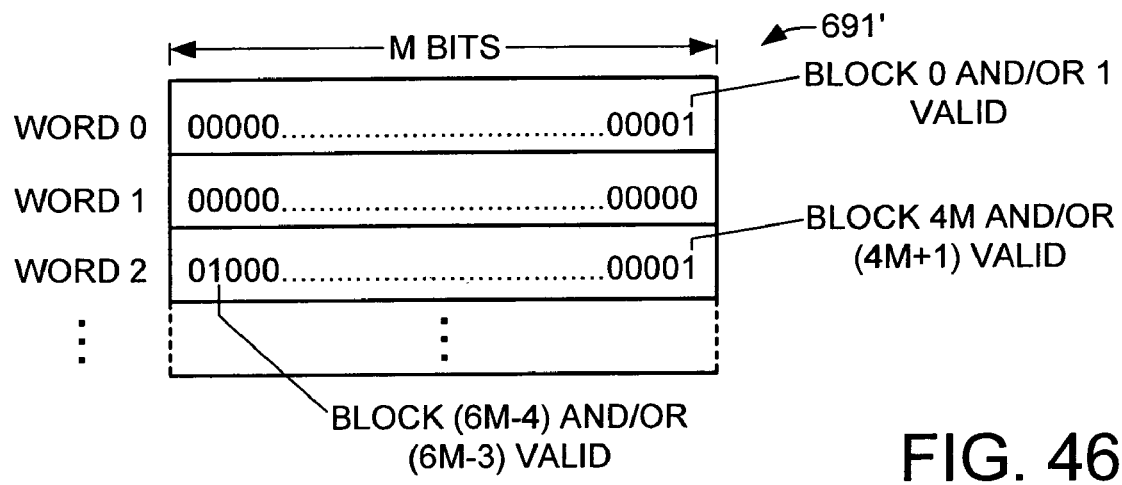
FIG. 46 shows an alternative interpretation of a meta bit map for the production volume.

The meta bit map, however, may have a granularity greater than one block per bit. For example, each bit in the meta bit map could indicate a range of block addresses, which may include at least some valid data. The benefit to the increased granularity is a reduced size of the meta bit map at the expense of sometimes saving invalid data to the save volume. For example, FIG. 46 shows the interpretation of a meta bit map 691' having a granularity of two blocks per bit. Each bit is set if any one of the two corresponding blocks is valid, or conversely each bit is clear only if neither of the, two corresponding blocks is valid. In this case, the block address can be converted to a bit address by an integer division by two, for example, by an arithmetic right shift of the block address by one bit position.

In view of the above, there has been described a snapshot copy facility that stores a plurality of snapshot copies of a production file system. Each of the snapshot copies is a prior state of the production file system at a respective point in time. The snapshot copy facility receives a request for the difference between a specified older snapshot copy and a specified younger snapshot copy, and responds by returning the difference between the older snapshot copy and the younger snapshot copy. In a preferred implementation, the snapshot copy facility has an index for each snapshot copy for indicating blocks of data in the production file system that have changed between the snapshot copy and a next snapshot copy of the production file system. The indices are scanned for a sequence of the snapshot copies to determine the blocks that have changed, and the snapshot copy facility returns the block numbers and data in the younger snapshot copy for the blocks that have changed.

It has been shown how the difference between an older snapshot copy and a younger snapshot copy can be used for recovery purposes and also for distribution of updates over a network on an as-needed basis. In general, a client has an older local copy of a snapshot and needs a more recent snapshot. The client requests a network file server to provide the difference between the older snapshot and the more recent snapshot. The client writes this difference into its older local copy to reconstruct the more recent snapshot.

What is claimed is:

1. A method of operating a snapshot copy facility that stores a plurality of snapshot copies of a production file system, each of the snapshot copies being a prior state of the production file system at a respective point in time, said method comprising:

the snapshot copy facility receiving a request for the difference between a specified older one of the snapshot copies and a specified younger one of the snapshot copies; and the snapshot copy facility responding to the request by returning the difference between the specified older one of the snapshot copies and the specified younger one of the snapshot copies;

wherein the snapshot copy facility has an index for each snapshot copy for indicating changes between said each snapshot copy and a next snapshot copy of the production file system, and the method includes scanning the index for the specified older one of the snapshot copies, which includes scanning the indices for a sequence of the snapshot copies including the index for the specified older one of the snapshot copies and a respective index for each of a plurality of snapshot copies of the production file system that are both younger than the specified older one snapshot copies and older than the specified younger one of the snapshot copies, and wherein the indices for the sequence of the snapshot copies are scanned by a program routine having an outer loop indexing blocks of data in the file system, and an inner loop indexing the snapshot copies in the sequence of the snapshot copies.

2. A method of operating a snapshot copy facility that stores a plurality of snapshot copies of a production file system, each of the snapshot copies being a prior state of the production file system at a respective point in time, said method comprising:

the snapshot copy facility receiving a request for the difference between a specified older one of the snapshot copies and a specified younger one of the snapshot copies; and the snapshot copy facility responding to the request by returning the difference between the specified older one of the snapshot copies and the specified younger one of the snapshot copies;

wherein the snapshot copy facility has an index for each snapshot copy for indicating blocks of data that are known to be invalid in said each snapshot copy, and the method includes scanning the index for the specified younger one of the snapshot copies, and when the index indicates that a block is not known to be invalid, then determining whether the block has changed between the specified older one of the snapshot copies and the specified younger one of the snapshot copies.

3. A method of operating a snapshot copy facility that stores a plurality of snapshot copies of a production file system, each of the snapshot copies being a prior state of the production file system at a respective point in time, the snapshot copy facility having an index for each snapshot copy for indicating blocks of data in the production file system that have changed between said each snapshot copy and a next snapshot copy of the production file system, wherein the method comprises:

scanning the indices for a sequence of the snapshot copies to determine the blocks that have changed between an older one of the snapshot copies and a younger one of the snapshot copies, the sequence of the snapshot copies including the older one of the snapshot copies and each of the snapshot copies that is both younger than the older one of the snapshot copies and older than the younger one of the snapshot copies;

wherein the indices for the sequence of the snapshot copies are scanned by a program routine having an outer loop indexing respective blocks, and an inner loop indexing snapshot copies in the sequence of the snapshot copies; and wherein the snapshot copy facility has a meta bit map for each snapshot copy for indicating blocks of data that are known to be invalid in said each snapshot copy, and the method includes scanning the meta bit map for the specified younger one of the snapshot copies, and when the meta bit map is found to indicate that a block is not known to be invalid, then determining whether the block has changed between the specified older one of the snapshot copies and the specified younger one of the snapshot copies by scanning the indices for the sequence of the snapshot copies.

4. A method of operating a snapshot copy facility that stores a plurality of snapshot copies of a production file system, each of the snapshot copies being a prior state of the production file system at a respective point in time, the snapshot copy facility having a first index for each snapshot copy for indicating blocks of data in the production file system that have changed between said each snapshot copy and a next snapshot copy of the production file system and that have a "before image" saved for said each snapshot copy, the snapshot copy facility having a second index for said each snapshot copy for indicating blocks of data that are not in use in said each snapshot copy; said method comprising:

responding to a request for the difference between a specified older one of the snapshot copies and a specified younger one of the snapshot copies by accessing the second index for the specified younger one of the snapshot copies to determine blocks of data in the production file system that are in use in the specified younger one of the snapshot copies, and for blocks of data in the production file system that are in use in the specified younger one of the snapshot copies, accessing at least one of the first indices for a sequence of the snapshot copies to determine blocks that have changed between an older one of the snapshot copies and a younger one of the snapshot copies, the sequence of the snapshot copies including the older one of the snapshot copies and each of the snapshot copies that is both younger than the older one of the snapshot copies and older than the younger one of the snapshot copies.

5. The method as claimed in claim 4, which also includes accessing at least one of the second indices for the snapshot copies in the sequence of the snapshot copies and finding that at least one of the blocks is not in use in at least one of the snapshot copies in the sequence of the snapshot copies to determine that said at least one of the blocks has changed between the older one of the snapshot copies and the younger one of the snapshot copies not changed.

6. A snapshot copy facility comprising:

storage for storing a plurality of snapshot copies of a production file system, each of the snapshot copies being a prior state of the production file system at a respective point in time; and at least one processor programmed for receiving a request for the difference between a specified older one of the snapshot copies and a specified younger one of the snapshot copies; and for responding to the request by returning the difference between the specified older one of the snapshot copies and the specified younger one of the snapshot copies;

wherein the snapshot copy facility has an index for each snapshot copy for indicating changes between said each snapshot copy and a next snapshot copy of the production file system, and said at least one processor is programmed for scanning the index for the specified older one of the snapshot copies, wherein said at least one processor is programmed for scanning the indices for a sequence of the snapshot copies including the index for the specified older one of the snapshot copies and a respective index for each of a plurality of snapshot copies of the production file system that are both younger than the specified older one snapshot copies and older than the specified younger one of the snapshot copies, and wherein said at least one processor is programmed for scanning the indices for the sequence of the snapshot copies by a program routine having an outer loop indexing the blocks, and an inner loop indexing the snapshot copies in the sequence of the snapshot copies.

7. A snapshot copy facility comprising:

storage for storing a plurality of snapshot copies of a production file system, each of the snapshot copies being a prior state of the production file system at a respective point in time; and at least one processor programmed for receiving a request for the difference between a specified older one of the snapshot copies and a specified younger one of the snapshot copies; and for responding to the request by returning the difference between the specified older one of the snapshot copies and the specified younger one of the snapshot copies;

wherein the snapshot copy facility has an index for each snapshot copy for indicating blocks of data that are known to be invalid in said each snapshot copy, and said at least one processor is programmed for scanning the index for the specified younger one of the snapshot copies, and when the index indicates that a block is not known to be invalid, then determining whether the block has changed between the specified older one of the snapshot copies and the specified younger one of the snapshot copies.

8. A snapshot copy facility comprising:

storage for storing a plurality of snapshot copies of a production file system, each of the snapshot copies being a prior state of the production file system at a respective point in time;

an index for each snapshot copy for indicating blocks of data in the production file system that have changed between said each snapshot copy and a next snapshot copy of the production file system, and at least one processor programmed for scanning the indices for a sequence of the snapshot copies to determine the blocks that have changed between an older one of the snapshot copies and a younger one of the snapshot copies, the sequence of the snapshot copies including the older one of the snapshot copies and each of the snapshot copies that is both younger than the older one of the snapshot copies and older than the younger one of the snapshot copies, which includes a meta bit map for each snapshot copy for indicating blocks of data that are known to be invalid in said each snapshot copy, and wherein said at least one processor is programmed for scanning the meta bit map for the specified younger one of the snapshot copies, and when the meta bit map is found to indicate that a block is not known to be invalid, then determining whether the block has changed between the specified older one of the snapshot copies and the specified younger one of the snapshot copies by scanning the indices for the sequence of the snapshot copies.

9. A snapshot copy facility comprising:

storage for storing a plurality of snapshot copies of a production file system, each of the snapshot copies being a prior state of the production file system at a respective point in time;

a first index for each snapshot copy for indicating blocks of data in the production file system that have changed between said each snapshot copy and a next snapshot copy of the production file system and that have a "before image" for said each snapshot copy stored in the storage, a second index for each snapshot copy for indicating blocks of data that are not in use in said each snapshot copy, and at least one processor programmed for responding to a request for the difference between a specified older one of the snapshot copies and a specified younger one of the snapshot copies by accessing the second index for the specified younger one of the snapshot copies to determine blocks of data in the production file system that are in use in the specified younger one of the snapshot copies, and for blocks of data in the production file system that are in use in the specified younger one of the snapshot copies, accessing at least one of the first indices for a sequence of the snapshot copies to determine blocks that have changed between an older one of the snapshot copies and a younger one of the snapshot copies, the sequence of the snapshot copies including the older one of the snapshot copies and each of the snapshot copies that is both younger than the older one of the snapshot copies and older than the younger one of the snapshot copies.

10. The snapshot copy facility as claimed in claim 9, wherein said at least one processor is also programmed for accessing at least one of the second indices for the snapshot copies in the sequence of the snapshot copies and finding that at least one of the blocks is not in use in at least one of the snapshot copies in the sequence of the snapshot copies to determine that said at least one of the blocks has changed between the older one of the snapshot copies and the younger one of the snapshot copies not changed.

11. A program storage device containing a program for a snapshot copy facility, the snapshot copy facility storing a plurality of snapshot copies of a production file system, each of the snapshot copies being a prior state of the production file system at a respective point in time, wherein the program is executable for responding to a request for the difference between a specified older one of the snapshot copies and a specified younger one of the snapshot copies by returning the difference between the specified older one of the snapshot copies and the specified younger one of the snapshot copies, wherein the snapshot copy facility has an index for each snapshot copy for indicating changes between said each snapshot copy and a next snapshot copy of the production file system, and the program is executable for scanning the index for the specified older one of the snapshot copies, wherein the program is executable for scanning the indices for a sequence of the snapshot copies including the index for the specified older one of the snapshot copies and a respective index for each of a plurality of snapshot copies of the production file system that are both younger than the specified older one snapshot copies and older than the specified younger one of the snapshot copies, wherein the program is executable for scanning the indices for a sequence of the snapshot copies including the index for the specified older one of the snapshot copies and a respective index for each of a plurality of snapshot copies of the production file system that are both younger than the specified older one snapshot copies and older than the specified younger one of the snapshot copies, and wherein the program is executable for scanning the indices for the sequence of the snapshot copies by a program routine having an outer loop indexing the blocks, and an inner loop indexing the snapshot copies in the sequence of the snapshot copies.

12. A program storage device containing a program for a snapshot copy facility, the snapshot copy facility having a plurality of snapshot copies of a production file system, each of the snapshot copies being a prior state of the production file system at a respective point in time, and an index for each snapshot copy for indicating blocks of data in the production file system that have changed between said each snapshot copy and a next snapshot copy of the production file system, wherein the program is executable for scanning the indices for a sequence of the snapshot copies to determine the blocks that have changed between an older one of the snapshot copies and a younger one of the snapshot copies, the sequence of the snapshot copies including the older one of the snapshot copies and each of the snapshot copies that is both younger than the older one of the snapshot copies and older than the younger one of the snapshot copies, wherein the snapshot copy facility has a meta bit map for each snapshot copy for indicating blocks of data that are known to be invalid in said each snapshot copy, and wherein the program storage device is executable for scanning the meta bit map for the specified younger one of the snapshot copies, and when the meta bit map is found to indicate that a block is not known to be invalid, then determining whether the block has changed between the specified older one of the snapshot copies and the specified younger one of the snapshot copies by scanning the indices for the sequence of the snapshot copies.

13. A program storage device containing a program for a snapshot copy facility, the snapshot copy facility having a plurality of snapshot copies of a production file system, each of the snapshot copies being a prior state of the production file system at a respective point in time, a first index for each snapshot copy for indicating blocks of data in the production file system that have changed between said each snapshot copy and a next snapshot copy of the production file system and that have a "before image" for said each snapshot copy stored in the snapshot copy facility, and a second index for each snapshot copy for indicating blocks of data that are not in use in said each snapshot copy, wherein the program is executable for responding to a request for the difference between a specified older one of the snapshot copies and a specified younger one of the snapshot copies by accessing the second index for the specified younger one of the snapshot copies to determine blocks of data in the production file system that are in use in the specified younger one of the snapshot copies, and for blocks of data in the production file system that are in use in the specified younger one of the snapshot copies, accessing at least one of the first indices for a sequence of the snapshot copies to determine blocks that have changed between an older one of the snapshot copies and a younger one of the snapshot copies, the sequence of the snapshot copies including the older one of the snapshot copies and each of the snapshot copies that is both younger than the older one of the snapshot copies and older than the younger one of the snapshot copies.

14. The program storage device as claimed in claim 13, wherein the program is executable for accessing at least one of the second indices for the snapshot copies in the sequence of the snapshot copies and finding that at least one of the blocks is not in use in at least one of the snapshot copies in the sequence of the snapshot copies to determine that said at least one of the blocks has changed between the older one of the snapshot copies and the younger one of the snapshot copies not changed.

* * * * *